(12) United States Patent
Washington et al.

(10) Patent No.: US 9,875,499 B2
(45) Date of Patent: Jan. 23, 2018

(54) ENHANCED ON-DEMAND SERVICE FUNCTIONALITY IMPLEMENTED IN CASINO GAMING NETWORKS

(71) Applicant: SYNERGY BLUE, LLC, Palm Desert, CA (US)

(72) Inventors: Georg Washington, Rancho Mirage, CA (US); Tom Stankevich, Saint Joseph, MI (US); Justin MacAuley, Palm Desert, CA (US); Joe Serra, Palm Desert, CA (US)

(73) Assignee: Synergy Blue, LLC, Palm Desert, CA (US)

( * ) Notice: Subject to any disclaimer, the term of this patent is extended or adjusted under 35 U.S.C. 154(b) by 0 days.

(21) Appl. No.: 15/045,234

(22) Filed: Feb. 16, 2016

(65) Prior Publication Data
US 2016/0239904 A1    Aug. 18, 2016

Related U.S. Application Data

(60) Provisional application No. 62/116,726, filed on Feb. 16, 2015.

(51) Int. Cl.
| | |
|---|---|
| *G07D 3/00* | (2006.01) |
| *G07F 17/00* | (2006.01) |
| *G06Q 30/06* | (2012.01) |
| *G06Q 50/12* | (2012.01) |
| *G06Q 50/34* | (2012.01) |
| *G06F 3/0484* | (2013.01) |
| *G07F 17/32* | (2006.01) |

(52) U.S. Cl.
CPC ....... *G06Q 30/0635* (2013.01); *G06F 3/0484* (2013.01); *G06Q 50/12* (2013.01); *G06Q 50/34* (2013.01); *G07F 17/3204* (2013.01); *G07F 17/3227* (2013.01)

(58) Field of Classification Search
None
See application file for complete search history.

(56) References Cited

U.S. PATENT DOCUMENTS

| | | | |
|---|---|---|---|
| 4,797,818 A * | 1/1989 | Cotter | G06Q 10/087 379/912 |
| 5,655,961 A | 8/1997 | Acres et al. | |
| 7,945,477 B2 * | 5/2011 | Werbitt | G06Q 20/20 340/426.19 |
| 8,602,882 B2 | 12/2013 | Nguyen et al. | |
| 9,536,390 B2 * | 1/2017 | Ehrlich | G07F 17/32 |

(Continued)

FOREIGN PATENT DOCUMENTS

| | | |
|---|---|---|
| WO | 2006/080911 | 8/2006 |
| WO | 2006/127795 | 11/2006 |

OTHER PUBLICATIONS

PCT International Search Report, PCT Application No. PCT/US/2016/018137, International Filing Date Feb. 16, 2016, Search Report dated May 24, 2016.

*Primary Examiner* — Allen C Chein
(74) *Attorney, Agent, or Firm* — Wolf IP Law Group; Dean E. Wolf, Esq.

(57) ABSTRACT

Various aspects described or referenced herein are directed to different methods, systems, and computer program products for implementing On Demand Services in Casino gaming establishments utilizing a Communications Network.

13 Claims, 53 Drawing Sheets

(56) References Cited

U.S. PATENT DOCUMENTS

| | | | |
|---|---|---|---|
| 2001/0036858 A1* | 11/2001 | McNutt | G06Q 30/02 463/25 |
| 2001/0044337 A1* | 11/2001 | Rowe | A63F 13/12 463/29 |
| 2002/0187834 A1* | 12/2002 | Rowe | G07F 17/32 463/42 |
| 2003/0109307 A1 | 6/2003 | Boyd | |
| 2003/0182209 A1* | 9/2003 | Ge | G06Q 30/02 705/15 |
| 2006/0287067 A1 | 12/2006 | White et al. | |
| 2007/0238527 A1 | 10/2007 | Zanfardino | |
| 2007/0239549 A1* | 10/2007 | LaFauci | G06Q 10/06 705/15 |
| 2008/0268931 A1 | 10/2008 | Alderucci et al. | |
| 2009/0048015 A1* | 2/2009 | Palmisano | G07F 17/3211 463/25 |
| 2009/0239667 A1* | 9/2009 | Rowe | G07F 17/32 463/42 |
| 2010/0113146 A1 | 5/2010 | Hendrick et al. | |
| 2011/0191114 A1* | 8/2011 | Bhagwan | G06Q 50/22 705/2 |
| 2012/0303431 A1* | 11/2012 | Phillips | G06Q 30/02 705/14.22 |
| 2013/0117135 A1 | 5/2013 | Riddiford et al. | |
| 2013/0317921 A1* | 11/2013 | Havas | G06Q 30/0633 705/15 |
| 2015/0087405 A1* | 3/2015 | George | G07F 17/3225 463/25 |

* cited by examiner

HOST ON DEMAND

| General Setup | Host Setup | Reports |
|---|---|---|

1902, 1904, 1906

Enter the port number used to send emails (Default is 587):
587

Enter the email that will be used to send the alerts (ex: myusername@email.com):

Enter the SMTP server for the email (ex: smtp.email.com):

Enter the username to log into the email account:

Enter the password to log into the email account:

Select the default language:
English

[Save]

HOST
ON DEMAND

| General Setup | Host Setup | Reports | |

Email ☑
Sms ☑
Printer ☑

Email to receive security alerts:

Phone number to receive security alerts (Numbers Only):

Service provider of phone:
[-Choose A Provider- ▼]
[Remove Provider]

Add A Provider (ex: @txt.att.net):

[Add Provider]

PRINTER

HOST ON DEMAND

| General Setup | Host Setup | Reports | |

Select the type of report:
[Calls ▼]

Start Date: [-Pick A Month- ▼] [-Pick A Day- ▼] [-Pick A Year- ▼]

End Date: [-Pick A Month- ▼] [-Pick A Day- ▼] [-Pick A Year- ▼]

[Filter Report] [Reset Filter]

| Date/Time ▼ | Player ID | Player Name | Machine Number | Bank |
|---|---|---|---|---|
| 2012-09-18 11:09:34 | | UNCARDED | 100085 | 01 |
| 2012-09-17 17:07:51 | | UNCARDED | 100085 | 01 |
| 2012-08-06 13:51:49 | 6523489 | Justin MacAuley | IGT_E654234 | 143 |
| 2012-08-06 13:51:04 | 3246543 | Joe Serra | IGT_E654234 | 143 |

SECURITY ON DEMAND

| General Setup | Security Setup | Medical Setup | Reports |

Enter the port number used to send emails (Default is 587):
`587`

Enter the email that will be used to send the alerts (ex: myusername@email.com):

Enter the SMTP server for the email (ex: smtp.email.com):

Enter the username to log into the email account:

Enter the password to log into the email account:

Select the default language:
`English ▼`

[ Save ]

SECURITY ON DEMAND

| General Setup | Security Setup | Medical Setup | Reports |

Email ☑
Sms ☑
Printer ☑

Email to receive security alerts:
[          ]

Phone number to receive security alerts (Numbers Only):
[          ]

Service provider of phone:
[-Choose A Provider-  ▼]
[Remove Provider]

Add A Provider (ex: @txt.att.net):
[          ]
[Add Provider]

PRINTER

SECURITY ON DEMAND

| General Setup | Security Setup | Medical Setup | Reports |

Email ☑
Sms ☑
Printer ☑

Email to receive medical alerts:
[                    ]

Phone number to receive medical alerts (Numbers Only):
[                    ]

Service provider of phone:
[-Choose A Provider-  ▼]
[ Remove Provider ]

Add A Provider (ex: @txt.att.net):
[                    ]

[ Add Provider ]

PRINTER

*FIG. 24*    2400

SECURITY ON DEMAND

| General Setup | Security Setup | Medical Setup | Reports |

Select the type of call:
[Both ▼]

Select the type of report:
[Calls ▼]

Start Date: [-Pick A Month- ▼] [-Pick A Day- ▼] [-Pick A Year- ▼]
End Date: [-Pick A Month- ▼] [-Pick A Day- ▼] [-Pick A Year- ▼]

[Filter Report] [Reset Filter]

| Date/Time ▼ | Player ID | Player Name | Type of Call | Machine Number | Bank |
|---|---|---|---|---|---|
| 2012-09-18 11:09:34 | | UNCARDED | Medical | 100085 | 01 |
| 2012-09-17 17:07:51 | | UNCARDED | Security | 100085 | 01 |
| 2012-08-06 13:51:49 | 6523489 | Justin MacAuley | Security | IGT_E654234 | 143 |
| 2012-08-06 13:51:04 | 3246543 | Joe Serra | Security | IGT_E654234 | 143 |

VALET ON DEMAND

| General Setup (2602) | Valet Setup (2604) | Reports (2606) |

Enter the port number used to send emails (Default is 587):
[587]

Enter the email that will be used to send the alerts (ex: myusername@email.com):
[ ]

Enter the SMTP server for the email (ex: smtp.email.com):
[ ]

Enter the username to log into the email account:
[ ]

Enter the password to log into the email account:
[ ]

Select the default language:
[English ▼]

[Save]

*FIG. 26*

VALET ON DEMAND

| General Setup | Valet Setup | Reports | |

Email ☑
Sms ☑
Printer ☑

Email to receive security alerts:
[          ]

Phone number to receive security alerts (Numbers Only):
[          ]

Service provider of phone:
[-Choose A Provider-  ▼]
[Remove Provider]

Add A Provider (ex: @txt.att.net):
[          ]

[Add Provider]

PRINTER

VALET
ON DEMAND

| General Setup | Valet Setup | Reports | |
|---|---|---|---|

Select the type of report:
[Calls ▼]

Start Date: [-Pick A Month- ▼] [-Pick A Day- ▼] [-Pick A Year- ▼]

End Date: [-Pick A Month- ▼] [-Pick A Day- ▼] [-Pick A Year- ▼]

[Filter Report] [Reset Filter]

| Date/Time ▼ | Player ID | Player Name | Machine Number | Bank |
|---|---|---|---|---|
| 2012-09-18 11:09:34 | | UNCARDED | 100085 | 01 |
| 2012-09-17 17:07:51 | | UNCARDED | 100085 | 01 |

[Save Report]

| PRIMARY CATEGORIES | SUB CATEGORIES | ITEMS |

+

DARK

FROZEN DRINKS

LIGHT

MIXED DRINKS

RED WINE

SHOTS

WHITE WINE

New Item Name
English
[EDIT HERE]
Spanish
[EDIT HERE]
Name of New Item.... — 3610

New Ticket Name
[EDIT HERE]
New Items Ticket Name... — 3620

New Item Description
English
[EDIT HERE]
Spanish
[EDIT HERE]
Description of New Item.... — 3630

New Item Required Condiment Groups
[--]
New Item Required Condiment Groups... — 3640

New Item Available Condiment Groups
[--]
New Item Available Condiment Groups — 3650

New Item Limit Tags
○ Non-Alcoholic - Limit: 10
○ Alcoholic - Limit 10
Limit Tags Set New Item Purchase Availability.... — 3660

New Item Pricing
[        ] Normal Price Level (Default)...
[        ]
New Item Pricing...    Tax Config  3680 — 3670

| LIMITS | |
|---|---|
| | |
| Non Alcoholic: Limit 10 | 🗒 |
| Alcoholic: Limit 10 | 🗒 |

| CONFIGURE | |
|---|---|
| DATABASE INFORMATION | |
| LANGUAGE | Add | Edit | |
| EGM TRANSLATIONS | |
| CURRENCY | |
| ITEM LIMIT PER ORDER | |
| TIME LIMIT BETWEEN ORDERS | |
| ORDER TIME OUT | |
| COMMENTS | |
| RECEIPT | |
| RECEIPT TRANSLATIONS | |

| |
|---|
| Header Line 1 |
| Header 1 |
| 50 Characters Max... |
| Header Line 2 |
| Header 2 |
| 50 Characters Max... |
| Header Line 3 |
| Header 3 |
| 50 Characters Max... |
| Patron Information Options |
| Player ID |
| Player's Age |
| Anniversary Date |
| Birthday Date |
| Class of Card |
| Card ID |
| Comp Balance |
| First Name |
| Last Name |
| Is Card Abandoned |
| Is Player's Anniversary |
| Is Player Banned |
| Is Player's Birthday |
| Player's Preferred Name |
| Rank ID |
| Rank Name |
| Options Pertaining to the Patron... |
| EGM Information Options |
| EGM ID |
| Machine Number |
| Location |
| Area |
| Zone |
| Bank |
| Position |
| Options Pertaining to the EGM... |
| Footer Line 1 |
| Footer 1 |
| 50 Characters Max... |
| Footer Line 2 |
| Footer 2 |
| 50 Characters Max... |

FIG. 48   —4800

BEVERAGE ON DEMAND

Casino Name
Address Line 1
Address Line 2

4902 { 10/17/2012  11:50:17 AM
Order Number :  0

4904 { Player Name: Player
EGM:  IGT_00012E29517A
Machine Number:  100085
Zone: ST12
Bank: 01

4906 { Tap Water ------------------------------------$0.00
   -EXTRA Ice

4908 { Tax:  $0.00
Total: $0.00

4910 { Comments:
BRING 2 STRAWS

Thank You!
Come Again!

| 5001 | 5003 | 5005 | 5007 |
|---|---|---|---|
| REPORTS | ORDER TRACKING | DELETE ORDERS | GENERATE REPORT |

Select Date: 2014 January 22 ▼

| Order No. | Player Card ID | Player Name | Date/Time |
|---|---|---|---|
| 70 | 1234566550003 | TWO PLAYER | 2014-01-22 15:22:43 |
| 69 | 1234566550003 | TWO PLAYER | 2014-01-22 14:34:21 |
| 68 | 1234566550003 | TWO PLAYER | 2014-01-22 14:30:02 |
| 67 | 1234566550003 | TWO PLAYER | 2014-01-22 14:20:10 |
| 66 | 1234566550003 | TWO PLAYER | 2014-01-22 13:39:55 |
| 65 | 1234566550003 | TWO PLAYER | 2014-01-22 11:43:53 |
| 64 | 1234566550003 | THREE PLAYER | 2014-01-22 09:15:51 |

Order No: 70
Date/Time: 2014-01-22 15:22:43
Player Name: TWO PLAYER
Player Card ID: 1234566550003
Location: ST1201
Bank No: 01
EGM ID: IGT_00012E29517A Newcastle 1.99

Tax 0.15
Total 2.14

Order Timed Out

| REPORTS | ORDER TRACKING | DELETE ORDERS | GENERATE REPORT |

Report Type: [Location ▼]
Start Date: [Select Month ▼] / [Select Day ▼] / [Select Year ▼]
End Date: [Select Month ▼] / [Select Day ▼] / [Select Year ▼]
[Apply Filter] [Reset Filter]                                    [Save Report]

| Location | Number Of Orders | Total Sales | Average Sales |
|----------|------------------|-------------|---------------|
| ST1201   | 30               | 70.62       | 2.35          |

| REPORTS | ORDER TRACKING | DELETE ORDERS | GENERATE REPORT |

Report Type: [Date ▼]
Start Date: [Select Month ▼] / [Select Day ▼] / [Select Year ▼]
End Date: [Select Month ▼] / [Select Day ▼] / [Select Year ▼]
[Apply Filter] [Reset Filter]                                    [Save Report]

| Date       | Number Of Orders | Total Sales | Average Sales |
|------------|------------------|-------------|---------------|
| 2014-01-15 | 3                | 6.42        | 2.14          |
| 2014-01-16 | 6                | 12.84       | 2.14          |
| 2014-01-17 | 13               | 34.24       | 2.14          |
| 2014-01-21 | 1                | 2.14        | 2.14          |
| 2014-01-22 | 7                | 14.98       | 2.14          |

| REPORTS | ORDER TRACKING | DELETE ORDERS | GENERATE REPORT |

Report Type: [Items ▼]
Start Date: [Select Month ▼] / [Select Day ▼] / [Select Year ▼]
End Date: [Select Month ▼] / [Select Day ▼] / [Select Year ▼]
[Apply Filter] [Reset Filter]                              [Save Report]

| Item Name | Number Of Items Sold | Total Sales |
|---|---|---|
| Budweiser | 24 | 47.76 |
| Coors | 1 | 1.99 |
| Newcastle | 7 | 13.93 |
| Stella | 1 | 1.99 |

| REPORTS | ORDER TRACKING | DELETE ORDERS | GENERATE REPORT |

Report Type: [Player ▼]
Start Date: [Select Month ▼] / [Select Day ▼] / [Select Year ▼]
End Date: [Select Month ▼] / [Select Day ▼] / [Select Year ▼]
[Apply Filter] [Reset Filter]                              [Save Report]

| Player Card ID | Player Name | Number Of Orders | Total Sales | Average Sales |
|---|---|---|---|---|
| 123456650005002 | TWO PLAYER | 6 | 12.84 | 2.14 |
| 123456650005002 | THREE PLAYER | 2 | 4.28 | 2.14 |
| 123456650005002 | FOUR PLAYER | 22 | 53.50 | .43 |

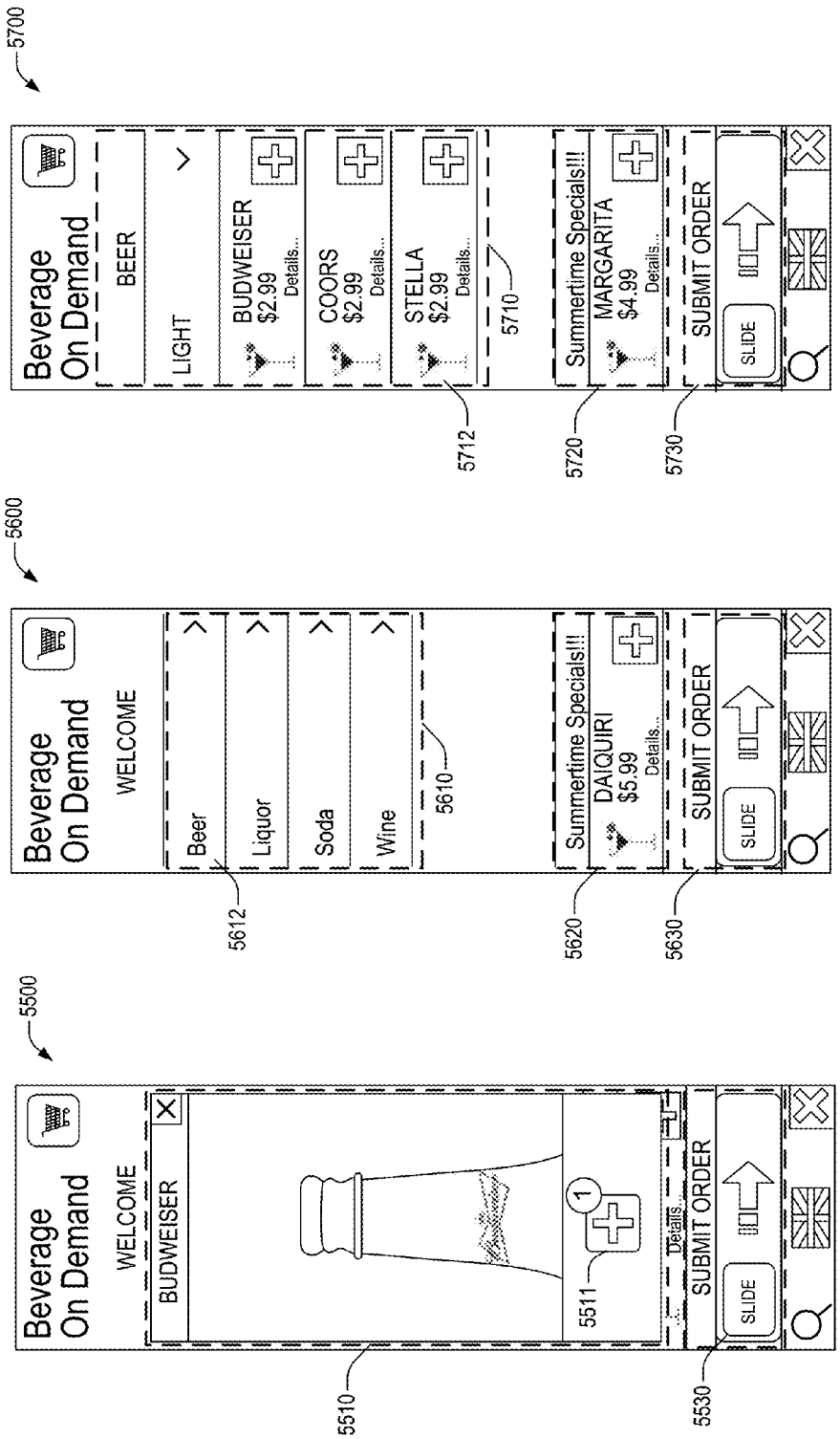

ENHANCED ON-DEMAND SERVICE FUNCTIONALITY IMPLEMENTED IN CASINO GAMING NETWORKS

RELATED APPLICATION DATA

The present application claims benefit, pursuant to the provisions of 35 U.S.C. §119, of U.S. Provisional Application Ser. No. 62/116,726, titled "ENHANCED PLAYER SUITE FUNCTIONALITY IMPLEMENTED IN CASINO GAMING NETWORKS", naming Washington et al. as inventors, and filed 16 Feb. 2015, the entirety of which is incorporated herein by reference for all purposes.

BACKGROUND

The present disclosure generally relates to business transactions and services conducted at casino gaming establishments. More particularly, the present disclosure relates to techniques for implementing enhanced on-demand service functionality in casino gaming networks.

DETAILED DESCRIPTION OF EXAMPLE EMBODIMENTS

Overview

Figure 1:
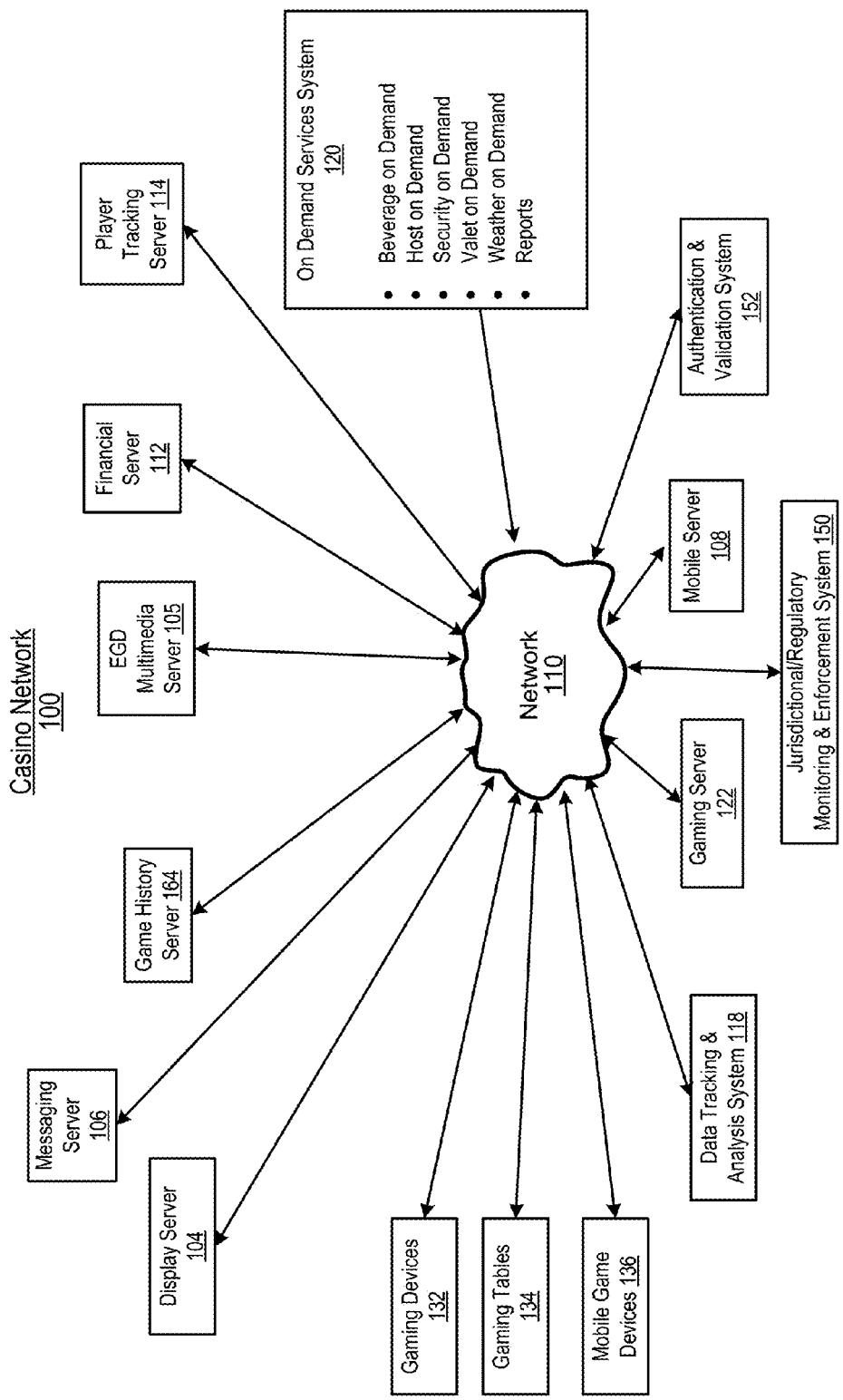
FIG. 1 illustrates a simplified block diagram of a specific example embodiment of a Casino Network 100 which may be configured or designed to implement various On Demand Service(s) and feature(s) described and/or referenced herein.

Various aspects described or referenced herein are directed to different methods, systems, and computer program products for implementing On Demand Services in Casino gaming establishments utilizing a Communications Network.

One aspect disclosed herein is directed to different methods, systems, and computer program products for implementing On Demand Services in a casino gaming network, the casino gaming network including a first electronic gaming device communicatively coupled to the casino gaming network, the first electronic gaming being configured to enable a first patron to engage in first wager-based game at the first electronic gaming device, the first electronic gaming device including a first display and a first input interface. In at least one embodiment, an On-Demand Services System ("ODS System") may be communicatively coupled to the first electronic gaming device via the casino gaming network. In at least one embodiment, various method(s), system(s) and/or computer program product(s) may be operable to cause at least one processor to execute a plurality of instructions for: causing a first On-Demand Services graphical user interface ("ODS GUI") to be displayed at the first display of the first EGM; the first ODS GUI being configured or designed to enable the first patron to interact with the first ODS GUI via the first input interface; the first ODS GUI being configured or designed to enable the first patron to access a first set of On Demand Services via interaction with the first ODS GUI; the first ODS GUI being configured or designed to enable the first patron to submit to the ODS System, via interaction with the first ODS GUI, a first ODS order relating to a first On Demand Service; causing at least one component of the ODS System to generate and send a first set of information relating to the first ODS order to a first casino entity for handling fulfillment of the first ODS order; causing at least one component of the ODS System to automatically track a current status of the first ODS order; and causing at least one component of the ODS System to provide user access to real-time status information relating to the current status of the first ODS order.

In at least one embodiment, the first set of On Demand Services includes: Beverage On Demand (BOD) Service; Host On Demand (HOD) Service; Valet On Demand (VOD) Service; Security On Demand (SOD) Service; and Weather On Demand (WOD) Service.

In at least one embodiment, the first On Demand Service corresponds to a Beverage On Demand (BOD) Service; the first ODS order includes an order for a first beverage item; and the first casino entity corresponds to a first bar of the casino. In at least one embodiment, various method(s), system(s) and/or computer program product(s) may be further operable to cause at least one processor to execute additional instructions for: causing at least one component of the ODS System to automatically monitor a current status of ODS orders assigned to be handled by the first bar; and causing at least one component of the ODS System to provide user access to real-time status information relating to the current status of selected ODS orders assigned to be handled by the first bar.

In at least one embodiment, various method(s), system(s) and/or computer program product(s) may be further operable to cause at least one processor to execute additional instructions for: causing at least one component of the ODS System to determine a current location of the first patron; causing at least one component of the ODS System to identify of a first casino waitstaff who has been assigned to deliver the first ODS order to the first patron; and causing at least one component of the ODS System to automatically notify the identified casino waitstaff of the current location of the first patron.

In at least one embodiment, the first On Demand Service corresponds to a Beverage On Demand (BOD) Service; the first ODS order includes an order for a first beverage item; and the first casino entity corresponds to a first bar of the casino. In at least one embodiment, various method(s), system(s) and/or computer program product(s) may be further operable to cause at least one processor to execute additional instructions for: causing at least one component of the ODS System to determine a current location of the first patron; causing at least one component of the ODS System to identify of a first casino waitstaff who has been assigned to deliver the first ODS order to the first patron; and causing at least one component of the ODS System to automatically notify the identified casino waitstaff of the current location of the first patron.

In at least one embodiment, the first On Demand Service corresponds to a Beverage On Demand (BOD) Service; the first ODS order includes an order for a first food item; and the first casino entity corresponds to a first restaurant of the casino. In at least one embodiment, various method(s), system(s) and/or computer program product(s) may be further operable to cause at least one processor to execute additional instructions for: causing at least one component of the ODS System to automatically monitor a current status of ODS orders assigned to be handled by the first restaurant; and causing at least one component of the ODS System to provide user access to real-time status information relating to the current status of selected ODS orders assigned to be handled by the first restaurant.

In at least one embodiment, various method(s), system(s) and/or computer program product(s) may be further operable to cause at least one processor to execute additional instructions for: causing at least one component of the ODS System to automatically monitor a current status of multiple different ODS orders assigned to be handled by the first casino entity; and causing at least one component of the ODS System to provide user access to real-time status information relating to the current status of selected ODS orders assigned to be handled by the first casino entity.

In at least one embodiment, the On Demand Services System may include functionality for enabling authorized personnel to fully customize and configure On Demand Services menus, sub-menus, and related GUIs. In at least one embodiment, the ODS Menu Manager Application enables authorized users (such as, for example, Casino Management and/or Food & Beverage Directors) to access, edit, customize, and/or modify selected On Demand Service application(s) menus, sub-menus and GUIs (e.g., BOD, HOD, SOD, VOD, WOD, Reports, etc.). In at least one embodiment, such authorized personnel may use the ODS Menu Manager Application to implement desired configurable updates and/or changes to one or more of the On Demand Service application(s) menus, sub-menus and GUIs, to thereby fully customize the services, features, and content provided by the On Demand Services System in a manner which conforms with the specific needs and/or desires of each individual property (e.g., casino property).

Unlike many of today's Casino-based POS systems, the On Demand Services System of the present application may be configured or designed to provide functionality for allowing Casino managers (e.g., Food/Beverage managers, Valet managers, Host managers, Security managers, etc.) to continuously and/or periodically monitor, update, rearrange, remove, export, import, sort, itemize, track, date, locate, and/or deploy their entire menu system in a matter of seconds (e.g., in real-time). Additionally, the On Demand Services System may be configured or designed to enable On Demand Services menus to be dynamically populated, configured and/or modified on the fly (e.g., in real-time), without having to bring down or halt the gambling system/slot machine interface(s).

Another unique and advantageous feature of the presently described On Demand Services System relates to the system's ability to automatically track (e.g., in real-time) orders which have been submitted to the On Demand Services System, and to provide real-time status updates about the current status of all (or selected) orders which have been submitted to the On Demand Services System. Another advantageous feature is the system's ability to provide casino personnel (and/or other authorized personnel) with access to real-time status information relating to specific orders and/or specific types of orders (e.g., pending orders, new orders, delivered orders, canceled orders, delayed orders, complementary orders, etc.).

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Casino's and gambling are a proven billion dollar industry. The waitstaff alone bring in millions of dollars annually. However, with all this success and money coming in the doors, there still remain significant untapped market opportunities that may bring in even more revenue for the casino. For example, one such untapped market opportunity relates to patrons seated at gaming machines who are "looking for the drink girl." In today's fast paced world, patrons of gaming establishments tend to be impatient, and generally dislike having to wait for a server to "hopefully stroll by." They want their needs/desires attended to, and in an expeditious and timely manner. However, given the casinos limited resources, it is generally difficult for casino patrons to obtain timely service. This issue is particularly problematic in specific areas of the casino such as, for example, the low-wager play zones of the casino. For example, a lone gambler occupying a seat at a gaming machine in a low-wager play zone may be forced to wait an undesirably long time for a server to come by and attend to the patron's order. Moreover, other types casino services (such as, for example, security, valet, medical aid, etc.) are neither easily accessible nor timely available to such patrons.

In an effort to address at least some of these issues, various On-Demand Service (ODS) techniques and features are described herein for providing casino patrons with instant, real-time access to selected casino services via use of the casino's electronic gaming machine display(s) and interface(s). For example, as described in greater detail herein, a casino network may be communicatively coupled to an On Demand (ODS) System which is configured or designed to provide various types of On Demand Services such as, for example, one or more of the following (or combinations thereof): Beverage On Demand (BOD) service(s) (e.g., which may include services for food and/or beverages), Host On Demand (HOD) service(s), Security On Demand (SOD) service(s), Valet On Demand (VOD) service(s), Weather On Demand (WOD) service(s), Menu Manager (MMR) service(s), AppSite service(s), etc. According to different embodiments, such On Demand Services may be implemented at Casino establishments and/or other wager-based (and/or non-wager based) gaming establishments via one or more communications networks.

Unlike many of today's Casino-based POS systems, the On Demand Services System of the present application may be configured or designed to provide functionality for allowing Casino managers (e.g., Food/Beverage managers, Valet managers, Host managers, Security managers, etc.) to continuously and/or periodically monitor, update, rearrange, remove, export, import, sort, itemize, track, date, locate, and/or deploy their entire menu system in a matter of seconds (e.g., in real-time). Additionally, the On Demand Services System may be configured or designed to enable On Demand Services menus to be dynamically populated, configured and/or modified on the fly (e.g., in real-time), without having to bring down or halt the gambling system/slot machine interface(s).

By way of example, an On Demand Services System may be integrated into an existing casino gaming network such as, for example, The Cosmopolitan Casino in Las Vegas, Nev. In this particular example, it may be assumed that "Lobster Appetizer" may be a food item which is occasionally offered as part of the Beverage On Demand (BOD) service. However, in this particular example, it may initially be assumed that the "Lobster Appetizer" is currently unavailable at the Casino due to lack of inventory/supply. Consequently, in at least one embodiment, the On Demand Services System may dynamically detect this current lack of inventory/supply of lobster, and may automatically and dynamically respond by updating the BOD service menu(s) to show that the Lobster Appetizer is currently unavailable. In some embodiments, a Food/Beverage manager may elect to access the BOD service menu configuration interface to manually update the BOD service menu(s) to show that the Lobster Appetizer is currently unavailable. Subsequently, a delivery of lobster may arrive at the Casino and the details of the lobster delivery (e.g., quantity, weight, price, etc.) may be entered (e.g., either automatically or manually) into the Casino's inventory system. In one embodiment, the On Demand Services System may automatically detect the updated availability of lobster in the inventory system, and in response, may automatically and dynamically update the BOD service menu(s) to show that the Lobster Appetizer is currently available. Accordingly, within a matter of moments from detecting the availability of lobster in the Casino inventory, the Lobster Appetizer menu item may be made available for ordering by a patron, for example, via a BOD Service Menu GUI (e.g., 1024, FIG. 10; 1124, FIG. 11) of an electronic gaming machine (EGM). Moreover, in at least some embodiments, this may be accomplished without having to interrupt, halt, or otherwise interfere with the EGM's current operation(s)/activitie(s). Next, let's assume that the lobster delivery was a small shipment, and that the entirety of available lobster supply is sold out within twenty minutes. Just as quickly and seamlessly as the Lobster Appetizer was added (or made available for ordering) as BOD Service Menu item, this menu item may be dynamically removed (or made unavailable for ordering) via the On Demand Services System in response to detecting that the identified menu item (or at least one ingredient of the identified menu item, such as lobster) is no longer available.

In some embodiments, the On Demand Services System may automatically analyze the details of the currently available supply of lobster, dynamically determine or estimate the quantity of available Lobster Appetizers which may be available for order (e.g., based on current supply and existing orders in queue), and dynamically track and update the BOD service menu(s) to show the estimated number of Lobster Appetizers which are currently available to be ordered. In some embodiments, if a food or beverage item is determined to be in short supply, the On Demand Services System may automatically and dynamically impose ordering restrictions on such identified items (such as, for example, by limiting a patron to a maximum of 2 orders of a given food/beverage item which is in short supply).

On Demand Services Components, Systems, Sub-Systems

Figure 10:
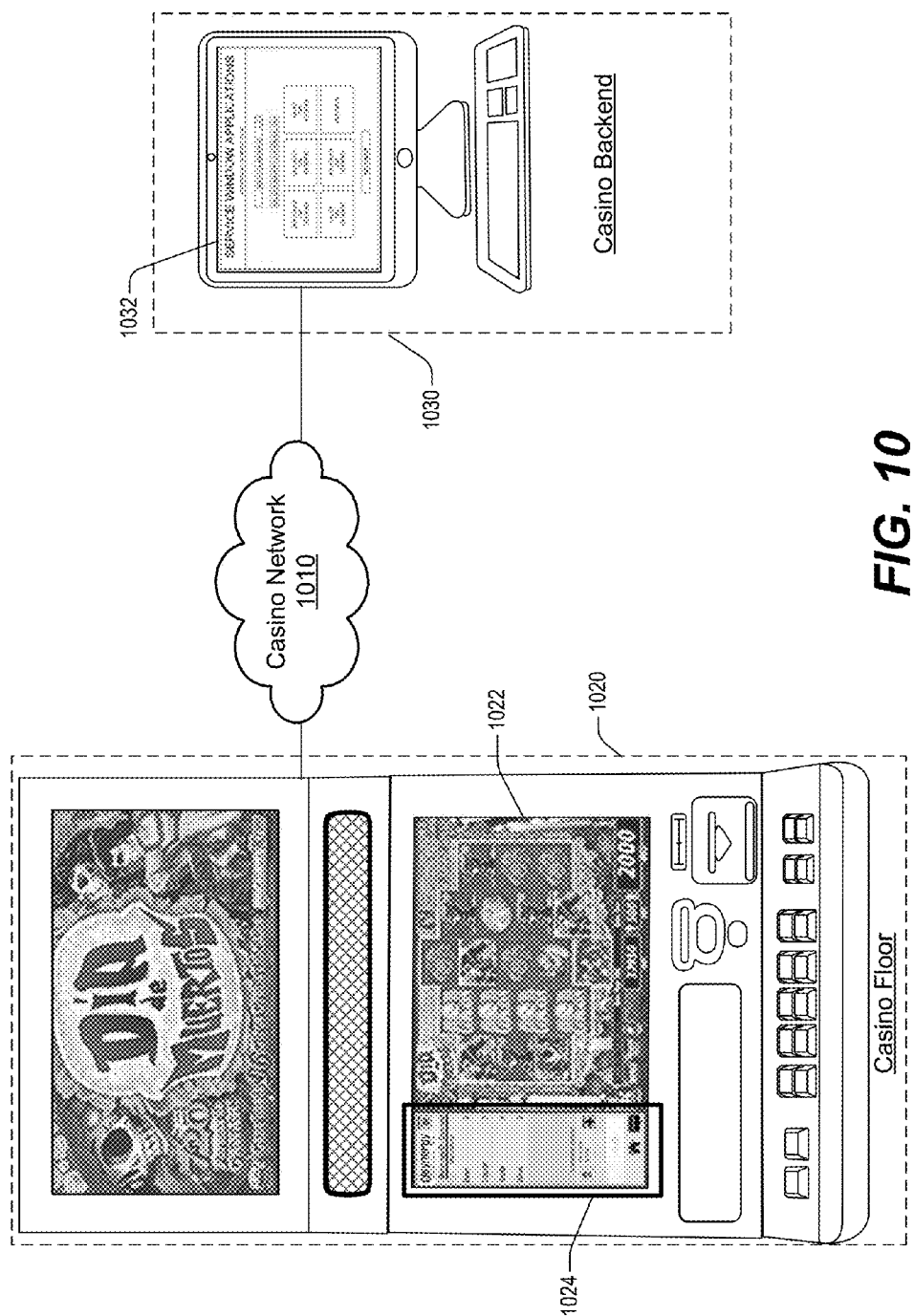
FIGS. 10-64 illustrate various system diagrams, procedural flows, GUIs, and screenshots relating to various aspects of the On Demand Services techniques described herein.
Figure 64:
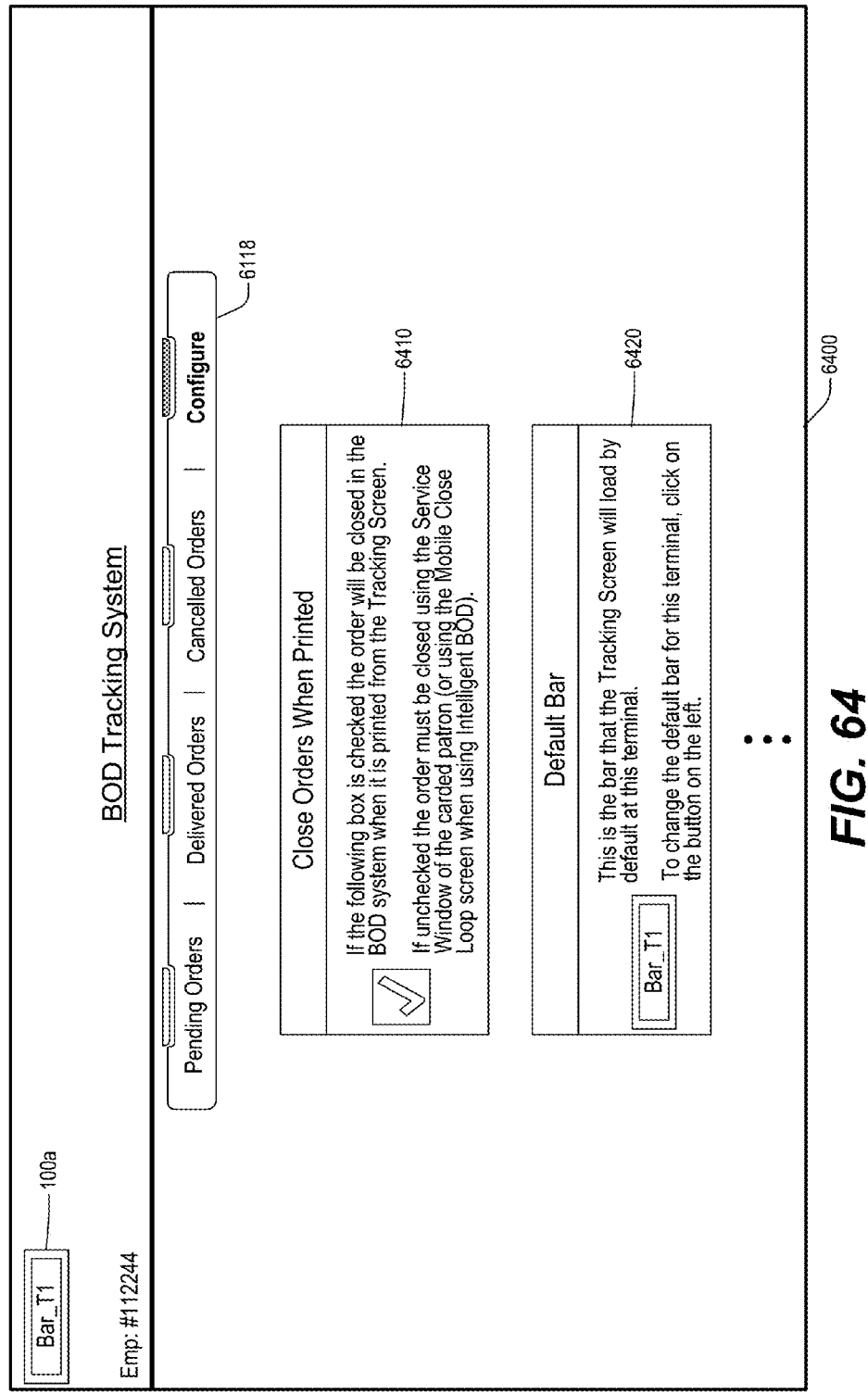

FIGS. 10-64 illustrate various system diagrams, procedural flows, GUIs, and screenshots relating to various aspects of the On Demand Services described herein.

FIG. 10 shows an example portion of a casino network 1010 which includes an electronic gaming machine (EGM 1022) deployed at the casino floor 1020 (e.g., serving as a front-end system for providing On Demand Services to casino patrons), and including one or more backend displays 1032 deployed at the Casino's backend system 1030. In the specific example embodiment of FIG. 10, the EGM 1022 is configured or designed to display vertical-oriented On Demand Service window menu GUIs (e.g., 1024), which are configured or designed to provide players/patrons with access to various types of On Demand Services. Examples of different vertical-oriented On Demand Service window menu GUIs which may be displayed via the EGM's display are illustrated in FIGS. 12-16. Additionally, as illustrated in the example embodiment of FIG. 10 the backend system display 1032 is shown displaying a Menu Manager GUI such as that illustrated and described in greater detail with respect to FIG. 17.

Figure 11:
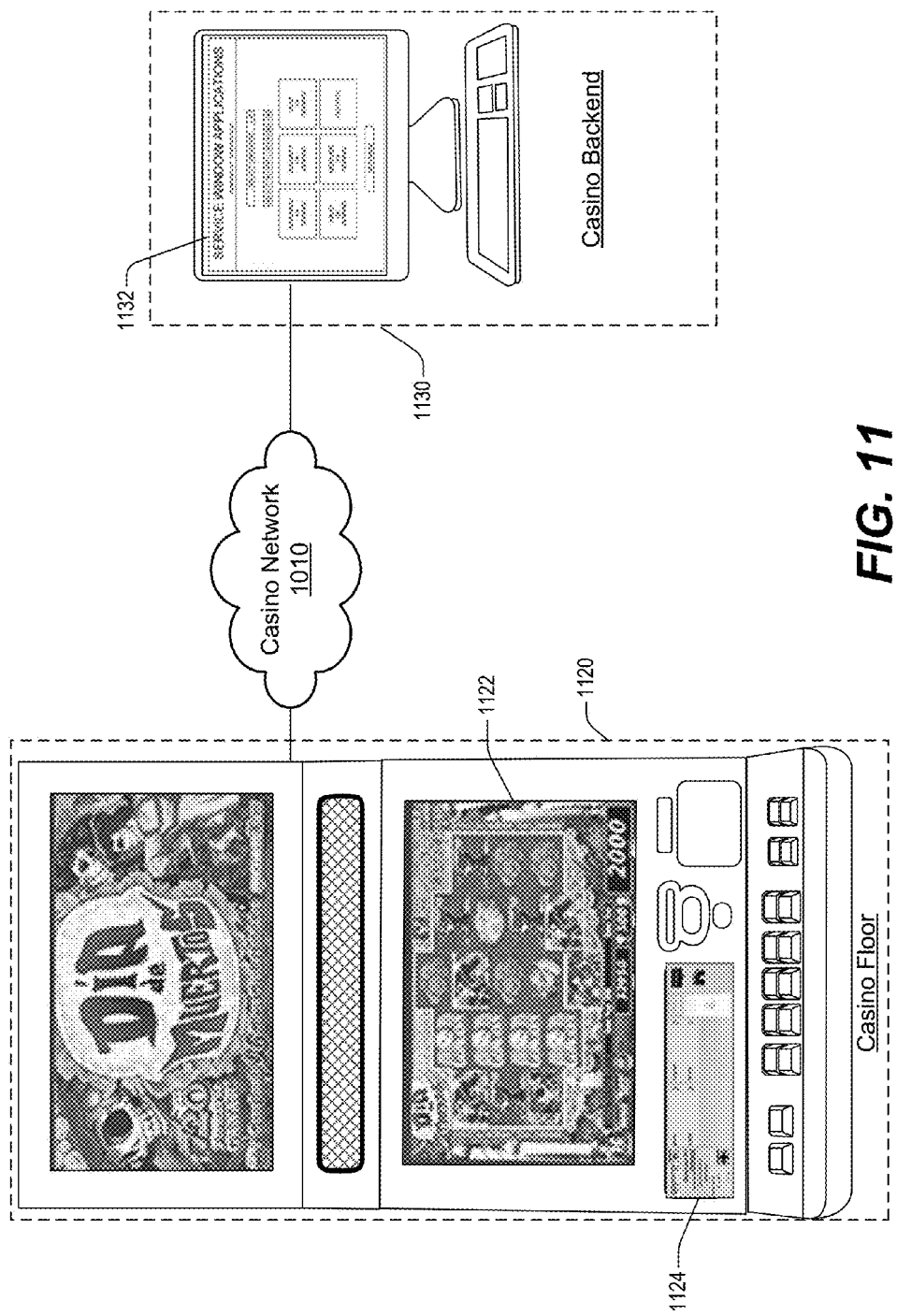

FIG. 11 shows an example portion of a casino network 1010 which includes an electronic gaming machine (EGM 1122) deployed at the casino floor 1120 (e.g., serving as a front-end system for providing On Demand Services to casino patrons), and including one or more backend displays 1132 deployed at the Casino's backend system 1130. In the specific example embodiment of FIG. 11, the EGM 1122 is configured or designed to display horizontal-oriented On Demand Service window menu GUIs (e.g., 1124), which are configured or designed to provide players/patrons with access to various types of On Demand Services.

According to different embodiments, the On Demand Services System may be configured or designed to host a plurality of different interfaces (e.g., electronic menus, GUIs, applications, etc., some or all of which may be individually enabled/disabled) that provide a dynamic and fully configurable patron services suite. Examples of some of the various interfaces/applications may include, but are not limited to, one or more of the following (or combinations thereof):

Beverage On Demand® (BOD) Service menu(s)/interface(s), as illustrated, for example, in FIGS. 12, 30-49, 55-59.

Host On Demand® (HOD) Service menu(s)/interface(s), as illustrated, for example, in FIGS. 13, 19-21.

Security On Demand® (SOD) Service menu(s)/interface(s), as illustrated, for example, in FIGS. 14, 22-25.

Valet On Demand® (VOD) Service menu(s)/interface(s), as illustrated, for example, in FIGS. 15, 26-28.

Figures 15, 16:
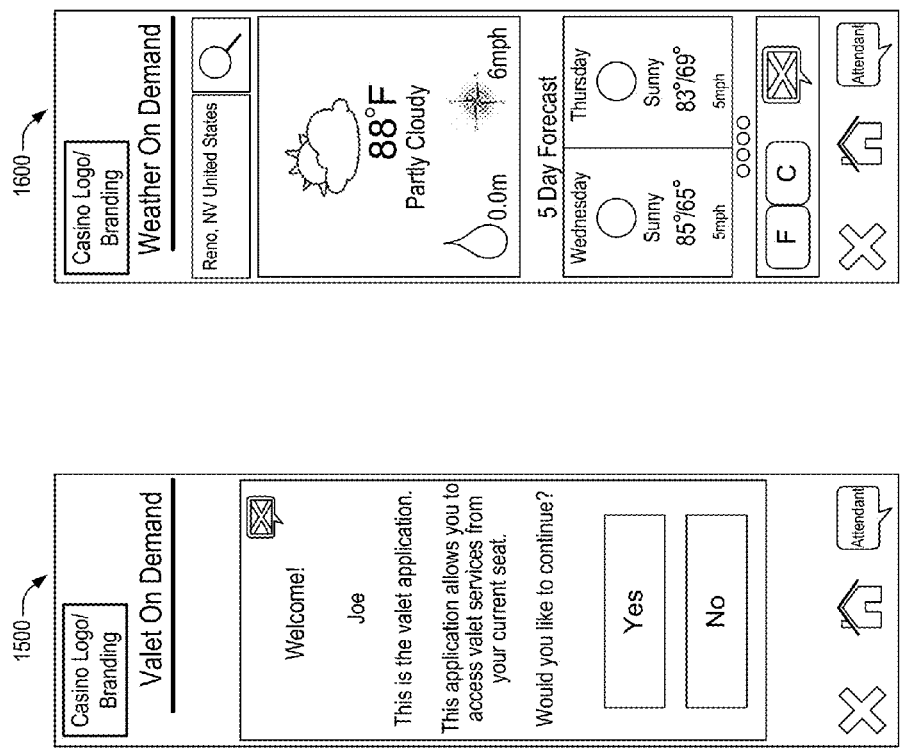
Figure 29:
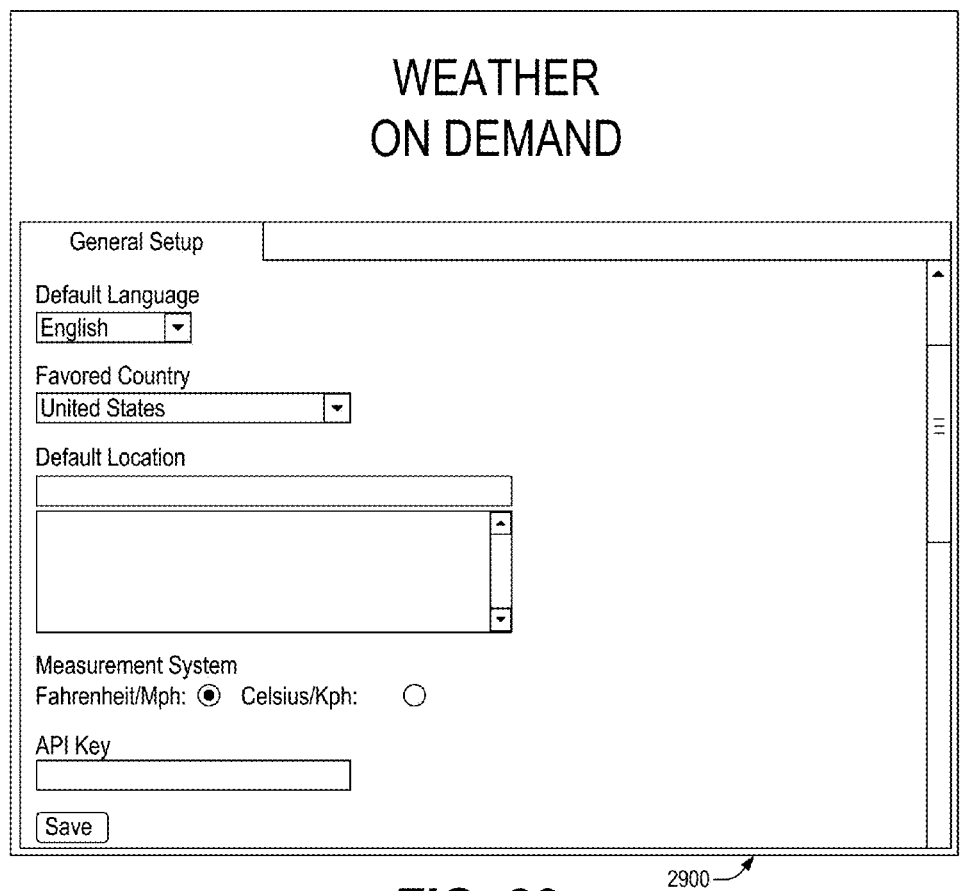

Weather On Demand® (WOD) Service menu(s)/interface(s), as illustrated, for example, in FIGS. 16, 29.

Reports & Data Analytics Application(s), as illustrated, for example, in FIGS. 50-54.

Figure 17:
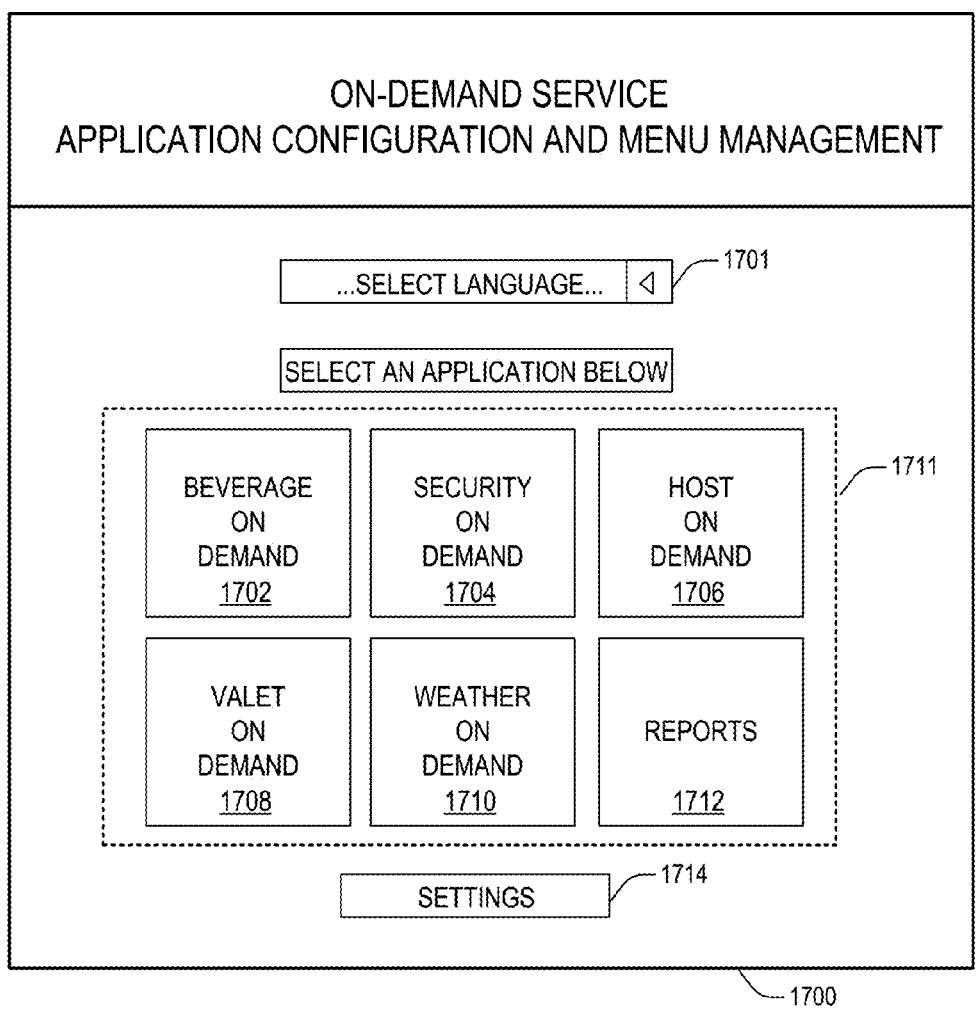
Figure 18:
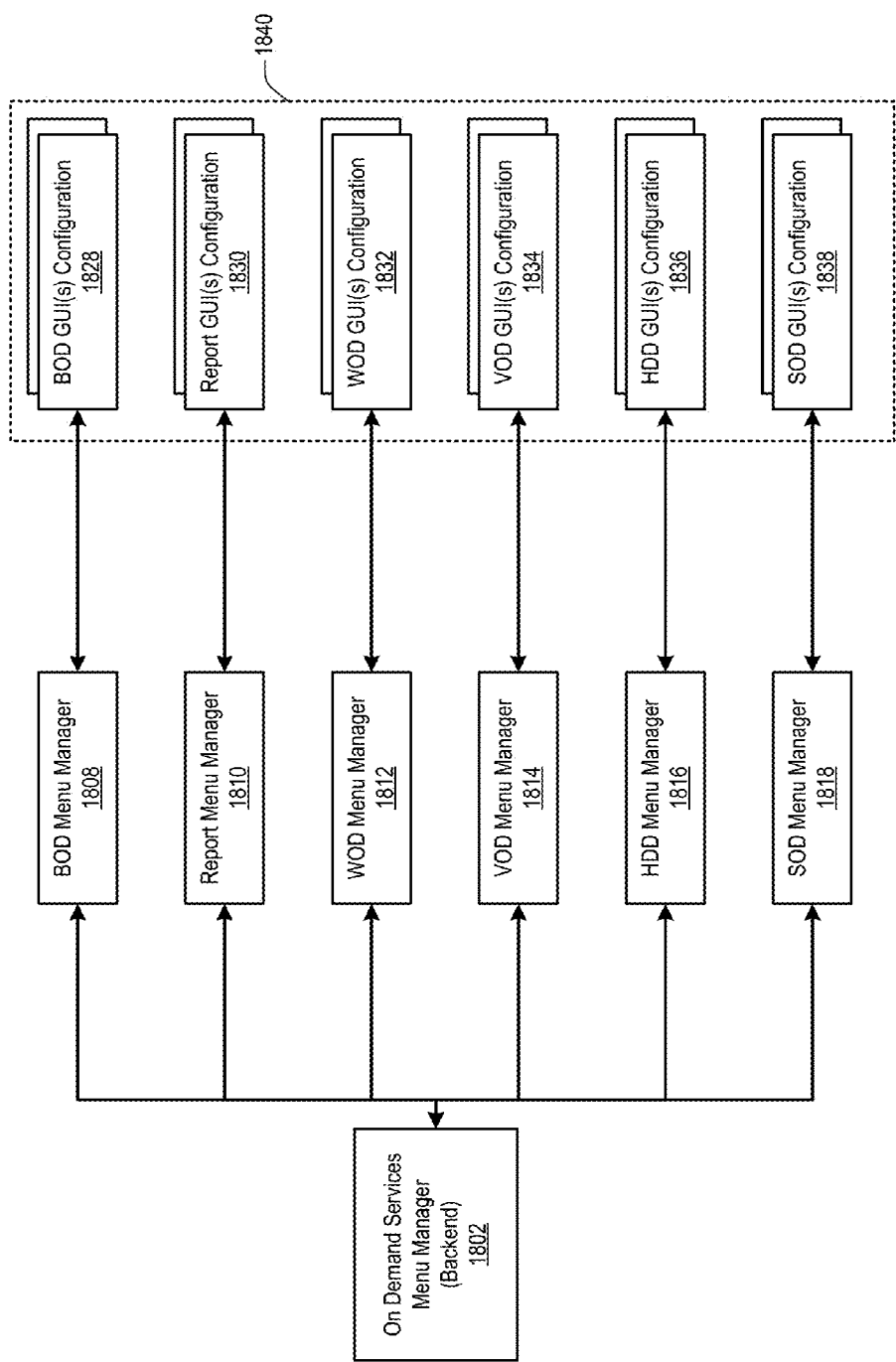

On-Demand Service Application Configuration and Menu Management Application(s), as illustrated, for example, in FIGS. 17, 18.

Windows Services.

Etc.

In at least one embodiment, the On-Demand Service Application Configuration and Menu Management Application (also referred to herein as the "ODS Menu Manager" Application or the "AppSite" Application) may be configured or designed to include functionality for enabling authorized personnel to fully customize and configure On Demand Services menus, sub-menus, and related GUIs. In at least one embodiment, the ODS Menu Manager Application enables authorized users (such as, for example, Casino Management and/or Food & Beverage Directors) to access, edit, customize, and/or modify selected On Demand Service application(s) menus, sub-menus and GUIs (e.g., BOD, HOD, SOD, VOD, WOD, Reports, etc.). In at least one embodiment, such authorized personnel may use the ODS Menu Manager Application to implement desired configurable updates and/or changes to one or more of the On Demand Service application(s) menus, sub-menus and GUIs, to thereby fully customize the services, features, and content provided by the On Demand Services System in a manner which conforms with the specific needs and/or desires of each individual property (e.g., casino property).

According to different embodiments, the ODS Menu Manager Application may be configured or designed to run as a local application, a remote application, and/or as a website or webpage based interface that ties into present day gambling/player management systems.

FIG. 18 shows an example embodiment illustrating of a portion of an On Demand Services System architecture, illustrating how the ODS Menu Manager Application may be configured or designed to function as an admin management hub for managing On Demand products and services. As illustrated in the example embodiment of FIG. 18, an On Demand Services Menu Manager 1802 may be implemented at server (e.g., a backend casino server of the casino's gaming network), and may be configured or designed to interface with various On Demand Services Manager components (e.g., BOD Menu Manager 1808, Report Menu Manager 1810, WOD Menu Manager 1812, VOD Menu Manager 1814, HDD Menu Manager 1816, SOD Menu Manager 1818, etc.), each of which may be configured or designed to include functionality for enabling a user (e.g., authorized administrators, Casino Management personnel, ODS Directors, etc.) to configure, access, edit, customize, and/or modify selected On Demand Service application(s) menus, sub-menus, GUIs, and/or related content (e.g., 1840).

FIG. 17 shows an example screenshot of a ODS Menu Manager Application GUI 1700 which has been configured or designed to provide authorized users with access to various On Demand applications, services, products, and their related menu interfaces, content, and features, including, for example, one or more of the following (or combinations thereof):

- BOD—"Beverage On Demand®" 1702 applications, services, products, and related settings, menu interfaces, content, and features. In at least one embodiment, the BOD Services Application may be configured or designed to provide functionality for enabling a patron to order selected items of food, beverages, and/or merchandise via interaction with one or more ODS interfaces which are presented to the patron via an EGM display. In at least one embodiment, the BOD Services Application may also be configured or designed to provide functionality for enabling the patron to pay for ordered items of food, beverages, and/or merchandise via interaction with one or more ODS interfaces which are presented to the patron via the EGM display.
- HOD—"Host On Demand®" 1706 applications, services, products, and related settings, menu interfaces, content, and features. In at least one embodiment, the HOD Services Application may be configured or designed to provide functionality for enabling a patron to contact a Casino Host, and/or to request/order selected Host Service(s)/Product(s) via interaction with one or more ODS interfaces which are presented to the patron via an EGM display. Such functionality provides a more personalized approach as compared to the patron pressing a generic "attendant" button. In at least one embodiment, the patron's EGM location/information is sent to a designated host, VIP host and/or concierge via a set of configurable rules, attributes and/or criteria setup via the ODS Menu Manager Application.
- SOD—"Security On Demand®" 1704 applications, services, products, and related settings, menu interfaces, content, and features. In at least one embodiment, the SOD Services may be configured or designed to provide functionality for enabling a patron to contact a security official and/or a medical aid representative. the patron's EGM location/information is sent to a designated security and/or medical advisor via a set of configurable rules, attributes and/or criteria setup within the ODS Menu Manager Application.
- VOD—"Valet On Demand®" applications, services, products, and related settings, menu interfaces, content, and features. In at least one embodiment, the VOD Services may be configured or designed to provide functionality for enabling a patron to contact the valet services and notify of an estimated arrival time to have one's vehicle ready before they arrive at the vehicle pickup location.
- WOD—"Weather On Demand®" 1710 applications, services, products, and related settings, menu interfaces, content, and features.
- Reports & Data Analytics 1712 applications, services, products, and related settings, menu interfaces, content, and features.
- ODS Menu Manager Application settings 1714 and related menu interfaces, content, and features.
- Etc.

In at least some embodiments, the On Demand Services System may be implemented as a secure network that may be comprised of numerous devices, cables, and software packages that manage information tracking between gaming machines and house/backend servers/player management/storage locations. In some embodiments, the On Demand Services System may display data to the patron, and receive input from the patron, via a gaming device (or mobile device) display and input interface. In at least one embodiment, the On Demand Services System sends received user input (as well as other data) to the backend systems via regulated messaging protocols (e.g., S2S). For example, in one embodiment, a patron may submit an order via an interactive button of the BOD Service menu, which, in turn, sends the order data to the backend system, whereupon one or more automated processes may process and deploy the order data to the appropriate bar/grill/location to be handled by the waitstaff.

Aspects of the On Demand Services functionality may be implemented as an enhanced "Intelligent" Point Of Sale (POS) system that is specifically configured or designed for implementation/use at casino (or wager-based) gaming machines and/or mobile device(s) located at the casino property. In some embodiments, one or more of the On Demand Service menu GUI(s) may be configured or designed to be presented at an EGM via the EGM's primary display (e.g., 1022, FIG. 10), and/or one or more auxiliary displays (e.g., 1124, FIG. 11). In some embodiments, one or more of the On Demand Service menu GUI(s) may be configured or designed to be presented at an EGM via use of PIP "picture in picture" technology (e.g., NexGen, Service Window etc.), as found, for example, in some of IGT's, Bally's, Aristocrat, and Leap Forward Gaming's (iView/displayManager) gaming machines.

As described in greater detail herein, the various features and functions of the On Demand Services technology provides powerful and unmatched POS flexibility for any casino environment that may be manipulated in real time (e.g., via automated processes, and/or via manual processes) while enabling one to modify the usability and layout of selected EGM interface(s) from the backend system and to upload such modifications to the floor EGMs nearly instantaneously (e.g., in real-time), all of which may be implemented without having to interrupt, halt, or otherwise interfere with the current operation(s)/activitie(s) at the floor EGMs. Additionally, by incorporating flexible design, the POS functionality of the On Demand Services System may function on any resolution screen across multiple brands of devices.

Further, the On Demand Services System may be configured or designed to seamlessly integrate with existing Casino networks and systems. For example, in at least one embodiment, the On Demand Services System may be configured or designed to seamlessly integrate with existing casino food & beverage systems (e.g., Infogenesis, Micros), and may be configured or designed to include automated functionality for rapidly and efficiently importing existing/current/pre-built menu's into the On Demand Services System's own database system.

In at least some embodiments, the On Demand Services System may be configured or designed to include or provide additional features/functionality such as, for example:

- Remembering patrons' favorite orders.
- Tracking player locations (e.g., via player tracking card in/card out).
- Notifying waitstaff of patron relocation (e.g., in real-time).
- Tracking, analyzing, generating detailed analytics and reports (e.g., promotional orders, how many clicks, how long viewed, how many ordered, real-time order status tracking, etc.).
- Generating desired heat maps.
- Providing mobile device compatibility.

Dynamically managing, modifying, monitoring, and configuring various aspects of On Demand Service(s) such as, for example, serving periods, bar locations, printer ports, default and preferred locations for both printers and bars, waitstaff monitoring, closed loop functionality, On Demand Service menu(s) (Admin/Backend side, EGM side, Mobile, etc.), etc.

Etc.

Thus, in at least one embodiment, the On Demand Services System provides an unprecedented trackable overview of casino/patron/staff interactions, transactions, and analytics. Moreover, some or all of these features (as well as others not listed) may be implemented in a manner which avoids (or does not require) interrupting patron gameplay and/or wagering events. Thus, for example, in at least one embodiment, a patron may literally be gambling with one hand and ordering and/or requesting services with the other hand.

As described in greater detail herein, the various On Demand features and functionality may provide a number of advantages and/or benefits which, for example, may include, but are not limited to, one or more of the following (or combinations thereof):

No more waiting to get what you want while at a gaming machine.

No more "having to sit in a populated zone" to get service.

No more waiting in the valet line. Live like a VIP, and have your car ready when you step out the casino doors.

Enjoy the comfort of knowing security and/or medical personnel may be available at the touch of a button.

BOD, HOD, SOD, VOD, and/or WOD services are easily available and accessible via casino gaming machines and/or other devices.

Can't see outside—how's the weather? No worries, you don't have to wait to find that out either. Simply access desired weather information at the gaming machine via the WOD Service.

The On Demand Services technology described herein provides the new age & technological foundation that may turn the "demographic tables" in a positive and more prosperous direction by allowing players to access current amenities that are found throughout some or all of the latest and greatest websites and applications familiar in common day to day lifestyles.

And/or other benefits, features, and advantages described and/or referenced herein.

FIGS. 12-16 illustrate example screenshots of various ODS graphical user interfaces (herein referred to as "Patron ODS Menu GUIs") which may be presented to patrons via EGM displays (and/or mobile device displays), and configured or designed to enable the patron to access and/or initiate orders/requests for selected On Demand Services and/or products. In at least one embodiment, the example Patron ODS Menu GUIs illustrated in FIGS. 12-16 represent examples of interactive ODS menus which may be accessed by casino patrons via a portion of an EGM display such as, for example, EGM display portion 1024 of FIG. 10. While the example Patron ODS Menu GUIs of FIGS. 12-16 are configured or designed to be displayed in a vertical (e.g., portrait) orientation, in other embodiment, one or more Patron ODS Menu GUIs may be configured or designed to be displayed in a horizontal (e.g., landscape) orientation, as shown, for example, at 1124 of FIG. 11.

In at least some embodiments, the On Demand Services may initially be accessed by patron interaction with a "Service" button commonly found on most gaming machines. In one embodiment, pressing the "Service" button causes an interactive ODS Menu GUI to be displayed (e.g., at a PIP region of the primary EGM display, as illustrated, for example, at 1024, FIG. 10). According to different embodiments, the interactive ODS Menu GUI may be configured or designed to be compatible with multiple resolutions to accommodate a plurality of gaming machines and their unique resolutions and PIP configurations. In some embodiments, the one or more ODS Services Menu GUIs may be displayed via one or more secondary display devices at the EGM (such as, for example, NexGen, NexGenII, iView, & displayManager), thereby allowing the ODS Services Menu GUIs to be concurrently displayed at the EGM without interfering with or otherwise affecting the patron's game play (or other content) presented on the primary EGM display. By way of illustration, FIGS. 55-59 illustrate example screenshots of various BOD Menu GUIs which may be presented to a given patron via an EGM display (and/or mobile device display) for enabling the patron to access and/or initiate orders/requests for selected food items, beverage items, and/or other items of merchandise.

In at least one embodiment, the interactive ODS Menu GUI may be configured or designed to enable the user (e.g., a patron) to navigate through the various ODS services/products offered by the casino, and to access desired On Demand Services. Once the user has accessed the desired ODS service and has selected items/services to "order" (e.g., via ODS menu navigation, GUI interaction, swipe screens, search options, etc.), the user may interact with the "Submit Order" button (e.g., 5530, FIG. 55; 5630, FIG. 56; 5730, FIG. 57; 5830, FIG. 58; 5930, FIG. 59) to cause the user's order to be submitted to the On Demand Services System for processing. During the processing of the submitted order, the On Demand Services System may access one or more sets of conditions/criteria which may influence or determine where the order is to be routed or delivered for further processing and/or fulfillment by casino staff. For example, according to different embodiments, the determination as to where a particular ODS order is to be routed for fulfillment may depend upon various criteria such as, for example, jurisdiction, regulations, house preference, patron location, time of day, day of week, availability of waitstaff, and the like. In some embodiments, the order data may be automatically and/or dynamically routed/outputted (e.g., in real-time) (e.g., electronically displayed and/or printed out) at a predetermined bar and/or location (e.g., in accordance with the setup/configuration implemented via the On Demand Services System's backend functionality), where the order may then be filled by servers and/or waitstaff. Once the order is fulfilled and ready for delivery, it may be physically up to the waitstaff to deliver the items to the identified patron who submitted the order.

In at least some embodiments, the On Demand Services System may include functionality for dynamically tracking player locations (e.g., in real-time) and for notifying waitstaff of patron relocation. Thus, for example, if, while the order is being filled, the patron who ordered decides to leave the current EGM, the On Demand Services System may automatically detect this activity, and may automatically respond by initiating one or more procedures/operations such as, for example, automatically generating and sending a notification to the ODS service station (where the order is being filled) that the patron has departed from location/EGM X. According to different embodiments, the system may automatically determine that the player has departed from a given location/EGM in response to detecting one or more event(s) and/or conditions such as, for example:

a "card out" event (e.g., where the player's player tracking card is removed from the EGM), a "ticket out" event (e.g., where the EGM generates and delivers a cash voucher to the player to zero out the EGM credit meter),
a "cash out" event,
etc.

Thereafter, if the system subsequently detects that the player has carded in at location/EGM Y, the system may respond by automatically generating and sending a notification to the ODS service station (where the order is being filled) that the patron has been detected as carding in at location/EGM Y at a specific time. Additionally, based on the detected player movement/relocation activities, the On Demand Services System may include functionality for identifying the specific waitstaff assigned to deliver the order to the patron, and for automatically generating and sending a notification to the identified waitstaff of the patron's movement(s)/relocation. Thus, for example, in one embodiment, if the waitstaff is in the process of delivering the ordered drink/item to the patron, and is on the floor in route for delivery, the system may be configured or designed to automatically detect these conditions, and may automatically and dynamically initiate appropriate actions for notifying the identified waitstaff via mobile device (e.g., via text message, phone call, etc.) of the player's new location.

In specific situations it may happen that an ordered ODS item is unable to be delivered to the patron (e.g., because the patron has left the EGM, because the ordered item is unavailable, etc.). To address such situations, the On Demand Services System may provide a time out/cancellation feature which may be configured or designed to automatically cancel the order in response to detecting the occurrence of one or more predefined set(s) of event(s)/condition(s) such as, for example:
  Card-out/cash-out/ticket-out event detected at EGM where ODS order originated.
  Location of patron who ordered item cannot be detected, verified and/or determined
  Ordered item unavailable.
  Condition(s) for allowing fulfillment of order no longer met/satisfied.
  Player no longer wagering at required minimum allowable wager amount/level for receiving ordered item.
  And/or other set(s) of event(s)/condition(s) as may be configured/defined by the casino.

In addition to automatically canceling the order, the On Demand Services System may be configured or designed to identify and notify appropriate casino personnel (e.g., staff assigned to handle the order) that the identified ODS order has been cancelled.

In at least some embodiments, the On Demand Services System may be configured or designed to include functionality for enabling waitstaff personnel to submit orders on behalf of the patron via a mobile device, smartphone and/or tablet running ODS application(s). In at least some embodiments, the mobile ODS applications/GUIs may be configured or designed to include functionality similar to that of the ODS Service menu GUIs described herein. Additionally, in at least some embodiments, similar triggering events/conditions/criteria may be applied to ODS orders placed by waitstaff on behalf of casino patrons.

On Demand Service Menu GUI Configuration

One of the beneficial aspects of the On Demand Services technology described herein relates to the flexible nature of the On Demand Service menu GUI configuration and layout. For example, in at least one embodiment, a casino property may configure different On Demand Service menu GUIs to offer different items in different ways. By way of illustration, to order a cup of coffee, an On Demand Service menu GUI may be configured to display (e.g., via the EGM display interface) a "Coffee" button. When the player selects the Coffee Button, the system may display a list of condiments (e.g., cream, sugar, Splenda, etc.) to the player, and request that the user select the specific condiments which the player would like to have included with the order. Alternatively, one or more On Demand Service menu GUI(s) may be configured or designed to include multiple different "Coffee" buttons such as, for example: "Coffee—black", "Coffee—with cream", "Coffee—with cream and sugar", etc. The customization, layouts, configurations, and content of the On Demand Service menu GUI(s) may be controlled and managed by the casino property. Additionally, in at least some embodiments, the On Demand Services System may include functionality for enabling the On Demand Service menu GUI(s) to automatically and/or dynamically modified based on feedback from the customers/patrons, thereby allowing for instant changes to fully maximize player services and comfort.

As described in greater detail herein, the On Demand Services System may include a Front End subsystem (e.g., enabled at EGMs, and Mobile Platform(s), for use by customers, patrons, waitstaff, etc.) and a Back End subsystem (e.g., implemented at a Casino server, accessible by authorized casino personnel).

Examples of various types of Frontend activities which a casino patron (and/or waitstaff) may perform by interacting with one or more of the ODS Menu GUIs presented via an EGM (or mobile device) display may include, but are not limited to, one or more of the following (or combinations thereof):
  Beverage On Demand Services, such as, for example:
    Order items
    Leave comments
    Select favorites
    Select promotional items
    Move to different EGM's while order is in process (Player Tracking Card In/Card Out)
    Play EGM and order items simultaneously
  Security On Demand Services, such as, for example:
    Contact Security personnel
    Contact Medical personnel
    Contact Property personnel
    Play EGM and contact personnel simultaneously
  Host On Demand Services, such as, for example:
    Contact Host and/or VIP Host
    Contact Concierge
    Play EGM and contact personnel simultaneously
  Valet On Demand Services, such as, for example:
    Notify Valet Personnel on expected vehicle pickup
    Inform Valet Personnel on estimated time of arrival
    Supply Valet Coupon and/or ticket number for ease of use
    Play EGM and contact personnel simultaneously
  Weather On Demand Services, such as, for example:
    Stay up to date with current (local) weather and predicted forecasts
    Find global weather and forecasts via search engine
    Play EGM and be informed and/or search simultaneously Examples of various types of data and/or information which may be accessed, monitored, and/or modified by casino employees (and/or other authorized users) interacting with one or more of the On Demand Service window GUIs presented via a backend system display may include, but are not limited to, one or more of the following (or combinations thereof):

Central access to individual On Demand applications and functionality thereof (e.g., AppSite)

Menu Management interface system (Beverage On Demand), which, for example, may provide access to various types of Beverage On Demand related information such as, for example:
  Primary Categories
  Sub Categories
  Items Category
  Condiment & Condiment Group categories
  Custom Item images
  Custom Language setup
  Limit Tags, Limit Item Amounts & Limit Patrons
  Serving Periods, Bars & Printer locations
  Receipt formats
  Ads, Pop-up ads, and Banner Ads
  Discounts, promotions (based on tier, age, gender, birthday, other)
  Waitstaff management
  Tiered functionality
  Micros Integration
  Infogenesis Integration
  Analytics
  Player Tracking (Card In/Card Out)
  Heat Maps
  Intelligent Favorites
  Enable/Disable patron order comments
  Report management
  Export Database
  Closed Loop System Security Management interface system (Security On Demand), which, for example, may provide access to various types of Security On Demand related information such as, for example:
  General Setup
  Security Setup
  Medical Setup
  Reports Host Management interface system (Host On Demand), which, for example, may provide access to various types of Host On Demand related information such as, for example:
  General Setup
  Host Setup
  Reports Valet Management interface system (Valet On Demand), which, for example, may provide access to various types of Valet On Demand related information such as, for example:
  General Setup
  Valet Setup
  Reports Weather Management interface system (Weather On Demand), which, for example, may provide access to various types of Weather On Demand related information such as, for example:
  General Setup Report Management interface system (Report Management), which, for example, may provide access to various types of Report Management related information such as, for example:
  Order Tracking
  Delete Orders
  Generate Report
  Location
  Date
  Items
  Player
  Saving Examples of various types of Backend activities which casino employees (and/or other authorized users) may initiate and/or perform by interacting with one or more of the On Demand Service window GUIs presented via a backend system display may include, but are not limited to, one or more of the following (or combinations thereof):

Central access to individual On Demand applications and functionality thereof (AppSite).

Menu Management interface system (Beverage On Demand), which, for example, may provide access to various types of BOD related features, functions, operations such as, for example, one or more of the following (or combinations thereof):
  Configurable drag & drop Primary Categories
  Configurable drag & drop Sub Categories
  Configurable drag & drop Items Category
  Configurable drag & drop Condiment & Condiment Group categories
  Configurable custom Item images
  Configurable Limit Tags, Limit Item Amounts & Limit Patrons
  Configurable Serving Periods, Bars & Printer locations
  Configurable Receipt formats
  Configurable Ads, Pop-up ads, and Banner Ads
  Configurable discounts, promotions based on tier, age, gender, birthday, other
  Configurable Waitstaff management (with pin number for closed loop system)
  Tiered functionality (based through multiple sections)
  Micros Integration (menu database import)
  Infogenesis Integration (menu database import)
  Analytics (viewing and printing)
  Heat Maps (viewing and printing)
  Enable/Disable patron order comments
  Report management (viewing and printing).

Security Management interface system (Security On Demand), which, for example, may provide access to various types of SOD related features, functions, operations such as, for example, one or more of the following (or combinations thereof):
  General Setup
    email port
    alert port
    SMTP server
    username account
    password protection
    language select
  Security Setup
    Email
    SMS
    Printer
    Email receiver
    Phone number receiver
    Phone service provider
    Add service provider
    Printer receiver
  Medical Setup
    Email
    SMS
    Printer
    Email receiver
    Phone number receiver Phone service provider
Add service provider
Printer receiver
Reports
  Call type
  Report type Host Management interface system (Host On Demand), which, for example, may provide access to various types of HOD related features, functions, operations such as, for example, one or more of the following (or combinations thereof):
General Setup
  email port
  alert port
  SMTP server
  password protection
  language select
Host Setup
  Email
  SMS
  Printer
Reports
  Report type
  Date setup
  Filter Reports Valet Management interface system (Valet On Demand), which, for example, may provide access to various types of VOD related features, functions, operations such as, for example, one or more of the following (or combinations thereof):
General Setup
  email port
  alert port
  SMTP server
  username account
  password protection
  language select
Valet Setup
  Email
  SMS
  Printer
  Email receiver
  Phone number receiver
  Phone service provider
  Add service provider
  Printer receiver
Reports
  Report type
  Date setup
  Filter Reports Weather Management interface system (Weather On Demand), which, for example, may provide access to various types of WOD related features, functions, operations such as, for example, one or more of the following (or combinations thereof):
General Setup
  Default Language
  Favored Country
  Default Location
  Measurement System
  API Key Report Management interface system (Report Management), which, for example, may provide access to various types of Report Management related features, functions, operations such as, for example, one or more of the following (or combinations thereof):

Order Tracking
  Delete Orders
  Generate Report
    Location
    Date
    Items
    Player
    Saving In at least some embodiments, each of the different types of On Demand Services may have associated therewith a respective set of management GUIs for enabling casino staff, administrators and/or other authorized personnel to access, configure, monitor, modify, analyze, and report various types of On Demand related activities, events, data, and/or other information. Moreover, in at least some embodiments, these activities may be performed or accessed in real-time (e.g., on the fly), without causing or requiring any disruption to any concurrent or existing gaming-related and/or wagering-related activities being conducted via the casino gaming network, and without requiring that the On Demand Services System be brought off-line.

It will be appreciated that On Demand Services techniques have been configured or designed to overcome various technological issues and limitations which have existed with respect to many of today's on-demand service systems which are currently deployed at casino properties. For example, the customized features and content of many on-demand service systems which are currently deployed at one or more casino properties are typically implemented via use of hardcoded software which has been specifically customized and configured to accommodate the individual requirements of each separate casino. In order to modify or change the features, content, or GUIs of such hardcoded on-demand systems, it is typically necessary to require that the systems running the on-demand services be brought off-line in order to implement the desired modifications. This may also cause or result in a disruption of gaming-related and/or wagering-related activities being conducted via the casino gaming network.

In contrast, embodiments of the On Demand Services System described herein are specifically configured or designed to be implemented using flexible-based software coding techniques which provide functionality for enabling the features, content, and/or GUIs of On Demand Services System(s) to be dynamically configured, re-configured, or otherwise modified in real-time (e.g., on the fly), without causing or requiring any disruption to any concurrent or existing gaming-related and/or wagering-related activities being conducted via the casino gaming network, and without requiring that the On Demand Services System be brought off-line in order to implement such changes/modifications.

Example Beverage on Demand (BOD) Services Features and Management

FIGS. 12, 55-59 illustrate example screenshots of various BOD Service Menu GUIs which may be accessed via the frontend system by patrons and/or waitstaff (e.g., via EGM device and/or mobile device). The example screenshots of BOD Service Menu GUIs illustrated in FIGS. 12, 55-59 have been specifically configured for vertical-oriented presentation on a portion of an EGM display, as illustrated, for example, at 1024 of FIG. 10. In other embodiments (not shown) the BOD Service Menu GUIs for horizontal-oriented presentation, and/or may be configured for presentation on other types of displays such as, for example, mobile devices, smart phones, PDAs, kiosk displays, etc.

As described in greater detail herein, the Beverage On Demand® (BOD) Menu GUIs may be configured or designed to enable patron and/or waitstaff to browse the catalog of available items which may be ordered via the casino's BOD Service, select desired item(s) to be ordered, and submit an order for the selected items to the casino's BOD Service. In at least some embodiments, the BOD Service System may also be configured or designed to enable the patron to pay for the BOD Service order via one or more different types of funding sources such as, for example, credit cards, ATM cards, PayPal™ bitcoins, casino credits, casino vouchers, coupons, cash, room charge, etc.

According to the preferences of the casino, the BOD Service Menu GUI(s) may be configured or designed to offer a variety of different items for ordering, including, for example, one or more of the following (or combinations thereof): food items, beverage items, novelty items, gift shop accessories, etc. However, for purposes of illustration and ease of explanation, the BOD Service Menu GUI(s) illustrated and described with respect to FIGS. 12, 30-49, and 55-59, focus primarily on beverage items which may be available for ordering via the BOD Service Menu GUI(s).

According to different embodiments, some of items offered via the BOD Service Menu GUI(s) may be available for purchase, while other items offered via the BOD Service Menu GUI(s) may be available for complimentary ordering (e.g., for a given patron). For example, in some embodiments the On Demand Services System may be configured or designed to include functionality for automatically monitoring casino patron gaming/wagering activities, and for automatically "comping" food, beverages, and/or other items ordered by a given patron via the BOD Service in response to determining that specific predefined conditions, events, and/or criteria have been satisfied. According to different embodiments, at least a portion of such predefined conditions, events, and/or criteria may be based on one or more of the following (or combinations thereof):

Player Identity.
Gaming history of that player at the player's current EGM.
Gaming history of that player over a designated time interval.
Wagering history of that player at the player's current EGM.
Wagering history of that player over a designated time interval.
Current physical location of the player.
Historical physical location of player over one or more time intervals (e.g., player must be physically located on the gaming floor for at least 15 consecutive minutes in order to receive a free comp drink).
And/or other desired criteria as may be configured/defined by the casino.

By way of illustration, the casino may configure the On Demand Services System to allow a player at an EGM to order (via BOD Service Menu GUI) a complementary "top shelf" mixed drink once every 15 minutes, provided that the player initiates at least 10 wagers at the EGM each 15 minutes, and provided that each wager is a minimum of $1. In one embodiment, the On Demand Services System may be configured or designed to not allow the player to place an order for a complementary "top shelf" mixed drink until all required conditions/events are satisfied. In another embodiment, the player may start a gaming session at the EGM and specify a wager/bet amount of $1. Before the 15 minutes has elapsed, the On Demand Services System may be configured or designed to permit the player to place submit a "top shelf" mixed drink order before all required conditions/events are satisfied, but may continue to proactively monitor the player's wagering activities, and may take appropriate action to automatically cancel the order if the system subsequently detects that the player has switched to a $0.50 wager/bet amount, for example.

Figure 12:
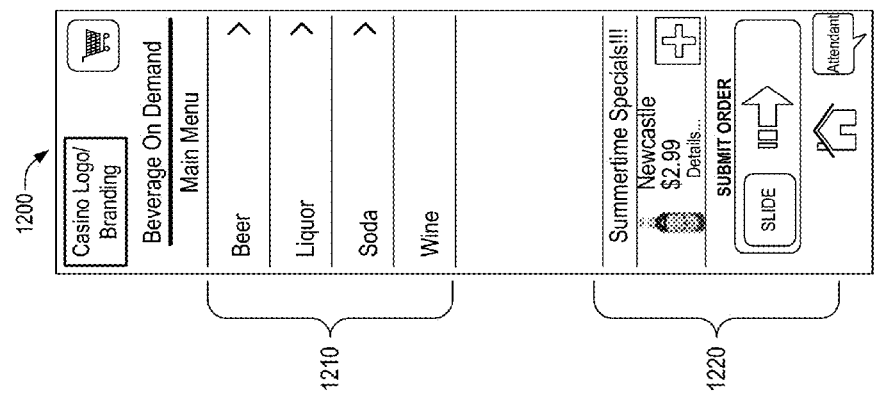

FIG. 12 shows an example screenshot of a BOD Main Menu GUI 1200, in accordance with one embodiment. As illustrated in the example embodiment of FIG. 12, the BOD Main Menu GUI includes a first portion of interactive content 1210, which is configured or designed to enable the user (e.g., casino patron) to browse through a catalog of various types of beverages (e.g., beer, mixed drinks, nonalcohol beverages, wine, etc.) which are available to be ordered via the casino's BOD Service. The BOD Main Menu GUI may also include additional interactive content (e.g., 1220) which may be configured or designed to include functionality for enabling the patron to perform additional tasks relating to the BOD Service, such as, for example, one or more of the following (or combinations thereof):

View/order/purchase special offers and/or promotions.
Submit an order.
Review items in the electronic shopping cart.
Navigate to other menus of the BOD Service.
Access other On Demand Services.
Request a casino attendant.
Request a server (e.g., waiter/waitress).
Check on the status of a pending BOD order.
Cancel a submitted BOD order.
Modify a BOD order which has been submitted.
Select/change default language of BOD Menu GUI(s).
Initiate a keyword search for specific items.
Minimize the BOD Service Menu.
Close the BOD Service Menu.
And/or other types of activities illustrated or described herein.

FIG. 55 shows an example screenshot of a BOD Menu GUI 5500, illustrating an example embodiment of a promotional offer (e.g., Budweiser Beer) being displayed via a pop-up window or overlay layer 5510. In one embodiment, the user may add the promotional item to the user's electronic shopping cart (e.g., by tapping on "+" icon 5511, and/or may order the promotional item by sliding the virtual "slide" button 5530 in the direction indicated.

FIG. 56 shows an example screenshot of a BOD Main Menu GUI 5600 which has been configured or designed to display promotional offer content 5620 (e.g., daiquiri mixed drink $5.99). In one embodiment, the user may add the promotional item to the user's electronic shopping cart, and/or may directly submit an order for the promotional item via interaction with "Submit Order" GUI portion 5630. Additionally, as illustrated in the example embodiment of FIG. 56, the BOD Main Menu GUI may include interactive content 5610 for enabling the user to access one or more BOD submenus relating to the different types of of beverages (e.g., beer, mixed drinks, nonalcohol beverages, wine, etc.) which are available to be ordered via the casino's BOD Service.

FIG. 57 shows an example screenshot of a BOD Submenu GUI 5700, in accordance with one embodiment. As illustrated in the example embodiment of FIG. 57, the BOD Submenu GUI 5700 has been configured to represent a BOD Beer Menu which displays information (e.g., 5720) about various types of beer (e.g., light beers, dark beers, wheat bears, pale ales, etc.), brands of beer (e.g., Budweiser, Coors, Stella, etc.), and/or items of beer (e.g., 12 oz can of Coors, 10 oz bottle of Budweiser, etc.) that are available for ordering via the BOD Service. Additionally, as illustrated in the example embodiment of FIG. 57, BOD Submenu GUI

5700 has been configured or designed to display promotional offer content 5720 (e.g., Margarita mixed drink $5.99). In one embodiment, the user may add one or more of the offered items to the user's electronic shopping cart, and/or may directly submit an order for the promotional item via interaction with "Submit Order" GUI portion 5730. In at least one embodiment, the user may access the BOD Beer Menu of FIG. 57 by tapping or selecting the "Beer" line item (e.g., 5612) of the BOD Main Menu GUI of FIG. 56.

Figure 58:
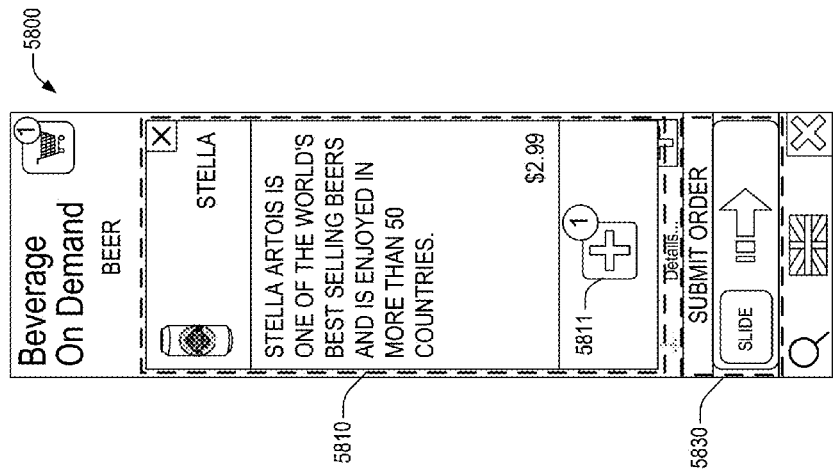

FIG. 58 shows an example screenshot of a BOD Submenu GUI 5800, in accordance with one embodiment. As illustrated in the example embodiment of FIG. 58, the BOD Submenu GUI 5800 has been configured to represent a BOD Item Menu which displays additional information (e.g., 5810) about one or more specific BOD items (e.g., can of Stella beer). In at least one embodiment, the user may add (e.g., 5811) one or more of the offered items to the user's electronic shopping cart, and/or may directly submit an order for the promotional item via interaction with "Submit Order" GUI portion 5830. In at least one embodiment, the user may access the BOD Item Menu of FIG. 58 by tapping or selecting the "STELLA" line item (e.g., 5712) of the BOD Beer Menu of FIG. 57.

Figure 59:
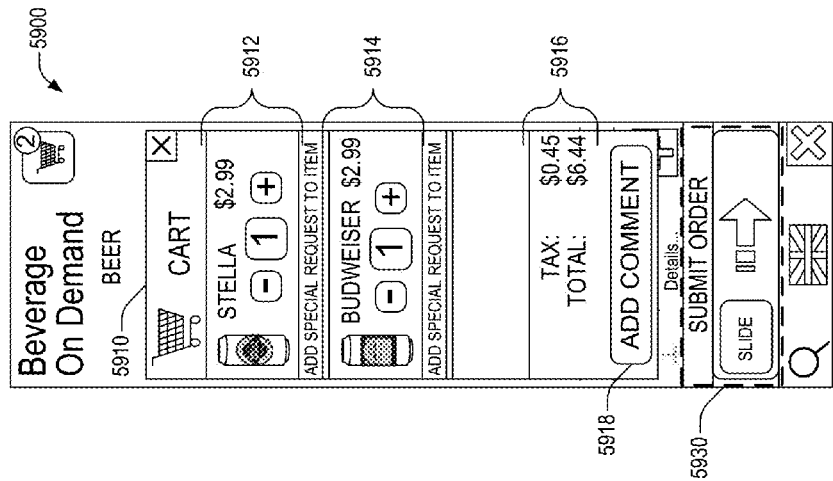

FIG. 59 shows an example screenshot of a BOD Shopping Cart GUI 5900, in accordance with one embodiment. As illustrated in the example embodiment of FIG. 59, the BOD Shopping Cart GUI 5900 has been configured to provide the user with access to various types of information and features relating to the selected BOD items which the user has added to his electronic shopping cart via interaction with one or more BOD Menu GUI(s). By way of illustration, examples of such information/features may include, but are not limited to, one or more of the following (or combinations thereof):

Listing of individual items (e.g., 5912, 5914) which have been added to the user's electronic shopping cart.
Item pricing information.
Tax-related information. (e.g., 5916)
Functionality for enabling the user to dynamically add/subtract/modify/remove quantities of selected items to/from the user's shopping cart.
Functionality for enabling the user to add special request(s) relating to one or more items in the user's shopping cart.
Functionality 5918 for enabling the user to add one or more comment(s) to the BOD order.
Functionality 5930 for enabling the user to submit the BOD order.
Functionality for enabling the user to pay for the BOD order.
Functionality for enabling the user to apply comps, coupons, discounts to the BOD order.
And/or other types of information and/or functionality described herein.

Real-Time BOD/ODS Tracking Functionality

It is noted that many of today's on-demand service systems which are currently deployed at casino properties are not configured or designed to provide casino management with access to real-time tracking of orders which have been submitted to their on-demand service systems. Some reasons why such functionality has typically not been provided by such prior on-demand service systems relate to the complex and proprietary nature of the casinos networks. Additionally, since the customized features and content of many currently deployed on-demand service systems are typically implemented via use of hardcoded software, such systems inherently lack the dynamic customization/configuration flexibility which may be required for implementing real-time tracking of on-demand service orders.

Accordingly, as described in greater detail herein, it may be appreciated that some of the unique and advantageous features of the presently described On Demand Services System relate to the system's ability to automatically track (e.g., in real-time) the current status of all BOD orders (and/or other types of ODS orders) which have been submitted to the On Demand Services System, and to the system's ability to provide casino personnel (and/or other authorized personnel) with access to real-time status information relating to specific orders and/or specific types of orders (e.g., pending orders, new orders, delivered orders, canceled orders, delayed orders, complementary orders, etc.).

FIGS. 60-64 illustrate example screenshots of various BOD Service Tracking GUIs which may be used for accessing real-time BOD tracking functionality relating to BOD Services and other related information/features, including, for example, one or more of the following (or combinations thereof):

Real-time tracking of pending BOD Service orders. (e.g., FIG. 61)
Real-time tracking of delivered BOD Service orders. (e.g., FIG. 62)
Real-time tracking of canceled BOD Service orders. (e.g., FIG. 63)
Configuration of features and default settings relating to the BOD Service. (e.g., FIG. 64)
Etc.

In at least one embodiment, at least a portion of the BOD tracking functionality may be provided by a BOD Tracking System, which, for example, may be implemented as a component or subsystem of the On Demand Services System. In the specific example embodiments of FIGS. 60-64, the example BOD Service Tracking GUIs have been configured for presentation on a computer system display (such as, for example, a desktop computer, laptop computer, mobile device, etc.), and may be accessed via use of a web browser application. In other embodiments (not shown) the one or more of the BOD Service Tracking GUIs may be accessed via a client application running on a remote system.

Figure 60:
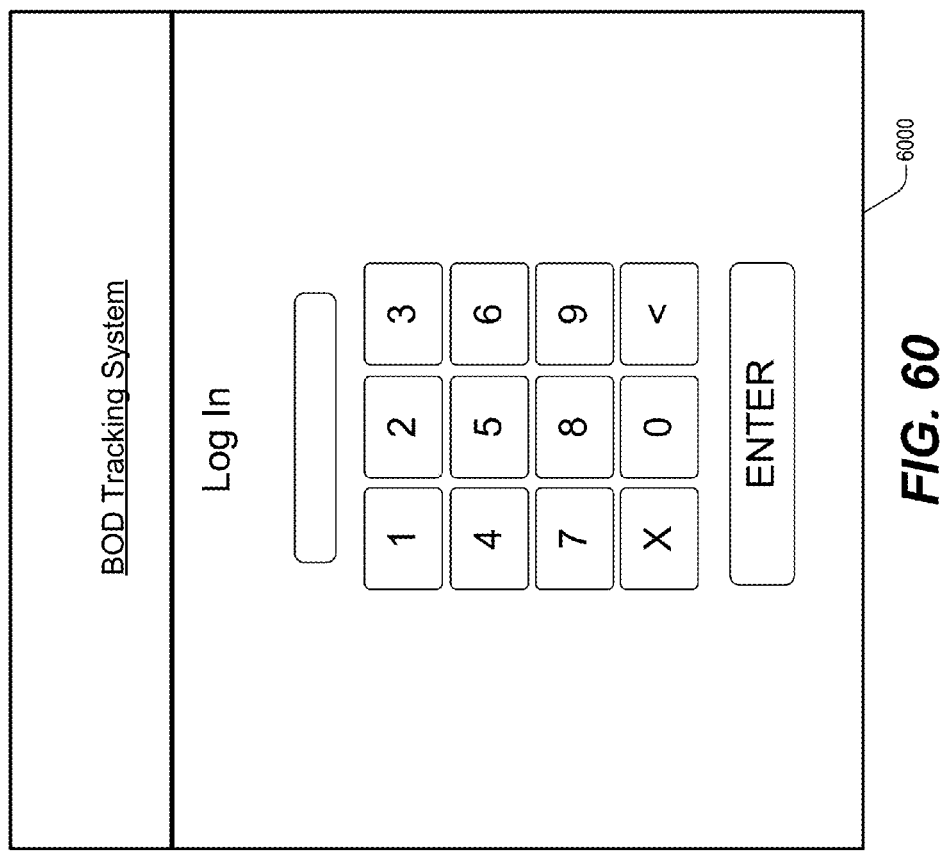

FIG. 60 shows an example screenshot of a BOD Login GUI 6000 which may be used by authorized persons for accessing tracking functionality for the BOD Service. In order to access the main contents of the tracking system, a secure pin pad login may be required. The pin may be setup through the ODS System.

Figure 61:
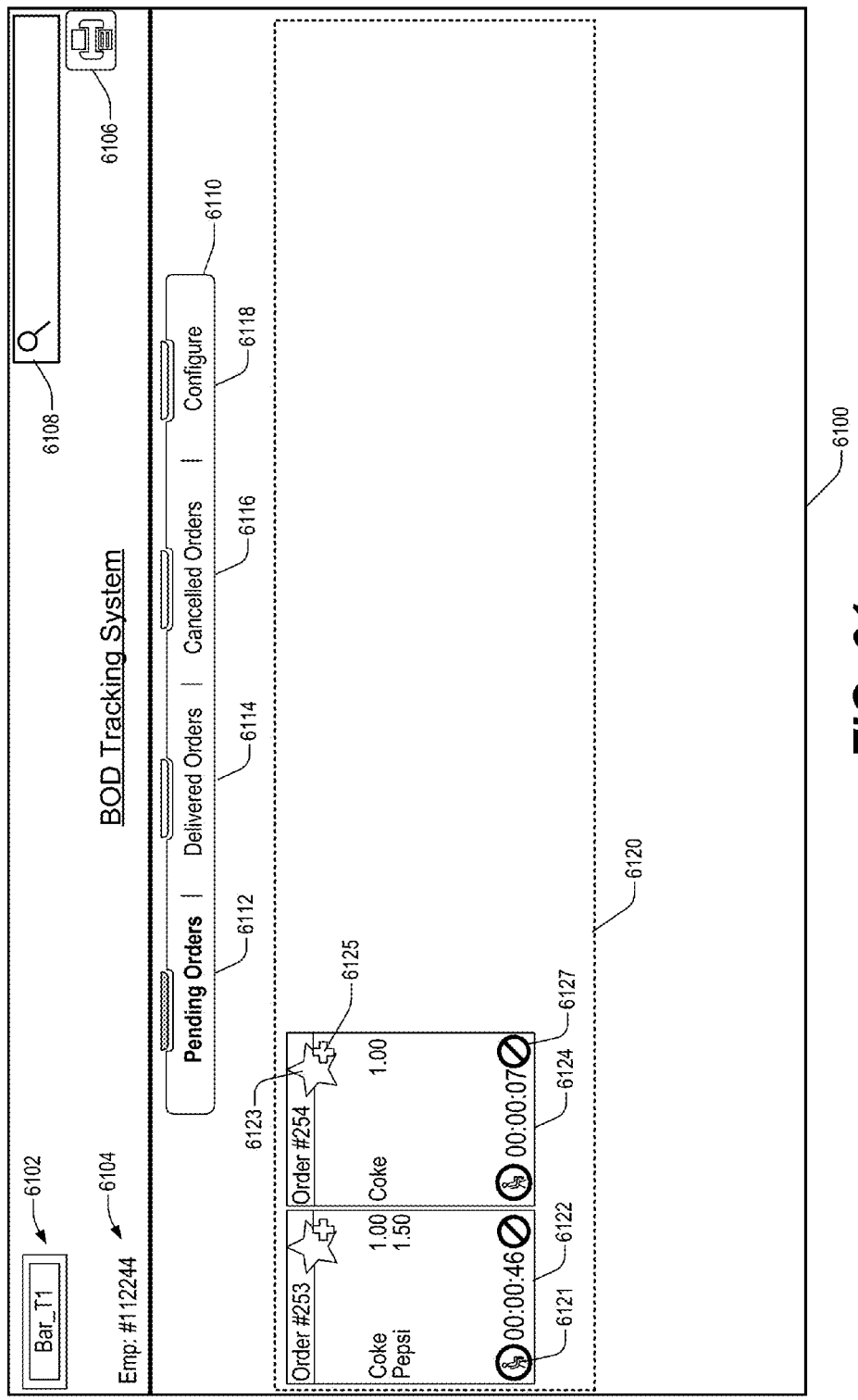

FIG. 61 shows an example screenshot of a BOD Order Tracking GUI 6100 which may be configured or designed to include functionality for enabling authorized personnel to access real-time BOD tracking of the various BOD orders which have been submitted to the BOD System, including, for example, one or more of the following (or combinations thereof):

Pending or open BOD orders (e.g., 6112).
New and/or recent BOD orders.
Delivered BOD orders (e.g., 6114).
Canceled BOD orders (e.g., 6116).
Delayed BOD orders.
Etc.

In the example embodiment of FIG. 61, the BOD Order Tracking GUI 6100 has been configured to display pending BOD orders, which may be accessed by tapping or selecting the "Pending Orders" (6112) display option. As illustrated in the example embodiment of FIG. 61, two BOD orders (e.g., 6122, 6124) are currently pending. Display of various different icons (e.g., 6121, 6123, 6125, 6127) may be used to denote (e.g., via quick visual observation) aspects about each order such as, for example, one or more of the following (or combinations thereof):
  new order not yet viewed before;
  order which has been previously viewed;
  whether the player is currently seated/carded out/carded in;
  player VIP status;
  and/or other aspects and/or information about a given order.

In one embodiment, each order that comes in may be displayed within its own respective window and/or frame (e.g., 6122, 6124) of the BOD Order Tracking GUI, and within each configurable window/frame, information about that specific order is displayed such as, for example, one or more of the following (or combinations thereof):
  player id;
  player name;
  time when order placed;
  elapsed time since order was placed;
  item description(s);
  order number;
  zone; location;
  EGM bank;
  pricing information;
  payment method;
  etc.

In one embodiment, if the population of the orders expands beyond the screen display resolution limits, a scroll bar may automatically appear, allowing the user to scroll through the order list. As illustrated in the example embodiment of FIG. 61, a Bar/Section Selection Icon 6102 may be displayed for enabling the user to switch between different bars, restaurants, zones/sections, and/or other locations where BOD orders may be processed, filled, or prepared. Additionally, as illustrated in the example embodiment of FIG. 61, the BOD Order Tracking GUI may include a printer icon (e.g., 6106) for enabling the user to send print outs of selected orders to one or more selected printer locations at the casino property.

In at least one embodiment, the BOD Order Tracking GUI(s) may be configured or designed to include keyword searching functionality (e.g., 6108) and grouping functionality for enabling users to view real-time status details relating to one or more sets of orders which match user-defined search criteria such as, for example, one or more of the following (or combinations thereof):
  Employee ID,
  Player ID,
  EGM ID,
  zone,
  EGM location,
  Player location,
  Bar/Restaurant ID,
  BOD item,
  BOD order ID,
  time-based criteria (e.g., range of time, range of day(s), range of date(s), etc.)
  and/or other types of searchable or filterable criteria.

For example, in the specific example embodiment of FIG. 61, the BOD Order Tracking GUI 6100 displays status details of pending BOD (e.g., 6120) orders which have been assigned to a specifically identified employee (e.g., Emp: #112244) (6104). In at least one embodiment, this grouping functionality may be used to help keep orders in their respective server zones and associated with their respective servers.

Figure 62:
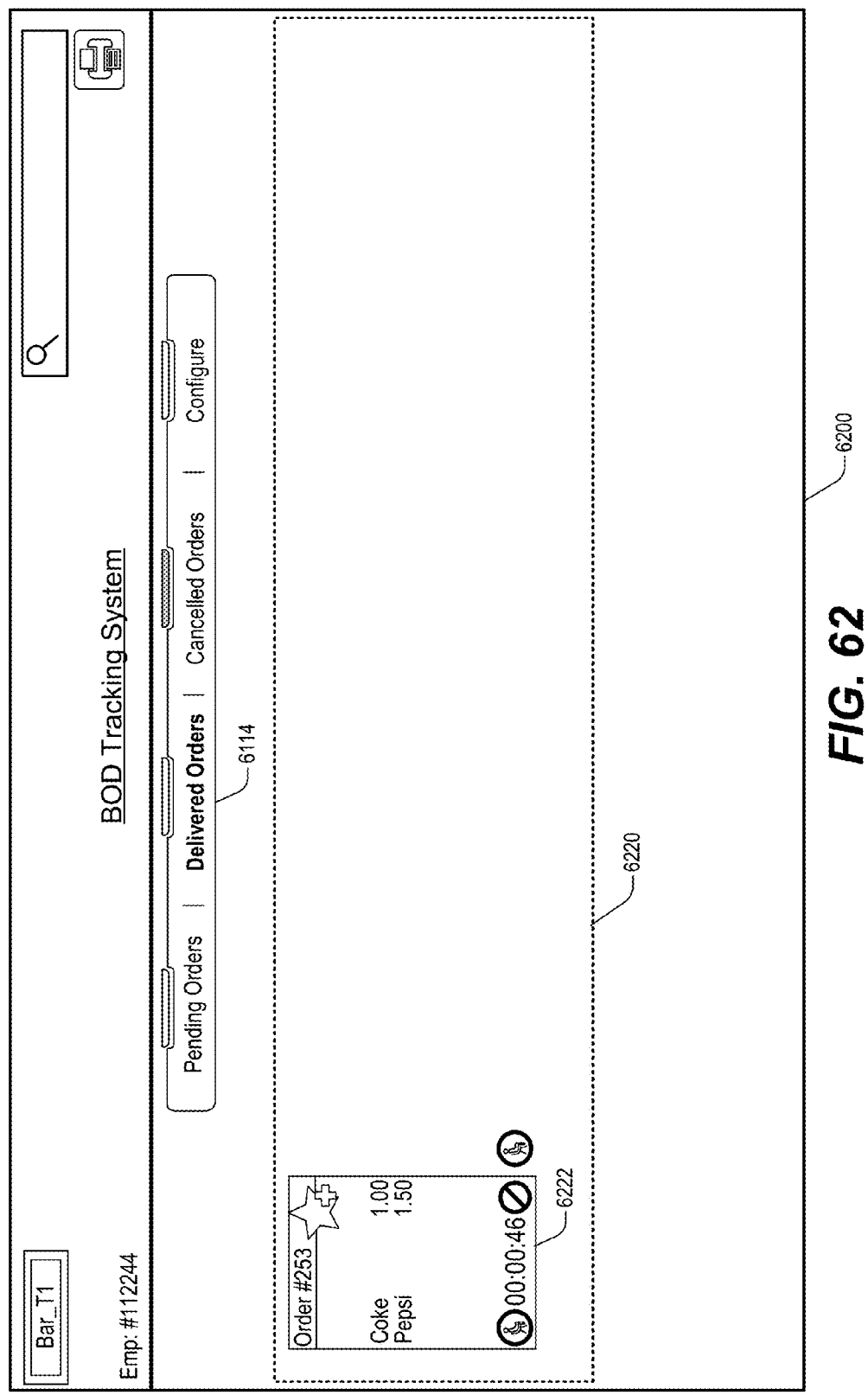

FIG. 62 shows an example screenshot of a BOD Order Tracking GUI 6200 which has been configured or designed to provide user access to real-time BOD tracking information relating to delivered BOD orders. In the specific example embodiment of FIG. 62, the BOD Order Tracking GUI 6200 displays status details of a set of delivered BOD orders (e.g., 6220) which are associated with a specifically identified employee (e.g., Emp: #112244).

Figure 63:
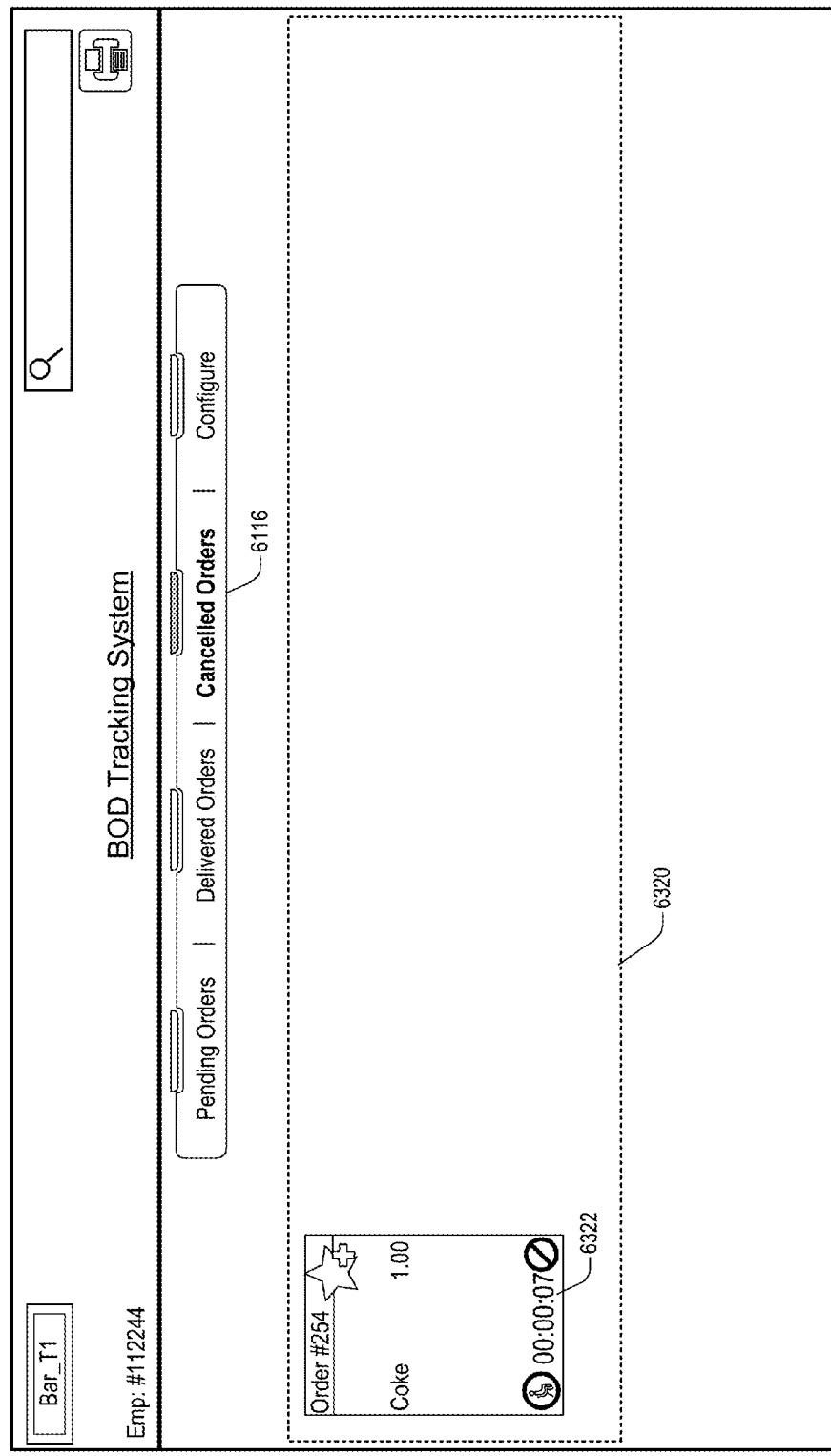

FIG. 63 shows an example screenshot of a BOD Order Tracking GUI 6300 which has been configured or designed to provide user access to real-time BOD tracking information relating to canceled BOD orders. In the specific example embodiment of FIG. 63, the BOD Order Tracking GUI 6300 displays status details of a set of canceled BOD orders (e.g., 6320) which are associated with a specifically identified employee (e.g., Emp: #112244).

In at least one embodiment, the On Demand Services System may include functionality for populating and maintaining an ODS Order Database for storing all (or selected) details of all (or selected) historical ODS orders, status updates, and related transactions. In one embodiment, the ODS Order Database may provide searchable access to archive-based lists of ODS orders, status updates, and related transactions which may be utilized by the BOD Tracking System (and/or other components/systems) for providing various aspects of the real-time BOD tracking and reporting functionalities described herein. Any order that is cancelled and/or delivered will populate these tabs.

FIG. 64 shows an example screenshot of a BOD Tracking Configuration GUI 6400 which may be configured or designed to include functionality for enabling authorized personnel to configure and/or modify various aspects/features relating to the BOD Tracking System functionality and/or BOD Order Tracking GUI(s). In at least one embodiment, one or more BOD Tracking Configuration GUI(s) may be configured or designed to enable authorized user(s) to selectively and/or dynamically set and/or modify configuration parameters of the BOD Tracking System such as, for example: the automated closing of orders (e.g., 6410); default settings (e.g., 6420), etc.

For example, as illustrated in the example embodiment of FIG. 64, a user may check the box in the "Close Orders When Printed" configuration GUI 6410 to configure the BOD Tracking System to automatically close an identified order in the BOD system after the order has been printed from the BOD Order Tracking GUI. Alternatively, a user may check the box in the "Close Orders When Printed" configuration GUI 6410 to configure the BOD Tracking System to prevent a printed order from being automatically closed. In this latter configuration, the order may need to be closed using the Service Window of the carded patron (or using the Mobile Close Loop screen when using Intelligent BOD).

Additionally, as illustrated in the example embodiment of FIG. 64, as shown at 6420, a user may selectively configure a selected bar of the casino (e.g., Bar_T1) as the "Default Bar" parameter of one or more BOD Order Tracking GUI(s). In at least one embodiment, different BOD Tracking System terminals may each be separately configured to have a respective Default Bar parameter assigned thereto. In at least some embodiments, the default bar parameter assigned to a first BOD Tracking System terminal may differ from another default bar parameter assigned to a second BOD Tracking System terminal. Thus, for example, as illustrated in the example embodiment of FIG. 64, the casino bar identified as "Bar_T1" may be configured as the Default Bar for the BOD Tracking System terminal which is displaying the BOD Tracking Configuration GUI 6400.

BOD Menu Management and Configuration

One of the beneficial aspects of the On Demand Services technology described herein relates to the flexible nature of the ODS Menu GUI configurations and layouts, which provide functionality for enabling the features, content, and/or GUIs of On Demand Services System(s) to be dynamically configured, re-configured, or otherwise modified in real-time (e.g., on the fly), without causing or requiring any disruption to any concurrent or existing gaming-related and/or wagering-related activities being conducted via the casino gaming network, and without requiring that the On Demand Services System be brought off-line in order to implement such changes/modifications. In at least one embodiment, such functionality may be implemented via use of a Menu Manager (MM) System, which may be configured or designed to enable authorized users to dynamically configure and/or modify selected features, content, and/or GUIs of On Demand Services System(s). In at least one embodiment, the Menu Manager System may be implemented as an application, component or subsystem of the On Demand Services System. In some embodiments, the Menu Manager System may be implemented as a separate system which is configured or designed to provide ODS Menu Management functionality via remote access to the On Demand Services System.

FIGS. 30-49, and 60-64 illustrate example screenshots of BOD Menu Manager GUIs which may be accessible by authorized casino staff or other authorized entities. More specifically, FIGS. 30-49 illustrate example screenshots of various backend BOD Service GUIs which may be used for accessing, enabling, initiating, and/or performing one or more of the following operation(s), action(s), and/or feature(s) (or combinations thereof):

Configuring the features, content and other aspects of the frontend BOD Service Menu GUIs Configuring the features, content and other aspects of the backend BOD Service GUIs Configuring the features, content and other aspects of the BOD Service Accessing the BOD Reporting and Tracking features of the BOD Service Accessing specific features of the BOD Service System which are available for use by approved administrators and/or managers.

Etc.

As described previously with respect to FIGS. 17 and 18, the On Demand Services System may include a Menu Manager application which is configured or designed to provide functionality for enabling authorized personnel to fully customize and configure On Demand Services menus, sub-menus, and related GUIs. In at least one embodiment, the ODS Menu Manager Application enables authorized users (such as, for example, Casino Management and/or Food & Beverage Directors) to access, edit, customize, and/or modify selected On Demand Service application(s) menus, sub-menus and GUIs (e.g., BOD, HOD, SOD, VOD, WOD, Reports, etc.). In at least one embodiment, such authorized personnel may use the ODS Menu Manager Application to implement desired configurable updates and/or changes to one or more of the On Demand Service application(s) menus, sub-menus and GUIs, to thereby fully customize the services, features, and content provided by the On Demand Services System in a manner which conforms with the specific needs and/or desires of each individual property (e.g., casino property).

FIG. 18 shows an example embodiment illustrating how the ODS Menu Manager Application may be configured or designed to function as an admin management hub for managing On Demand products and services. FIG. 17 shows an example screenshot of an ODS Menu Manager Application GUI 1700 which has been configured or designed to provide authorized users with access to various On Demand applications, services, products, and their related menu interfaces, content, and features.

Figure 30:
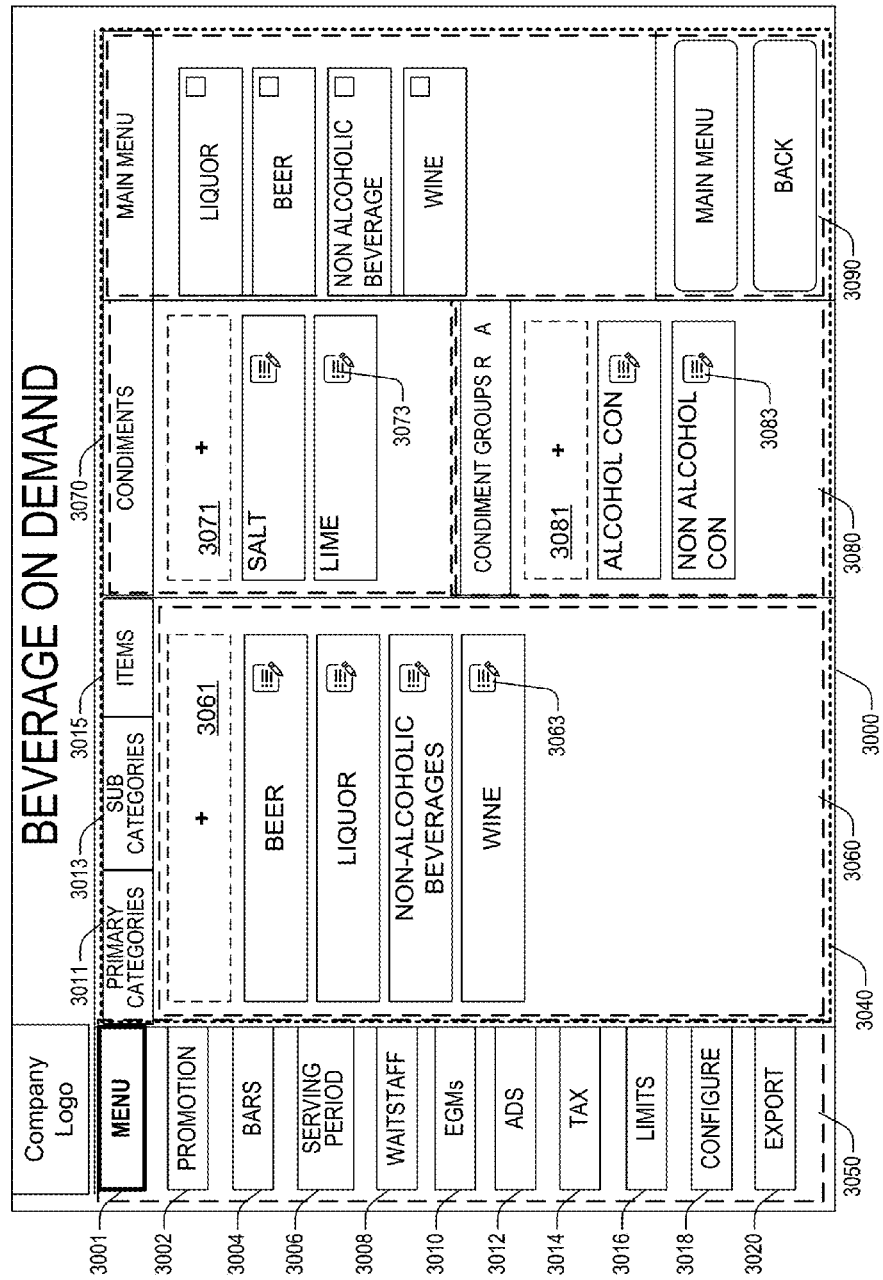

FIG. 30 illustrates an example screenshot of a BOD Menu Manager-Main Menu GUI which may be configured or designed to function as an admin management hub for managing and/or configuring BOD Service features and/or BOD Menu GUIs. As illustrated in the example embodiment of FIG. 30, the BOD Menu Manager-Main Menu GUI may be divided into multiple sections or "panels." (e.g., 3050, 3060, 3080, 3090, etc.)

On the left is the "Navigation Panel" 3050 that is configured to display a plurality of user selectable "BOD Navigation" buttons (e.g., 3001, 3002, 3004, 3006, 3008, 3010, 3012, 3014, 3016, 3018, 3020, etc.) that enable the user to navigate, select and/or configure various aspects, features, and/or content of BOD Service Menu GUI(s), including, for example, one or more of the following (or combinations thereof):

BOD Service Menu features/parameters/content 3001;
    Promotion features/parameters/content 3002;
    Bars features/parameters/content 3004;
    Serving Period features/parameters/content 3006;
    Waitstaff features/parameters/content 3008;
    EGM's features/parameters/content 3010;
    Ads features/parameters/content 3012;
    Tax features/parameters/content 3014;
    Limits features/parameters/content 3016;
    Configure features/parameters/content 3018;
    Reports features/parameters/content;
    Export features/parameters/content 3020;
    Etc.

The Content Panel GUI portion 3040 shows the various configurable options that are available in connection with each BOD Navigation button of the Navigation Panel 3050. In at least one embodiment, the panel sections may be configured or designed to provide a familiar user interface where the BOD navigation elements (e.g., 3050) remain in their same (or similar) relative locations (e.g., throughout configuration use), and where the Content Panel GUI portion 3040 is where the dynamically changeable configurations are implemented by the user. In this way, the user quickly becomes familiarized with the layout and functionality of the Menu Manager Application GUI(s).

By way of illustration, referring to FIG. 30, as the user selects different BOD navigation buttons of the Navigation Panel 3050, the content displayed in the Content Panel GUI portion 3040 automatically and dynamically changes in accordance with the currently selected BOD navigation button. For example, in the specific example embodiment of FIG. 30, it is assumed that the MENU navigation button 3001 is currently selected. Accordingly, the MM Application may respond by dynamically displaying (at the Content Panel GUI portion 3040) configurable aspects/parameters relating to the BOD Service Menu GUI(s), such as, for example, one or more of the following (or combinations thereof):

Primary Menu Categories 3011;
    Sub Menu Categories 3013;

BOD Menu Items 3015;
Condiment Items 3070;
Condiment Groups 3080 (e.g., which may be associated with respective BOD Menu Categories, Sub-categories and/or items);
Main Menu GUI layout/features/content 3090;
Sub Menu GUI layout/features/content;
Item Menu GUI layout/features/content;
And/or other aspects/features of the BOD Service described or referenced herein.

Moreover, because the On Demand Services System may be configured or designed to provide dynamically configurable/updatable inventory and interface management features using easy "drag and drop" work flow functionality, the system is able to offer levels of flexibility and adaptability which may conform with the needs/desires of most any type of business (e.g., casino property), theme, marketing campaign, etc.

Menu Content Panel GUI 3040 may be configured or designed to provide configurable access for some or all of the Condiment Groups, Condiments, Categories, Sub Categories, and/or orderable Items of the BOD Service. In at least one embodiment, the MM Application may also provide a "Preview Menu" feature that offers how the menu may look when displayed at an EGM. The Content Panel section herein provides the means necessary to create, configure and/or modify the BOD Menu GUIs that are to be used by the BOD Service.

Menu Condiment Groups GUI portion 3080 may be configured or designed to enable a user to define, configure, and/or modify different groups of condiments and associated parameters. In at least one embodiment, condiment groups are a way to categorize various condiment items that may accompany different types of BOD menu items. For example, a condiment group named "Burgers" may be created and associated with all Burger-type items of the BOD menu. In one embodiment, the Burger condiment group may be configured to include selected condiment items such as, for example: ketchup, mustard, pickles, lettuce, onions, etc. In at least one embodiment, individual condiment items may be defined, configured, and/or modified via the Condiment Item GUI portion 3070.

In at least one embodiment, the Menu Condiment Groups GUI portion 3080 and/or Condiment Item GUI portion 3070 may be configured or designed to include functionality for enabling a user to:

add/create/modify/delete one or more condiment group(s) (e.g., 3081);
add/create/modify/delete one or more condiment item(s) (e.g., 3071);
assign selected condiment item(s) to one or more condiment group(s);
edit/modify/add/delete associations between condiment item(s) and condiment group(s);
configure specific condiment item(s) and/or condiment group(s) as being required (e.g., "R"), optional (e.g., "O"), and/or additional (e.g., "A")
edit/modify/add/delete descriptions of selected condiment item(s) and/or condiment group(s);
and/or other functionality described and/or referenced herein.

As illustrated in the example embodiment of FIG. 30, edit icons (e.g., 3063, 3073, 3083, etc.) may be displayed in connection with various menu items and/or groups for enabling a user to selectively modify/re-configure (e.g., individually and/or in batch) desired aspects, features, and/or content associated therewith.

Figure 31:
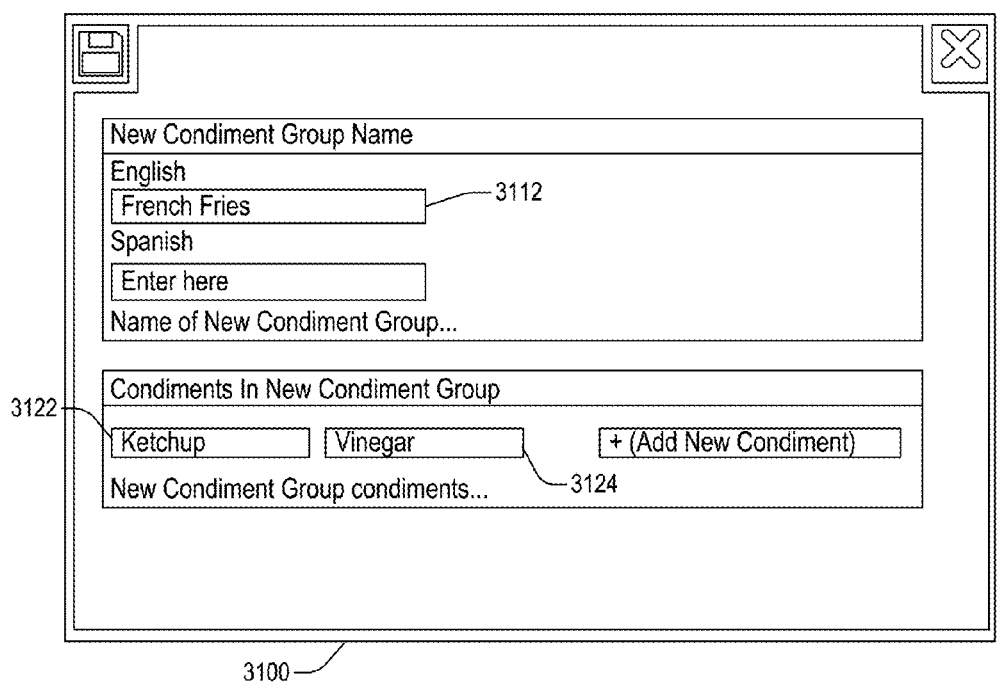

FIG. 31 illustrates an example screenshot of a BOD New Condiment Group GUI 3100 which may be configured or designed to facilitate the user in creating and configuring a new condiment group. In at least one embodiment, different types of condiment groups may be respectively defined and configured based on different types of food categories/items. For example, as illustrated in the example embodiment of FIG. 31, it is assumed that the user is creating a new condiment named "French Fries" 3112. In this particular couple, it is further assumed that at least two specific condiment items (e.g., ketchup 3122, vinegar 3124) have been assigned to the French Fries condiment group as a required condiment to be included with all French Fry orders serviced by the BOD System.

In one embodiment, when casino patron orders a "Basked of French Fries" via an EGM's BOD Service Menu GUI, the BOD System may automatically and dynamically determine that the "French Fries" condiment group is associated with the BOD menu item: "Basked of Fries", and may respond by automatically and dynamically offering (e.g., via the EGM On-Demand Service GUI) the patron the option of adding ketchup and/or vinegar as condiments the "Basked of French Fries" order. Alternatively, the system may respond by taking appropriate action to automatically and dynamically add or append the "French Fries" condiment group items (e.g., ketchup, vinegar) to the "Basket of Fries" BOD order. In at least one embodiment, the identified condiments of ketchup and vinegar may be listed on the BOD order ticket (e.g., which may be used by the entity preparing the BOD order and/or may be used by the waitstaff delivering the order) as condiment items which are required to be included with the Basket of Fries order. Additionally, in some embodiments, the system may automatically identify the waitstaff who is assigned to deliver the order to the patron, and may automatically notify the identified waitstaff (e.g., via mobile device, printout, workstation display) to supply ketchup and vinegar as condiments when serving the Basket of Fries order.

In one embodiment, menu item and group names may be allowed to have (up to) 32 characters each. In some embodiments, errors may be displayed if multiple items and/or groups share the same name. In at least some embodiments, additional fields may be provided in one or more BOD Menu GUIs for use in displaying items/content of the BOD Menu GUIs in other languages.

In at least some embodiments, the MM Application may be configured or designed to provide "drag & drop" functionality for facilitating configuration of one or more BOD Service Menu(s). Illustrative examples of such "drag & drop" functionality are illustrated and described, for example, with respect to FIGS. 32, and 37-39.

Figure 32:
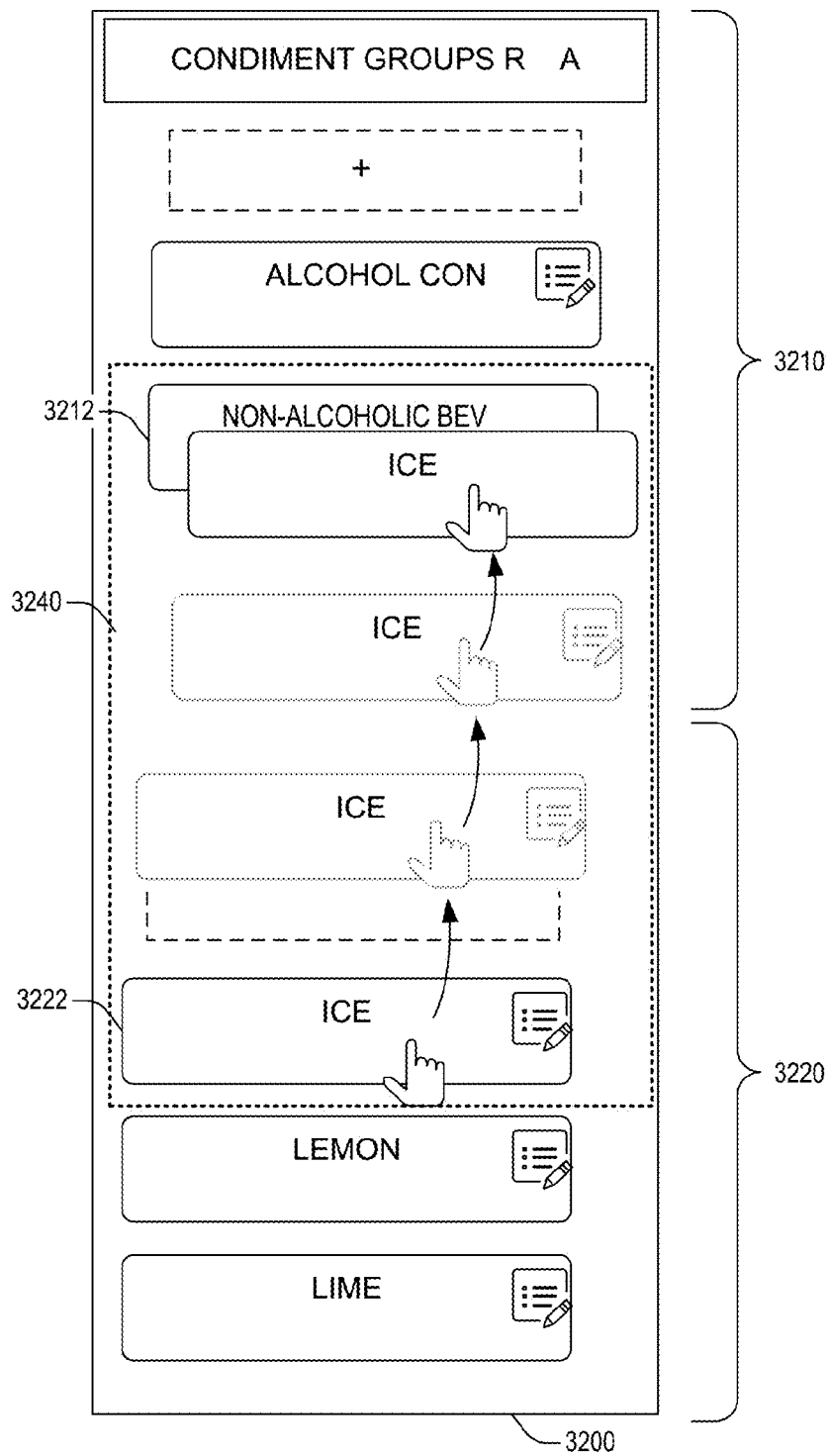

FIG. 32 illustrates an example screenshot of a BOD Condiment Group Configuration GUI 3200 which may be configured or designed to facilitate a user in configuring associations between various condiment items and condiment groups. For example, as illustrated in the example embodiment of FIG. 32, the Condiment Group Configuration GUI includes a Condiment Item GUI portion 3220 which may be populated with various types of BOD condiment items (e.g., Ice 3222). Additionally, the Condiment Group Configuration GUI also includes a Condiment Group GUI portion 3210 which may be populated with various types of BOD condiment groups (e.g., Non-Alcoholic Beverages 3122). As illustrated in the example embodiment of FIG. 32, the Condiment Group Configuration GUI may be configured or designed to provide "drag & drop" functionality (e.g., as illustrated within the outlined region 3240) for facilitating a user in configuring associations between various condiment items and condiment groups. In this particular example, it is assumed that a user is using the GUI's "drag & drop" functionality to add the selected condiment item: ICE to the condiment group: NON-ALCOHOL BEV. In at least one embodiment, this may be achieved by selecting and holding the displayed "ICE" object 3222 (e.g., using computer mouse or touchscreen display), dragging a representation of the "ICE" object until it is positioned over the "NON-ALCOHOL BEV" object 3212, and "dropping" the "ICE" object into the "NON-ALCOHOL BEV" object (e.g., by releasing the hold of the "ICE" object), thereby creating an association between nonalcoholic beverages and ice. In some embodiments, the BOD System may be configured or designed to interpret this ICE/NON-ALCOHOL BEV association as indicating that all nonalcoholic beverages are to be served with ice. In other embodiments, the BOD System may be configured or designed to interpret this ICE/NON-ALCOHOL BEV association as indicating that patrons are to be automatically offered an option of adding ice to their drink when ordering nonalcoholic beverages via the frontend BOD Service Menu GUI(s).

For example, in at least one embodiment, similar "drag & drop" functionality may also be provided in one or more frontend BOD Service Menu GUIs displayed to patrons (e.g., via EGM display). For example, in one embodiment, when a patron orders a nonalcoholic beverage via the BOD Service Menu interface at an EGM display, the BOD System may automatically respond by displaying a list of condiment items (e.g., ice, lemon, lime, etc.) which may be individually selected by the patron and added to the beverage order.

According to different embodiments, the BOD Service Menu GUIs may be configured or designed to enable patrons to request various types of condiment items to be added to one or more menu items ordered via BOD system. Examples of typical complementary condiment may include, but are not limited to: ketchup, mustard, mayonnaise, etc. Other types of condiment item requests may be more detailed and/or complex, such as, for example, adding bacon to an order of ice cream, or requesting no ice in your water.

In at least some embodiments, the condiment functionality of the BOD System may also be utilized for indicating various types of patron preferences which may be associated with one or more ordered items. For example, in at least one embodiment, the BOD System may be configured to include a "Hamburger Cooking Preference" condiment group which has been configured to include a plurality of different "condiment items" corresponding to Rare, Medium Rare, Medium, Medium Well, and Well Done. When a patron orders a hamburger via the BOD System, the system may identify the "Hamburger Cooking Preference" condiment group, may display the list of "condiment items" (e.g., Rare, Medium Rare, Medium, Medium Well, or Well Done) to the patron, and prompt the patron to indicate how they would like their burger cooked by selecting one of the displayed options. In one embodiment, the user's selection (e.g., Medium Rare) may be processed by the system as if it were a condiment item to be added to the hamburger order.

Figure 33:
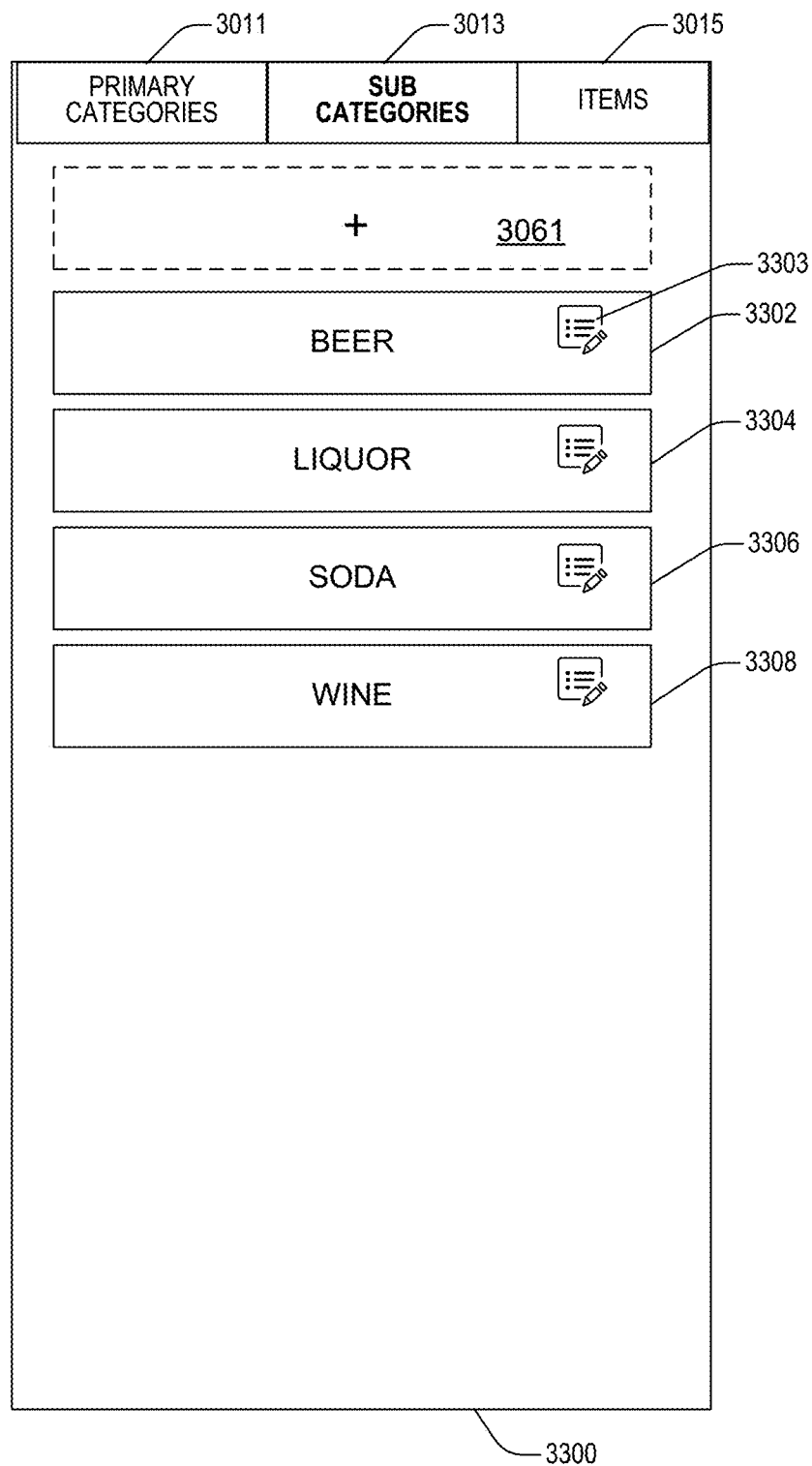

FIG. 33 illustrates an example screenshot of a BOD Menu Configuration GUI 3300 which may be configured or designed to enable a user (e.g., casino admin or manager) to configure, add, create, modify, and/or delete various aspects and content relating to:

One or more BOD menu primary categories (such as, for example, "Beverages/Drinks", "Food", "Merchandise", "Attendant Services", and the like).

One or more BOD menu subcategories (such as, for example, "Beer", "Liquor", "Soda", "Alcoholic Beverages", "Non-Alcoholic Beverages", "Appetizers", "Clothing", and the like).

One or more BOD menu items (such as, for example, "Budweiser", "Coors", "Basket of French Fries", "Margarita", "Baseball Cap", and the like).

Etc.

For example, as illustrated in the example embodiment of FIG. 33, a BOD Sub-Category Menu may be configured or designed to display a plurality of BOD menu subcategories, including, for example, Beer 3302, Liquor 3304, Soda 3306, Wine 3308. In at least one embodiment, this list of BOD menu subcategories may be associated with a BOD menu primary category such as, for example, "Beverages/Drinks". Features, attributes and/or content associated with an identified BOD category (e.g., Beer 3302) may be modified/reconfigured via user interaction with an Edit Icon (e.g., 3303) which may be displayed in association with the identified BOD category. Additional subcategories may be added via "Add Primary Category" GUI portion 3061.

As illustrated in the example embodiment of FIG. 33, the BOD Primary Categories Configuration GUI 3300 may also include navigation tabs (e.g., 3011, 3013, 3015) to facilitate the user in navigating to other BOD Menu Configuration GUIs which may be used for configuring and/or modifying BOD menu primary categories, BOD menu items, etc.

FIG. 34 illustrates an example screenshot of an alternate embodiment of a BOD Menu Configuration GUI 3400 which, as illustrated in this particular example, may be used for configuring the list and layout of BOD subcategories which are to be included in connection with an identified BOD Sub-Category Menu.

Figure 35:
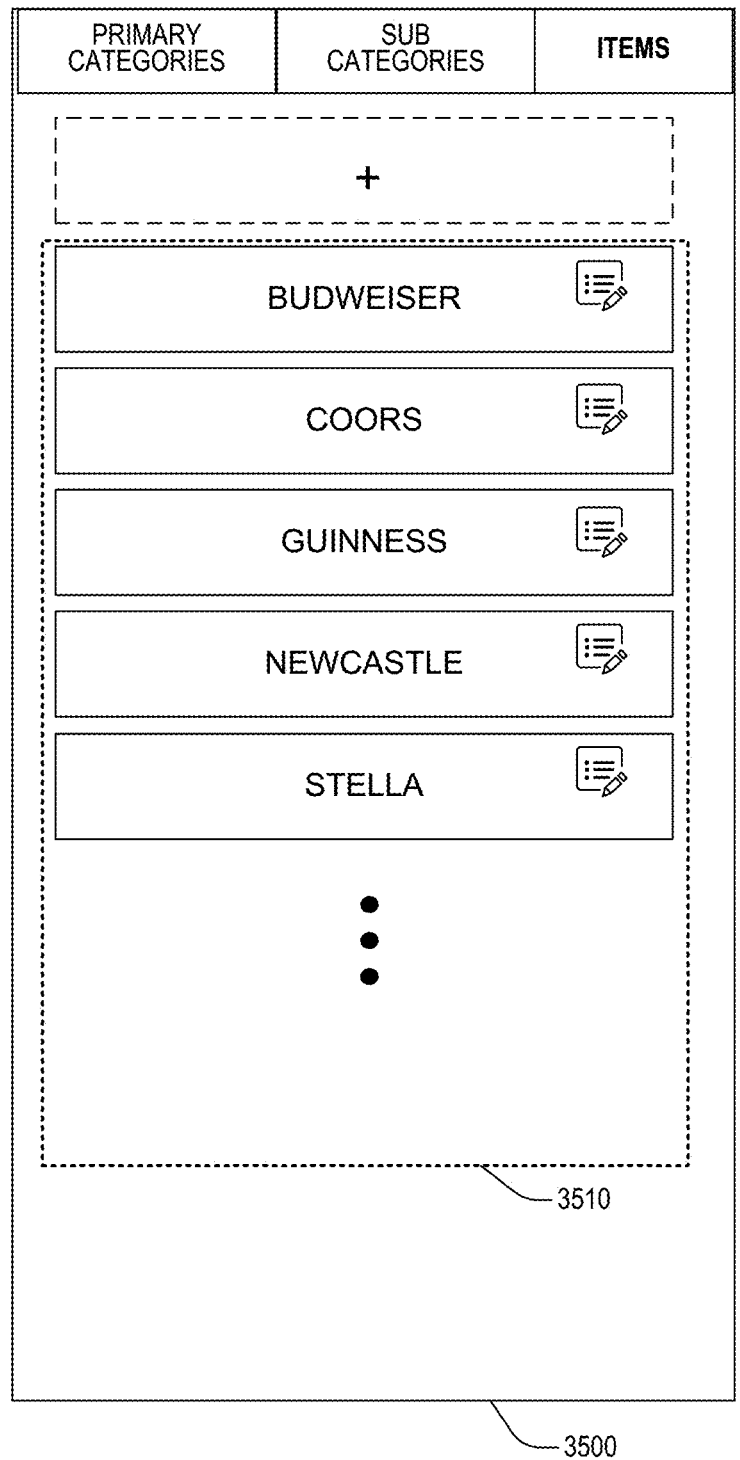

FIG. 35 illustrates an example screenshot of an embodiment of a BOD Menu Configuration GUI 3500 which, as illustrated in this particular example, may be used for configuring the list and layout of BOD menu items which are to be included in connection with an identified BOD Item Selection Menu. In at least one embodiment, the list of displayed BOD menu items 3510 may be configured or designed to be dynamically sortable by the end user (e.g., on EGM GUI) according to desired sorting criteria such as, for example:

Type (Light Beer/Dark Beer)

Price

Bottle/Tap

Popularity and/or other properties associated with the BOD menu items.

FIG. 36 illustrates an example screenshot of an embodiment of a BOD Menu Item Configuration GUI 3600 which may be configured or designed to enable a user (e.g., casino admin or manager) to configure, add, create, modify, and/or delete various properties relating to one or more BOD menu item. For example, in at least one embodiment, the BOD Menu Item Configuration GUI 3600 may be accessed by a casino administrator or manager for adding a new BOD Menu item to the BOD Menu item catalog/database.

As illustrated in the example embodiment of FIG. 36, the BOD Menu Item Configuration GUI may be configured or designed to enable the user to configure, add, create, modify, and/or delete various properties relating to a selected BOD menu item, such as, for example, one or more of the following (or combinations thereof):

BOD Menu Item Name 3610 (e.g., in one or more languages).

BOD Item Ticket Name 3620. In one embodiment, the ticket name may correspond to the name of the BOD Menu Item that may appear on a ticket that prints at the bar. For example, the BOD Menu Item Name could be "Bacon Cheeseburger", while the BOD Item Ticket Name would be "Bcn Chzbrgr."

BOD Item Description 3630. In one embodiment, the BOD Item Description may include a short description to describe the Item. In some embodiments, the BOD Item Description may include images, drawings, and/or icons representing the Item. In some embodiments, the BOD Item Description may be displayed to the patron via the EGM display.

BOD Item required Condiment Groups 3640. In at least one embodiment, Required Condiment Group(s) may require the patron to provide additional input before the patron is allowed to add the selected Item to their order. For example, a BOD Menu Item may have an associated a Required Condiment Group called 'Drink Flavor'. The 'Drink Flavor' Condiment Group may include three "Condiments" corresponding to different flavor choices: 'Cherry', 'Grape', and 'Lemon/Lime'. When the patron adds this BOD Menu Item to their order, the system may automatically prompt the user to choose one of the three condiments flavors to go along with this Item. It will be appreciated that these features help simplify the display of the BOD Menu Items by eliminating the need to display three of the same Items at the same price with the only difference being the flavor of the drink. During configuration of the BOD Item, in order to add a Required Condiment Group to the Item, a user may click on an "Add New Required Condiment Group" button to cause a dropdown menu to be displayed containing some or all of the BOD Condiment Groups that may be added to this Item as a Required Condiment Group.

BOD Item available Condiment Groups 3650. In at least one embodiment, Available Condiment Groups may include Condiments that are allowed to be added to the Item. During configuration of the BOD Item, in order to add an Available Condiment Group to the Item, a user may click on an "Add New Available Condiment Group" button to cause a dropdown menu to be displayed containing some or all of the BOD Condiment Groups that may be added to this Item as an Available Condiment Group.

BOD Item limitations/restrictions. For example, as illustrated in the example embodiment of FIG. 36, the BOD Menu Item Configuration GUI 3600 may include a "New Item Limit Tag" GUI portion 3660 which may be configured or designed to enable a user to assign various ordering restrictions and/or limitations relating to this Item. In the specific example, the "New Item Limit Tag" GUI portion 3660 includes user configurable fields for imposing limits for Alcoholic and/or Non-Alcoholic Items. This means that the patron may only order a certain amount of Alcoholic or Non-Alcoholic Items. Once that limit has been reached the patron may no longer be able to add an Item with that type to their order. To assign a Limit Tag to the Item, check the radio button next to the Limit Tag name BOD Item pricing 3670. As illustrated in the example embodiment of FIG. 36, the BOD Item may be configured to have multiple different prices, which may be automatically and dynamically adjusted/updated based on predefined criteria. A first price may correspond to a Normal Price Level. This is the default price for the Item. If no other price point is available for this Item this is the price the system may use. One or more additional price points may be added to the Item. This may cause the Item have a different price during different Serving Periods. In order to add a different price to the Item, a user may click on a new price point button. When the user clicks this button a dropdown menu may appear filled with some or all of the Serving Periods that have currently been created. Select a Serving Period to continue. After a Serving Period has been selected the user may then fill out the price the user want the Item to be during this period. The user may also delete one or more existing price points, if desired.

BOD Item Tax Properties 3680.

Figure 37:
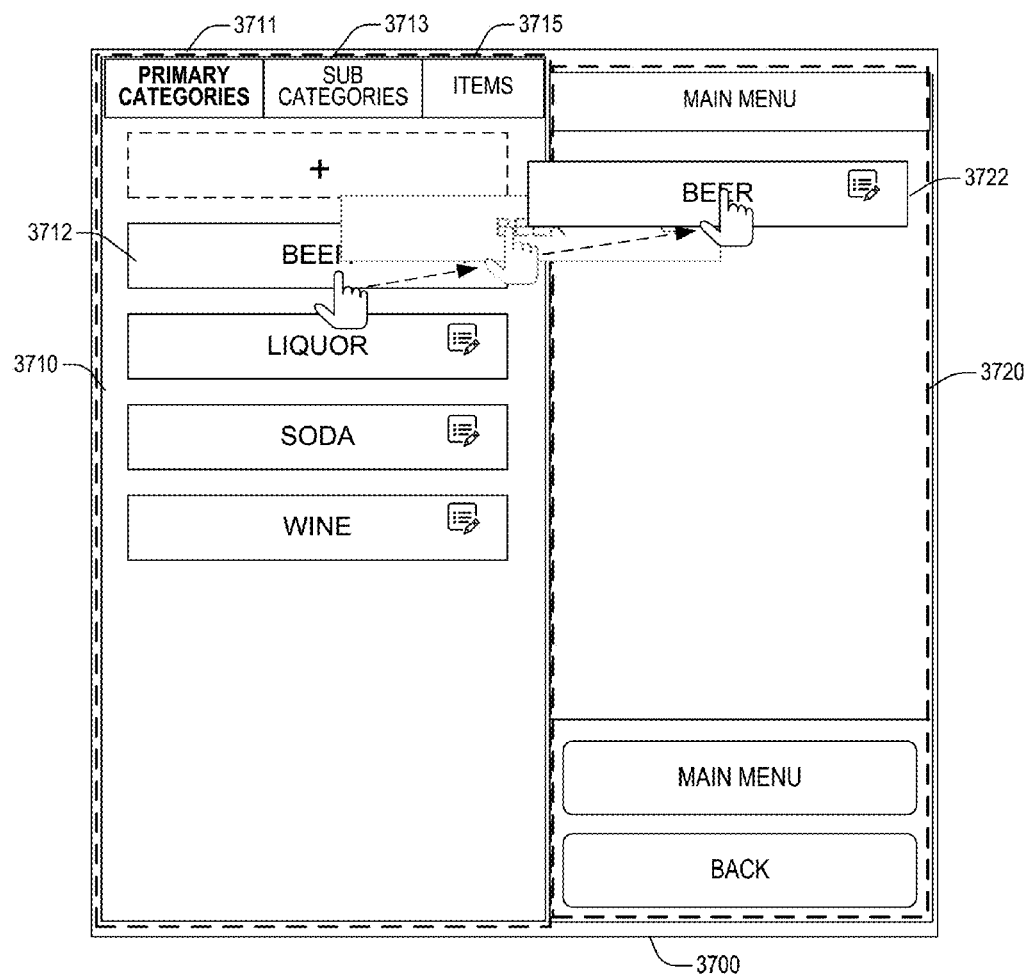

FIG. 37 illustrates an example screenshot of an embodiment of a BOD Menu Layout Configuration GUI 3700 which may be configured or designed to enable a user (e.g., casino admin or manager) to configure, add, create, modify, and/or delete various aspects and content relating to the layouts, appearances, features, and/or contents of one or more BOD Menu GUIs. For example, as illustrated in the example embodiment of FIG. 37, a BOD Main Menu GUI may be configured or designed to display a plurality of BOD Menu Primary Categories, Subcategories and/or BOD Menu Items.

As illustrated in the example embodiment of FIG. 37, the BOD Menu Layout Configuration GUI may be configured or designed to provide "drag & drop" functionality similar to that described with respect to FIG. 32. In the specific example embodiment of FIG. 37, it is assumed that a user is using the GUI's "drag & drop" functionality to select the "Beer" Menu Category 3712 from a list of BOD Menu Primary Categories 3710, and add the selected "Beer" Menu Category as an item of a BOD Main Menu GUI 3720 (e.g., that is intended for presentation via BOD interface of EGM display).

As illustrated in the example embodiment of FIG. 37, the BOD Menu Layout Configuration GUI may also include navigation tabs (e.g., 3711, 3713, 3715) to facilitate the user in navigating to other BOD Menu Layout Configuration GUIs which may be used for configuring and/or modifying other BOD Menu GUIs.

Figure 38:
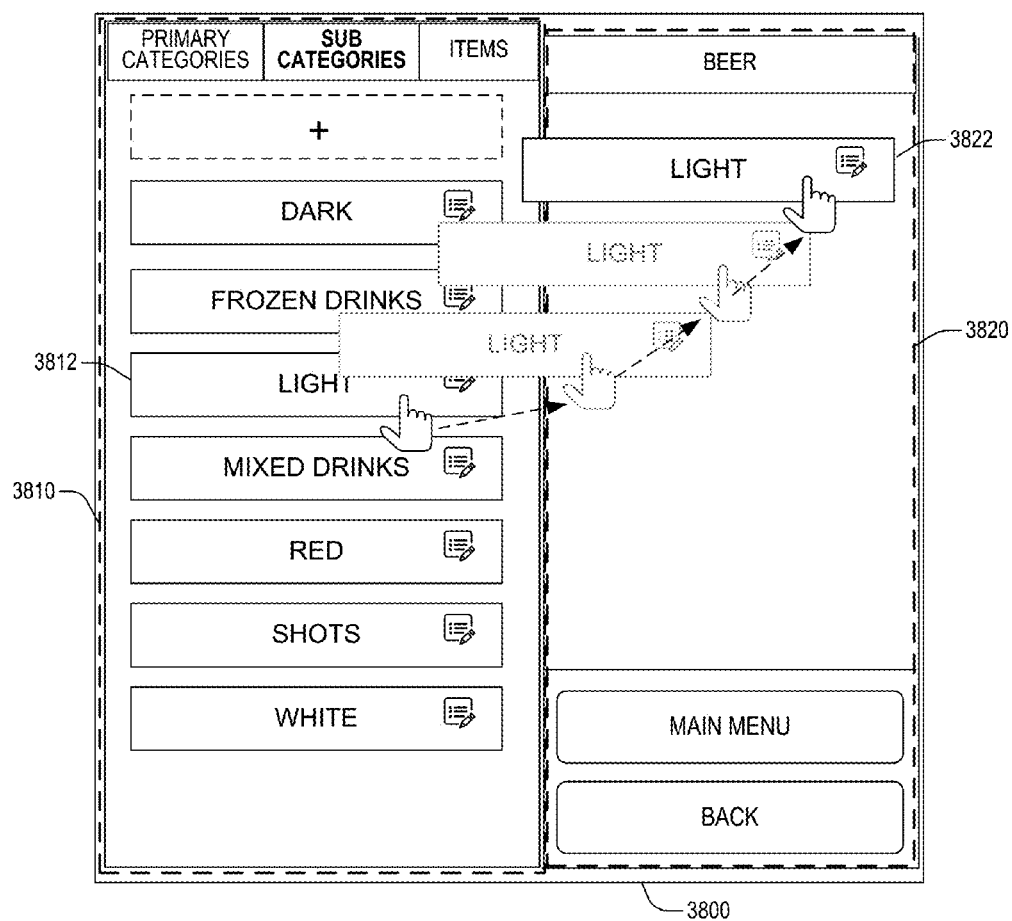

For example, as illustrated in the example embodiment of FIG. 38, the BOD Menu Layout Configuration GUI 3800 a user may use the GUI's "drag & drop" functionality to select the "LIGHT" Menu Category 3812 from a list of BOD Subcategories (e.g., 3810), and add the selected "LIGHT" Menu Category as an item of a BOD Beer Menu GUI 3820 (e.g., that is intended for presentation via BOD interface of EGM display).

Figure 39:
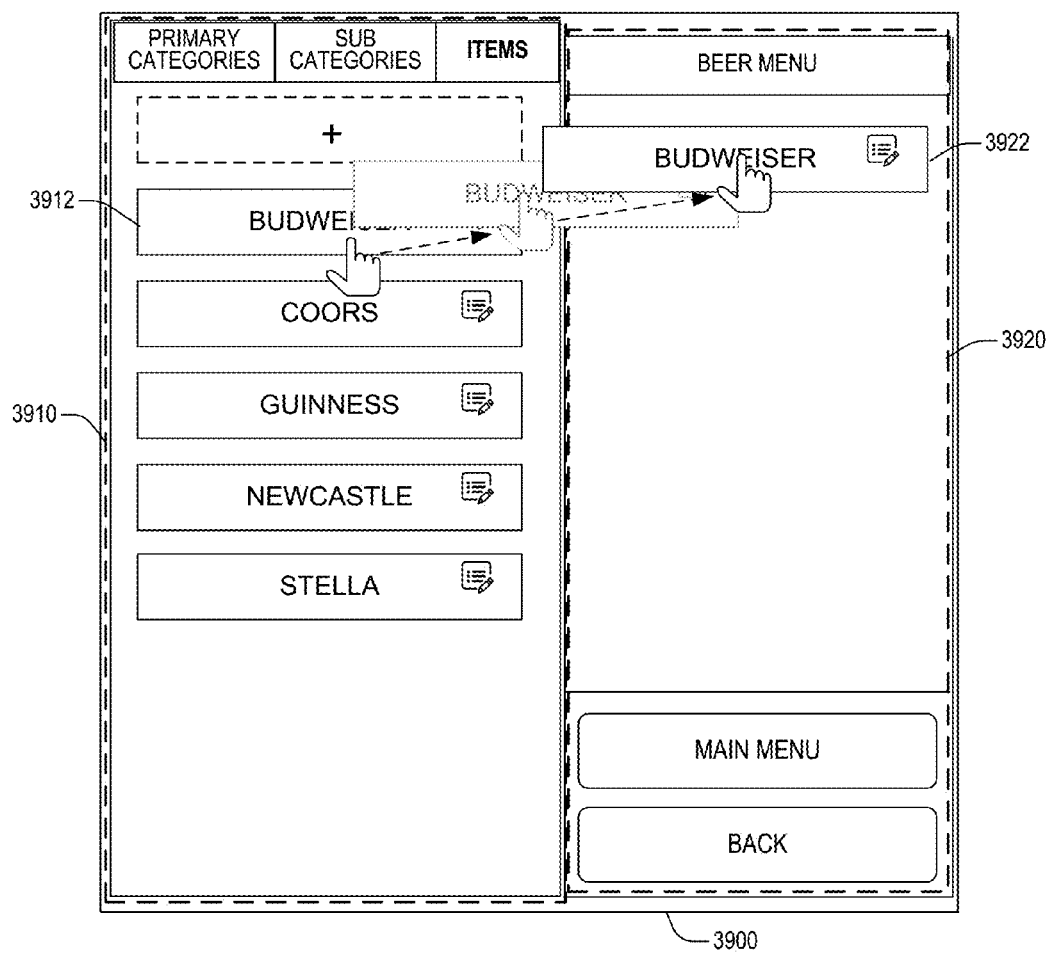

Similarly, as illustrated in the example embodiment of FIG. 39, the BOD Menu Layout Configuration GUI 3900, a user may use the GUI's "drag & drop" functionality to select the "BUDWEISER" Menu Item 3922 from a list of BOD Menu Items (e.g., 3910), and add the selected "BUDWEISER" Menu Item as an item of a BOD Beer Menu GUI 3920 (e.g., that is intended for presentation via BOD interface of EGM display).

In at least one embodiment, the final section of the Menu screen is the EGM preview. This is the area where some or all of the Primary Categories, Sub Categories, and Items get "tied together." One would start by setting up the Main Menu (Primary Categories). The user may then continue by adding Sub Categories to the Primary Categories, and finish off by adding Items to the Sub Categories. When the user first loads up MM Application, the EGM preview may be blank. At that moment, if one were to export the BOD menu to the floor, a patron would not see any items to select from. The Main Menu section may only include Primary Categories. To start building the EGM menu, one would navigate to the Primary Categories tab. This may display a scrollable list of some or all the Primary Categories created. The scrollable list appears adjacent to the EGM view. In order to add a Primary Category to the EGM preview, simply click and hold on the desired Primary Category and drag it over to the EGM preview. Once the user lets go of the mouse the user may drop the Primary Category inside the Main Menu on the EGM preview. The user may continue doing so until some or all of the desired Primary Categories are in the Main Menu. The Primary Categories that the user sees in the Main Menu of the EGM preview may be the categories that the patron sees when they load up BOD® on the EGM. They may appear in the exact order that is displayed on the EGM preview. To change the order that the Primary Categories appear in, click and hold on a Primary Category inside the EGM preview. As the user moves the Primary Category up and down the user may see the other categories move accordingly. Once the user is satisfied with the position of the Primary Category release the mouse to drop it back into the Main Menu. If desired, the user may also remove a Primary Category from the Main Menu without removing it completely from the database. By doing so, this may remove that Primary Category from the Main Menu and update the position of the others. After the Main Menu is set up, it's time to start adding Sub Categories to the Primary Categories. The steps to do this are very similar to adding Primary Categories to the Main Menu.

Configuration of BOD Promotions

According to different embodiments, the Content Panel for the Promotion tab may setup the current Promotion which the casino wants to display. In at least some embodiments, the Content Panel looks differently in comparison to the Menu view. Instead of multiple sections containing scrollable content, the Promotion Content Panel displays a selectable tab (or bar) that displays a promotion name and provides an edit button (similar to the category and item tabs/buttons in the Menu section). The Item that is selected for the promotion may be displayed to the player when BOD is loaded to the EGM display. When the user loads up the Promotion screen, the user may see the Item that is currently being promoted. In order to set the Promotion, navigate to the Promotion Screen and click on the edit icon of the current Promotion. This may bring up the Promotion Edit Panel. From here the user may select the Item that the user wants to be the new promotion. If the user no longer wants any promotion appearing set the current Promotion to 'None'.

Configuration of BOD Bar Parameters

Figure 40:
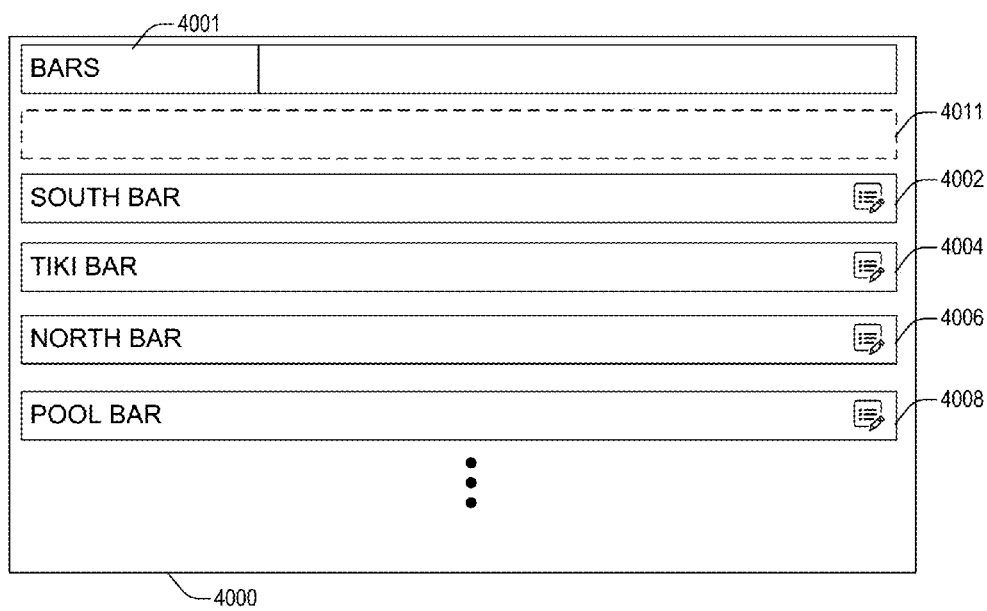

FIG. 40 illustrates an example screenshot of an embodiment of a BOD Bar Configuration GUI 4000 which may be configured or designed to enable a user (e.g., casino admin or manager) to configure, add, create, modify, and/or delete various aspects and parameters relating to one or more casino bars, and associated peripherals/resources such as, for example: printers (e.g., receipt printer, order printer), waitstaff, tablets/mobile devices, etc.

In at least some embodiments, Content Panel for the Bars tab may look similar to the Promotions Content panel (displays a selectable tab (or bar) that displays a name and provides an edit button). The Content Panel for the Bars tab may bring up the list of current Bars. If there are no bars available, the Content Panel may be empty. The bars are where the receipts may be printed when a customer submits their order from the EGM. The user may create different bars so that the EGM may print to the bar closest to it. In order to add a bar, the user first need to click the "+" Add New Bar button. Clicking this button may bring up the New Bar Edit Panel. This is where the user may fill out the required information needed to create a new bar.

Figure 41:
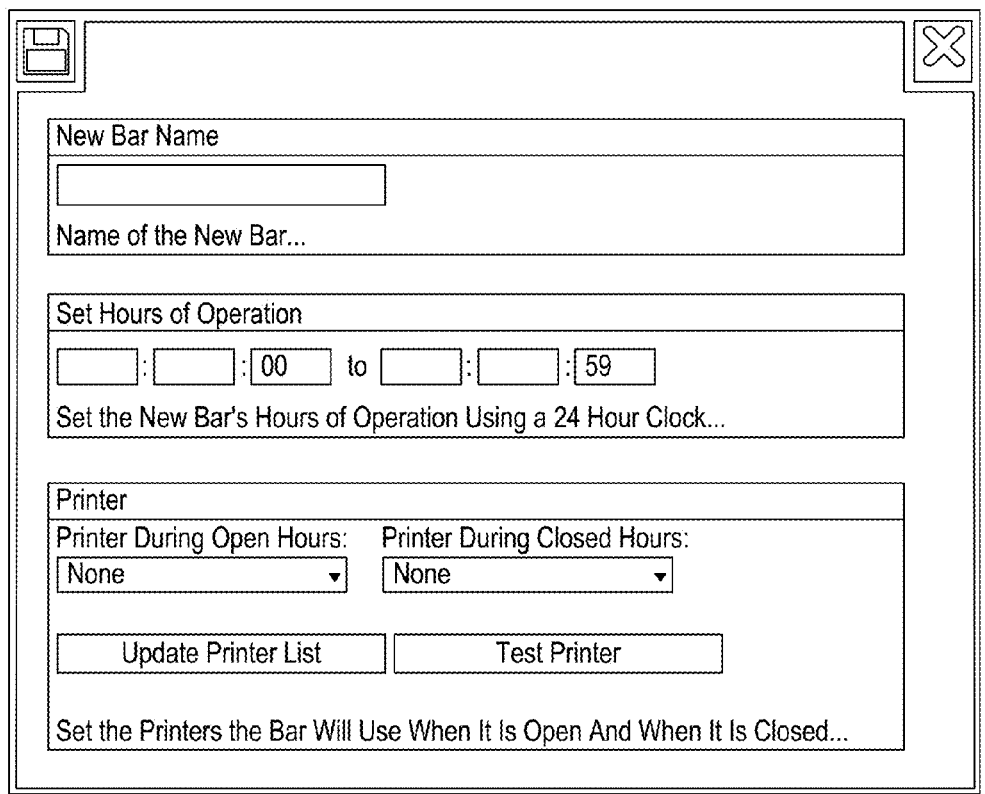

FIG. 41 illustrates an example screenshot of an embodiment of a BOD Bar Edit Panel 4100 which may be configured or designed to enable a user (e.g., casino admin or manager) to configure, add, create, modify, and/or delete various aspects and content relating to one or more casino bars.

By way of illustration, in one embodiment, there are three sections in the bar Edit Panel: New Bar Name, Set Hours of Operation, and Printer. The first section is the New Bar Name. The name of the Bar may be something that is easily recognizable to what Bar in the casino it belongs to. In the example Bar shown, the Bar is named "South Bar". This indicates that the Bar to be printed to is located on the south side of the casino. The next section to fill out is Set Hours of Operation. In this section the user may define the open and close time of the Bar. These boxes are based on a 24 hour clock (4 am=4:00, 4 pm=16:00). The first three boxes indicate the open time. The first box is for hour and the second is for minutes. The third box is for seconds but that is defaulted to 0. The last three boxes indicate the close time for the Bar. The first box is for hours and the second box is for minutes. The third box is for seconds but that is defaulted to 59. If the bar never closes, the user may set the open time to 00:00:00 and the close time to 23:59:59.

The final section to fill out is the Printer section. This is where the user defines the printer that the Bar may print at. There are two dropdown menus in this section. The first menu is for what printer the Bar uses when it's open. When the user opens this menu the user may see a list of printers that are accessible to the server. Choose the printer that this Bar uses. The second dropdown menu is for the printer the Bar may use if it's closed. For example: if all Bars in the casino closes except for one, the user may select the printer of the Bar that is still open in this menu. This may allow the EGMs that are tied to a closed bar to still be able to use BOD® on the EGM. If the user wants the EGMs that are tied to this bar to close down with the bar, select 'None' as the printer for the closed hours. This may cause a message saying that the bar is closed to appear on the EGM. This message is customizable from the Configure Screen (discussed later). If the dropdown menu for the printers is empty or not up to date, the user may need to click the "Update Printer List" button. It may take a second for the printer list to load. Once it does the user may select a printer from the dropdown list.

In at least one embodiment, the BOD System supports network POS printers. A 'Test Printer' button is available to make sure that BOD may print to the selected printers. Pressing this button may print out a small test page on the printers selected in the dropdown menus. NOTES: The BOD service may be running in order to use the "Update Printer List" button. Also, the server may have access to the printer on the network in order to print to it. Also, the BOD service may be running to use the "Test Printer" button. When the user is finished filling out the sections, click on the save icon to create the Bar. In order to edit a Bar, click on the edit icon. Clicking this icon may bring up the Bar Edit Panel. From here the user may change any of the information that was set when creating the Bar. In order to delete a bar, click on the "Delete Bar" button.

Configuration of BOD Serving Period Parameters

Figures 42, 43:

FIG. 42 illustrates an example screenshot of an embodiment of a BOD Serving Period Configuration GUI 4200 which may be configured or designed to enable a user (e.g., casino admin or manager) to configure, add, create, modify, and/or delete various aspects and parameters relating to various BOD Item serving periods. In at least one embodiment, a Serving Period describes the time of day when certain items appear and at what price.

According to different embodiments, aspects relating to Item pricing and availability may be configured or designed to dynamically vary depending on different conditions/criteria such as, for example, one or more of the following (or combinations thereof):

Time of Day;
Patron/Customer ID (e.g., high rollers may be allowed to order breakfast 24/7);
Availability;
Relative level of traffic/customers at bar/restaurant location (real-time);
Relative real-time demand of services/orders (e.g., prices may increase if the number of orders currently in queue exceeds some predefined threshold);
Etc.

In some embodiments, the Content Panel of the Serving Period screen may show some or all of the Serving Periods that have currently been created. In one embodiment, all times under a Serving Period are define in a 24 hour format (e.g. 4 pm=16:00). Serving Periods are directly related to pricing levels. When a Serving Period is created a new price level may appear in the dropdown menu when creating/editing an item. In order to create a Serving Period the user may first click on the "+" Add New Serving Period button. Clicking on this button may display the Serving Period Edit Panel. This is where the user may fill in the required information needed to create a new serving period.

In one embodiment, the Serving Period Edit Panel has two sections. The first section is New Serving Period Name. The name of the Serving Period may be something that is easily recognizable to what time the serving period represents. Examples of serving period names would be: Breakfast, Lunch, Happy Hour, or Dinner. The next section to fill out is the New Serving Period Time. In this section the user may define the time of the serving period. The input boxes are based on a 24 hour clock (e.g. 4 am=4:00, 4 pm=16:00). The first three boxes indicate the start time. The first box is for hours, the second box is for minutes, and the third box is for seconds (which is default to 0). The last three boxes indicate the end time of the serving period. The first box is for hours, the second box is for minutes, and the third box is for seconds (which is default to 59). It's important to note that serving periods cannot overlap. If a serving period falls in the middle of another they may be separate. For example: Let's say Dinner starts at 3 pm (15:00) and ends at 1am (01:00). However, in the middle of dinner there is a Happy Hour that lasts from 4 pm (16:00) to 6 pm (18:00). In order to accomplish this, the user may break up dinner into 2 different serving periods. The end result would look like this: Dinner (Part 1): 15:00:00-15:59:59, Happy Hour: 16:00:00-17:59:59, Dinner (Part 2): 18:00:00-00:59:59. When the user is finished filling out the sections, click on the save icon to create the Serving Period. In order to edit a Serving Period, click on the edit icon. Clicking this icon may display the Serving Period Edit Panel. From here the user may change any of the information that was set when creating the Serving Period. In order to delete a serving period, click on the "Delete Serving Period" button.

Configuration of BOD Waitstaff Parameters

FIG. 43 illustrates an example screenshot of an embodiment of a BOD Waitstaff Configuration GUI 4300 which may be configured or designed to enable a user (e.g., casino admin or manager) to configure, add, create, modify, and/or delete various aspects and parameters relating to one or more Waitstaff.

In at least one embodiment, the Content Panel for Waitstaff displays the pin that is currently being used to close out orders. When a player has submitted an order, they may see a pin pad displayed on the EGM (whenever they open/re-open BOD). To close out an order as "delivered" the waitress/waiter may put in the pin number. The user may change the pin number used to close out orders by clicking on the edit icon. Clicking on this icon may display the Waitstaff Edit Panel. From here, the user may set the pin to be any 4-8 digit number. When the user is finished setting up the pin, click the save icon to save any changes.

Configuration of BOD EGM Parameters

Figure 44:
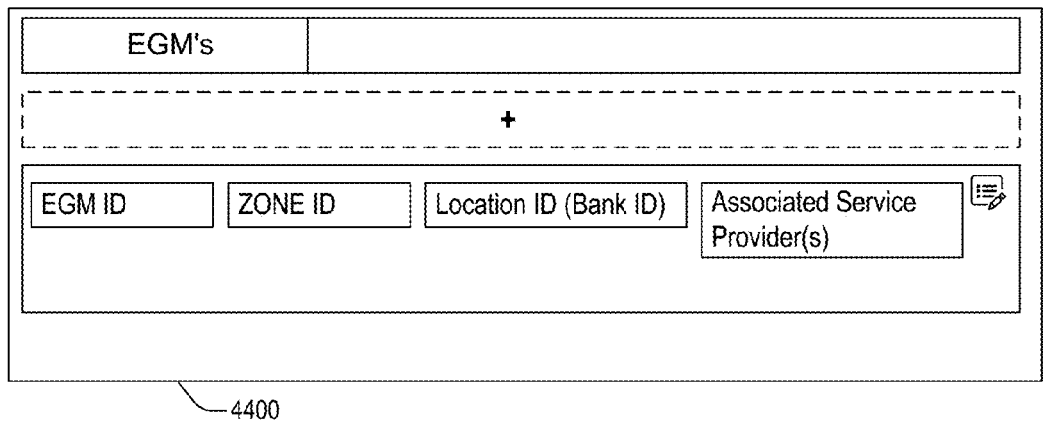

FIG. 44 illustrates an example screenshot of an embodiment of a BOD EGM Configuration GUI 4400 which may be configured or designed to enable a user (e.g., casino admin or manager) to configure, add, create, modify, and/or delete various aspects and parameters relating to one or more EGMs.

In at least one embodiment, the Content Panel for the EGM's may display a list of some or all the EGM locations currently created. The EGM location comprises of the zone and bank of the EGM. The user may use these created EGM locations to assign the EGM's on the floor to a bar. In order to create an EGM location the user first clicks on the "+" Add EGM Location button. Clicking on this button may display the EGM location Edit Panel. This is where the user may fill in the required information needed to create a new EGM location. From here the user may need to fill out three sections: New EGM Zone, New EGM Bank, and Associated Bar. The first section is the New EGM Zone. The user may need to put in the zone that the EGM is located at. The second section is the New EGM Bank. The user may need to put in the EGM's bank number here. The third section is the Associated Bar. This may display a list of some or all the bars that have been created. Selecting a bar from the list may assign this EGM to that bar. Each order that is placed on this EGM may print based on that bar's information. In order to edit an EGM location, click on the edit icon. Clicking this icon may display the EGM Location Edit Panel. From here the user may change any of the information that was setup when creating the EGM locations. In order to delete an EGM location, click on the "Delete EGM Location" button.

Configuration of BOD Ad Parameters

Figure 45:
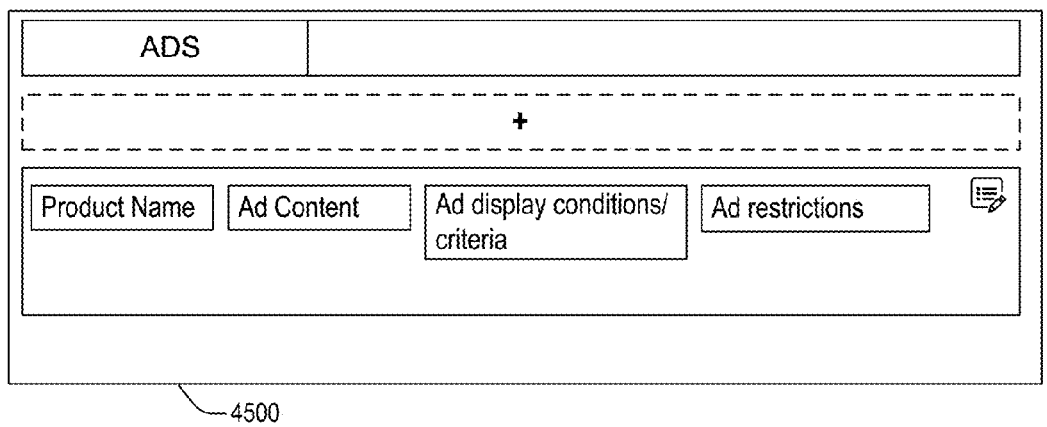

FIG. 45 illustrates an example screenshot of an embodiment of a BOD Ad Configuration GUI 4500 which may be configured or designed to enable a user (e.g., casino admin or manager) to configure, add, create, modify, and/or delete various aspects and parameters relating to one or more ads to be presented via the BOD System.

In at least one embodiment, the Content Panel for Ads may display some or all of the items that are set to be inside the Ad section of the skin (i.e., graphical interface displayed on the EGM). The Ad section of the skin may rotate between these items. This may allow a patron to have quick access to some or all of these items. In order to add an Ad to the rotation, click the "+" Add Ad button. Clicking this button may display the Add New Ad Edit Panel. From here the user may have a dropdown menu listing some or all the items that have currently been created. Select the item the user wants to add from the menu. Once the user has selected your item, click save to add it to the rotation. In order to remove an Ad from the rotation, click on the "Delete from Ad" button.

Configuration of BOD Item Tax Parameters

In at least one embodiment, the Content Panel of Tax may display the current tax percentage. This percent may be applied to some or all items in the patrons order. In order to set the current tax, click on the edit icon. Clicking this button may display the Tax Edit Panel. From here the user may set the current tax percentage. When the user is finished filling out the tax percentage, click the save icon.

Configuration of BOD Item Limits/Restrictions Parameters

FIG. 46 illustrates an example screenshot of an embodiment of a BOD Limits Configuration GUI 4600 which may be configured or designed to enable a user (e.g., casino admin or manager) to configure, add, create, modify, and/or delete various aspects and parameters relating to one or more limits and/or restrictions (herein "Limits") which may be assigned to various BOD Menu items.

According to different embodiments, different Limits may be defined/configured based on specifically defined conditions/criteria such as, for example, one or more of the following (or combinations thereof):

Per order
Per person
Per EGM
Per menu item
Per time period
And/or other criteria By way of illustration, in some embodiments, the Content Panel for Limits may display some or all of the Limit Tags that have been created, as well as their amounts. Limit Tags are something the user may attach to an Item. At least one Limit Tag may have an amount associated with it. The amount associated with the Limit Tag may determine how many of those Items the player may add to their order. For example: We may create a Limit Tag called 'Alcoholic' and set it's amount to 2. This means that the player may only add 2 Items with the 'Alcoholic' Limit Tag. These Items could be the same ones or different ones, but either way only 2 Items with this tag may be added to the order. When the player has reached the limit for those Items, the "add to order button" for any Item with that tag may be grayed out. In order to create a limit tag, click on the "+" Add Limit Tag button. Clicking on this button may display the New Limit Tag Edit Panel. This is where the user may fill in the required information needed for creating a new Limit Tag. There are two sections to fill out: New Limit Name and New Limit Amount. The first section is New Limit Name. This is where the user may assign the Limit Tag a name. The name may be something easily recognizable to the items it may be attached to. NOTE: An item may only have ONE Limit Tag attached to it. The second section is New Limit Amount. This is where the user assigns the amount of items with this Limit Tag the player may be allowed to add to their order. In order to edit a Limit Tag, click on the edit icon. Clicking on this icon may display the Limit Tag Edit Panel. From here the user may change any of the information that was set when creating the Limit Tag. When the user is finished filling out the Limit Tag information, click the save icon to save any changes. In order to delete a Limit Tag, click on the "Delete Limit Tag" button.

Configuration of Other BOD Parameters

FIG. 47 illustrates an example screenshot of an embodiment of a BOD Parameter Configuration GUI 4700 which may be configured or designed to enable a user (e.g., casino admin or manager) to configure, add, create, modify, and/or delete various aspects and parameters associated with the BOD System.

In at least one embodiment, the Content Panel for the BOD Parameter Configuration GUI (herein "Configure") may display various sections dedicated to configuring the basic information for the BOD System.

The Database Information section is where the user may change how to access the database. In order to access this information, click on the edit icon. Clicking on this icon may display the Database Information Edit Panel. The Database Information section contains four parts: Change username, Change Password, Change Database, and Change Server. The first section is Change Username. This is where the user may put the username needed to access the database. The second section is Change Password. This is where the user may change the password to access the database. Enter the old password that was used in the first field, and then enter the new password the user want into the second field. The last field is to verify the new password. The third section is Change Database. This is where the user may change the database the Menu Manager may use to display the Menu information. The final section is Change Server. In this section the user may set the server that the BOD® database is located on. When the user is finished filling out the Database Information, click the save icon to save any changes.

The Language section is where the user may set what languages are available for the player to access inside the Beverage On Demand® skin on the Service Window. This section may determine some or all of the input boxes for Name and Description that appear when creating a Primary Category, Sub Category, or Item. This is where the user may fill out the required information for creating a new Language. The Language Edit Panel comprises of four sections: New Language Name, Language Abbreviation, Default Language, and Supported Language. The first section is New Language Name. This is where the user may fill out the name of the language. This is the name that may display on the EGM when the player presses the Language button. The second section is Language Abbreviation. This is a short abbreviation for the language. The next section is Default Language. The user may check this box if the user want to use this language as the default language. Setting a language as default may make the BOD® skin (displayed on the EGM) load up that language. The final section is Supported Languages. Checking this box may cause this language to appear when the player selects a language from the BOD® skin on the EGM. When the user is finished filling out the section for New Language, click the save icon to create the language. In order to edit a language, click on the edit icon. Clicking on this button may display the Language Edit Panel.

From here the user may change any of the information that was set when creating the language. Use the dropdown menu under "Choose Language" to change the language the user want to edit. When the user is finished filling out the language information, click on the save icon the save your changes. In order to delete a language, click on the "Delete Language" button. After the user has created languages, the user may configure which language is default and which languages are supported by clicking the edit icon. Clicking this icon may display the Language Edit Panel. This dialog has two sections, Default Language and Supported Languages. The first section is Default Language. This section displays a dropdown menu of the languages that have been created. The user may select a different default language here. The second section is Supported Languages. This section may allow the user to add and remove supported languages. When the user is finished changing the language information, click the save icon to save any changes.

The EGM Translation section is where the user may change some or all of the phrases that appear on the BOD® skin. Selecting the edit icon may display the EGM Translation Edit Panel. The EGM Translation Edit Panel comprises of two sections: Language to translate and Phrases. The first section is Language to Translate. This section contains a dropdown menu filled with the languages that have been created. Here the user may select what languages the user wants to start translating. The second section is Phrases. Here is a list of phrases with their description above them. The user may edit these phrases to fit the language the user is translating. When the user is finished translating the phrases, click the save icon to save any changes.

The Currency section may allow the user to setup how the currency is formatted. Clicking on the edit icon may display the Currency Edit Panel. The Currency Edit Panel comprises of three sections: Currency Symbol, Currency Delimiter, and Currency Decimal. The first section is Currency Symbol. Here the user may change the symbol to use in front of any price. The second section is Currency Delimiter Here is where the user may setup the character that appears when a price enters the thousands (e.g. 1,000 the"," character is the delimiter). The last section is Currency Decimal. Here the user may be able to set the character that may appear before the cents in a price (e.g. 3.99 the "." Character is the decimal). When the user is finished setting the Currency information, click the save icon to save any changes.

The Item Limit Per Order section may allow the user to set how many items the player is allowed to place in one order. This is not to be confused with Limit Tags. Limit Tags only apply to items with the same tag whereas Item Limit Per Order is applied to all (or selected) items in the menu. In one embodiment, the Item Limit Per Order may override any Limit Tags that are set. Example: if the user set the Limit Tag of "Alcoholic" to be 5 and the Item Limit Per Order to be 2, the player may only be able to order 2 items total. Clicking on the edit icon may display the Item Limit Per Order Edit Panel. This Edit Panel only has one section: Limit of Items per Order. In this section the user may define how many items the player is allowed to add to their order. When the user is finished setting the Item Limit, click the save icon to save any changes.

The Time Limit Between Orders section allows the user to set up how much time may pass before the player may place another order. Clicking on the edit icon may display the Time Limit Between Orders Edit Panel. This dialog only has one section: Time Limit Between Orders. The user may set how long (in minutes) the player may wait before placing another order. When the user is finished setting the time limit, click the save icon to save any changes.

The Order Time Out section allows the user to set how long to wait before a player pulls their card from the machine before automatically cancelling the order. When a player pulls their card out of the machine a message informing the staff may print at the bar associated with that machine. The player then has a certain amount of time to put their card into another (or same) machine before their order is automatically cancelled. This is where the user may define that time. In some embodiments, if the player inserts their card into another machine before the time limit expires, a message informing the staff may print out at the bar associated with the original machine. Clicking on the edit icon may display the Order Time Out Edit Panel. This dialog has one section: Time After Card out. In this section the user may put the amount of time (in minutes) that may pass, after the player has pulled their card, before the order is automatically cancelled. When the user is finished setting up the time out limit, click the save icon to save any changes.

The Comments section is where the user may define if the player is allowed to add comments to their order. If this is enabled when a player is viewing their order, they may see an "Add Comments" button. Clicking this button may bring up a keyboard where they may type additional information to the staff members. Comments could allow the player to inform the staff to "Bring 2 straws" or "Extra napkins." Clicking on the edit icon may display the Comments Edit Panel. This dialog has only one section: player Comments. This section may let the user enable or disable player comments. When the user is finished setting the comments, click the save icon to save any changes.

The Receipt section may allow the user to customize the look of the receipt that prints out at the bar. Clicking on the edit icon may display the Receipt Edit Panel.

FIG. 48 illustrates an example screenshot of an embodiment of a BOD Receipt Configuration GUI 4700 (referred to as "Receipt Edit Panel") which may be configured or designed to enable a user (e.g., casino admin or manager) to configure, add, create, modify, and/or delete various aspects and parameters associated with the BOD transactions and receipts.

In at least one embodiment, the Receipt Edit Panel may include seven sections: Header Line 1, Header Line 2, Header Line 3, Patron Information Options, EGM Information Options, Footer Line 1, and Footer Line 2. The first three sections have to do with the header of the Receipt. For Header Line 1, Header Line 2, and Header Line 3 the user may fill out any information that the user would like displayed at the top of the Receipt. The forth section is Patron Information Options. In this section the user may turn on/off some or all portions of the information about the patron that the user want to appear on the Receipt. The fifth section is EGM Information Options. This is where the user may turn on/off some or all portions of the information about the EGM that the user want to appear on the Receipt. The last two sections have to do with the footer of the Receipt. For Footer Line 1 and Footer Line 2 the user may fill out any information that the user would like displayed at the bottom of the Receipt. When the user is finished filling out the information about the Receipt, click the save icon to save any changes. An example of the Receipt that may be printed at the Bar is illustrated in FIG. 49.

In at least one embodiment, The Receipt Translation may allow the user to translate any of the phrases that appear on the Receipt (ex: Player Name, Machine Number). Click on the edit icon to open the Receipt Translation pop up dialog. The Receipt Translation pop up dialog has one section: Phrases. Here is where the user may change the translation of the phrases that appear on the Receipt. When the user is finished translating the phrases for the Receipt, click the save icon to save any changes.

FIG. 49 shows an example embodiment of "BOD Order Ticket" which may be automatically displayed or printed out at a designated BOD fulfillment station (e.g., specifically selected bar/restaurant) in connection with a BOD order submitted by a specific patron at a specific EGM. In at least one embodiment, the BOD Order Ticket may also serve as the customer's (e.g., patron's) receipt. According to different embodiments, the BOD Order Ticket (or other type of ODS Order Ticket) may include various information such as, for example, one or more of the following (or combinations thereof):

Information relating to the identity and location of the casino.

Information 4902 relating to the order date, time, day, order number, etc.

Information 4904 relating to the player/patron identity, player/patron location, EGM ID, EGM location (e.g., bank, zone), etc.

Information 4906 identifying each ordered item and associated condiments to be included with each ordered item, price of each ordered item, etc.

Pricing Information 4908 relating to subtotal amount(s), food total amount(s), bar total amount(s), tax amount(s), order total amount, etc.

Payment information relating to payments, coupons, comps, and/or discounts applied to the order.

Comment information 4910 which may include notes or comments provided by the patron to be taken into consideration when processing the order.

And/or other types of information described and/or referenced herein.

BOD Reporting Functionality

FIGS. 50-54 illustrate example screenshot embodiments of various BOD Report GUIs which may be configured or designed to enable a user (e.g., casino admin or manager) to generate various types of reports relating to selected aspects of the BOD System. In some embodiments, the BOD Report GUIs also may be configured or designed to enable a user (e.g., casino admin or manager) to access, monitor, track, and/or manage real-time status information relating to the BOD orders, inventory, personnel, etc.

By way of illustration, in one embodiment, the Content panel for the Reports Screen (FIG. 50) may allow the user to view some or all of the transactions that have occurred using the Beverage On Demand® System. Here the user may be able to view some or all the orders that have been placed, as well as view the receipt and generate reports. The Reports Screen comprises of three tabs: Order Tracking, Delete Orders, and Generate Reports.

Clicking on the Order Tracking tab 5003 may give the user a list of some or all of the orders that have been placed on the selected day. The right section of the screen may show the full order for the one selected on the left. The user may select a different day to view from the 'Select Date' drop-down menu.

Clicking on the Delete Orders tab 5005 may allow the user to remove old transactions from the system's database. To delete old transactions select the date that the user would like to delete up to and click the 'Delete Transactions' button. When selecting a date keep in mind that it may delete some or all of the transactions that have taken place on AND before the selected date.

The Generate Reports tab 5007 may allow the user to generate reports based on different criteria. When the user first loads up the Reports tab the user may need to select which type of report the user want, the start date and end date, and then press the 'Apply Filter' button. NOTE: If the user leaves the start and end date alone the user may get all of the orders regardless of the date. There are a total of four different reports to choose from: Location, Date, Items, and Player.

The Location report (e.g., FIG. 51) may group some or all of the transactions by the location the transaction came from. In this report the user may see the location the transactions came from, the number of sales that took place in that location, the total amount the sales add up to, and the average price of at least one.

The Date report (e.g., FIG. 52) may group some or all of the transactions by the date they took place. In this report the user may see the date the transactions took place, the number of orders that occurred on that date, the total amount the sales add up to, and the average price per sale.

The Items report (e.g., FIG. 53) may group the transactions by the items that have been ordered. Here the user may see how many of at least one item has been sold, the name of the item, and the total amount of sales made from that item.

The Player report (e.g., FIG. 54) may group the transactions by player. In this report the user may see the player's ID, the player's name, the number of orders they have placed, the total amount of sales from that player, and the average price of at least one sale.

After the user has chosen a report (and a filter if wanted), the user is given the option to save the report. In order to save the report click the 'Save Report' button at the bottom of the Reports tab. This may create a CSV file on the BOD™ server. The user may choose to save this file anywhere, however, backup report files are automatically saved on the BOD™ server.

The Content Panel for the Export Screen may export the database for use on the EGM. Any changes saved to the database may not appear on the EGM until the database has been exported. If there are any problems with items missing on the EGM this is the first thing that may be checked. The Export Screen may have one row with the name "EXPORT". In order to export the database for use on the EGM click on the edit icon. Clicking on this icon may bring up the Export pop up dialog. To confirm export to the database, click on the edit icon inside the pop up dialog. If the BOD™ service is running, the new menu may appear on the EGM instantly. Otherwise the menu may be updated the next time the BOD™ service is started.

According to different embodiments, the On Demand Services System may be configured or designed to provide alternative and/or additional BOD-related features and functionality such as, for example, one or more of the following (or combinations thereof):

30 day trial with serial activation

Closed loop system

Patron ability to cancel their order

Robust user interface (smartphone inspired)

Robust back-end interface (drag and drop functionality)

Limit the amount of total items a patron may order at once

Limit the amount of alcoholic items a patron may order at once

Limit the amount of orders a patron may order during a given time period

Enable/disable patron's ability to add comments to their order

Configure the order of Categories/Items via the backend system (drag and drop)

Configurable pop-up ad before BOD starts

Configurable ad banner on the BOD patron skin (EGM patron interface)

Configurable receipt information (first name, last name, tier, is birthday)

Custom item images may be uploaded (through IGT's Media Manager)

Card In/Card Out detection (tells waitstaff if patron has left EGM and what new EGM they're at)

Patron notifies of form of payment

Micros integration

Infogenesis integration

Configurable pop-ups (based on age/gender/time/location/birthday/etc.)

Patron favorites (displays top 3 based on starred and/or most ordered)

Configurable drink pop-up for one-time redemption (patron's birthday etc.)

Allow free drinks for different patron tiers

Analytics (tracks how often patron's look at Categories/Items, how often they select said items, and how long they look at promotional ads)

Heat Map generation (shows hot and cold areas of the gaming floor to maximize wager potentials)

Ability to apply X % discount based on gender/age/tier/time/location/etc.

Mobile app (for waitstaff closed loop and ordering)

Limit and/or ban specific patrons (responsible gaming/person systems)

BYOD Set up (Bring Your Own Device) may allow for players to utilize their own devices by logging into a secure local/in-house system Host on Demand (HOD) Services Features and Management In at least one embodiment, "Host On Demand®" allows a patron to contact a host and/or a VIP host via an EGM interface. A more personalized method than pressing the attendant button. Patron machine location/information is sent to a host, VIP host and/or concierge via a "plurality" of configurable means setup within the ODS Menu Manager Application. In at least some embodiments, different features of the HOD Services may be offered or provided for different hosts/services offered by the casino, such as, for example, concierges, bellhops, VIP services, business-related services, etc.

Figure 13:
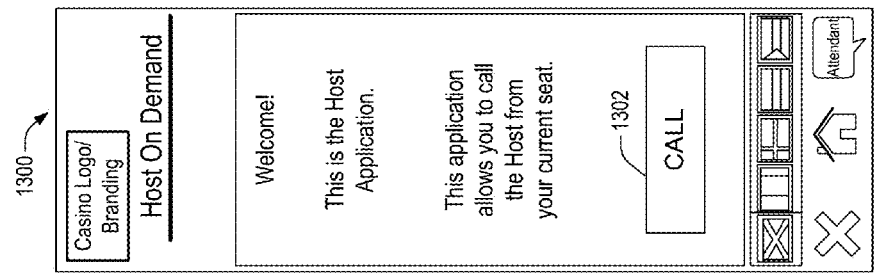

FIG. 13 shows an example screenshot of a HOD Menu GUI 1300, in accordance with one embodiment. The example HOD Menu GUI illustrated in FIG. 13 is configured as a frontend GUI which may be displayed and/or accessed by patrons via one or more EGM interfaces.

FIGS. 19-21 illustrate example screenshot embodiments of various Host On Demand (HOD) Manager GUIs which may be configured or designed to enable a user (e.g., casino admin or manager) to access, manage, configure and/or modify various aspects, features, and parameters relating to the HOD Service(s). In some embodiments, one or more HOD Manager GUIs also may be configured or designed to enable a user (e.g., casino admin or manager) to access, monitor, track, and/or manage real-time status information relating to various aspects of the HOD Service.

In one embodiment, the HOD Manager is where the user may setup the information needed to send alerts. Here, the user may enter the email address from which the user may send alerts as well as indicate whether the user wish to receive the alerts via email, a short message service (SMS), or a printer. In order to access the Manager, navigate to the server on which it is installed. From here, open Internet Explorer®. By default, the homepage may be set to the Synergy Blue AppSite page. If for some reason the home page has changed, the AppSite page may be found at: localhost/appsite. Once the user has loaded up the AppSite, the user may need to click on the Host On Demand® button.

In at least one embodiment, the Manager interface comprises of two sections: Tab Bar and Info Panel. The Tab Bar is where the user may navigate between the different tabs of the HOD® Manager. The three tabs are: General Setup 1902, Host Setup 1904, and Reports 1906. The Info Panel provides some or all the information for the selected tab. Use the Info Panel to view and edit the information needed for at least one tab.

The General Setup tab (e.g., FIG. 19) is where the user may input some or all the information for the sender's email. This is the email that the alerts may come from. The HOD service may be running in order to access the General Setup tab. After loading up the HOD Manager site, the General Setup tab may automatically be selected. The user may now begin filling out the General Setup fields. The first field to fill out is the port number. This is the port that is used to send emails. The default port is 587. This may not need to be changed. The second field to fill out is the actual email address of the sender. Example: myusername@email.com. The third field to fill out is the SMTP server address. This may be the address of the SMTP server the email address from the second filed uses to send emails. Example: smtp.email.com. The fourth field to fill out is the username for the email account. This is the username needed to log into the email address provided in field two. The fifth and sixth field needed to fill out is the password for the email account. This is the password needed to log into the email address provided in field two. The fifth and sixth field may match in order to submit changes. The last thing needed to fill out is a dropdown box. This may be the default language HOD may use when loaded onto the EGM. After the user has filled out some or all of the fields press the "Save" button to save the changes.

The HOD service may be running in order to access the Host Setup tab (e.g., FIG. 20). The Host Setup tab is where the user may choose how the user wants to receive alerts. The HOD™ system is able to send alerts in three different ways: to an email address, to a cell phone using a short message service (SMS), or to a printer. After loading the HOD Manager site, click the Host Setup tab. This may load some or all of the information needed in the Info Panel. From here, the user may select how the user would like to receive alerts. The user may choose at least one; however, if desired, the user may select some or all three options. If the user chooses all three, the user may receive an email, an SMS text, and a printed ticket when a customer uses the when someone uses HOD™ option. Checking the Email check box may activate the email field. In this field, type the email address that is to receive the alerts. Selecting the SMS check box activates three fields: the phone number field, the service provider drop-down menu, and the add a provider field. In the phone field enter the phone number to which the SMS texts may be sent. In the service provider dropdown menu, select the appropriate service provider. To remove a service provider from the list, select that provider in the dropdown list and click the Remove Provider button. The final field may allow the user to add a provider to the dropdown list. The user may need to check with your service provider to find out the correct SMS gateway to use. Make sure the user include everything needed in the SMS gateway that follows the "@" symbol, including the "@" symbol itself at the beginning (e.g. @txt.att.net). After entering the SMS gateway into the provider field, click the Add Provider button to add the provider to the dropdown menu. Selecting the printer check box may activate the printer dropdown menu. From here, select the printer that is to print your alerts. If printer selections do not appear, or the list is out of date, click the Update Printer List button to access the list of printers. After setting up how the user would like to receive alerts, press the Save button to save any changes.

The Reports tab (e.g., FIG. 21) is where the user may be able to access or view (e.g., in real-time) some or all of the calls made by the HOD system. In one embodiment, there are four different types of reports to view: Bank, Calls, Machine Number, and Player. The Bank Report lists how many calls at least one Bank ID has made. The Calls Report lists some or all of the individual calls made. The Machine Number Report lists how many calls at least one machine has made. The Player Report lists how many calls at least one player made. After loading the HOD® Manager site, click the Reports tab. From the dropdown menu, select the type of calls on which to report. From the second dropdown menu, select the appropriate type of report. The system displays the requested call data. The user may filter the reports by selecting a start date and by clicking the Filter Report button. The system lists some or all of the calls that have occurred during that time period. The user may return to the non-filtered view by clicking the Reset Filter button. The user may save a report by clicking the Save Report button. This creates a report from the information that is currently being displayed. After the report is created, the system displays a Save window, which may allow the user to save the file locally.

Security on Demand (SOD) Enhanced Services Features and Management

In at least one embodiment, "Security On Demand®" (SOD) Service allows a patron to contact a security official and/or a medical aid representative. Patron machine location/information is sent to security and/or medical advisor via a "plurality" of configurable means setup within the ODS Menu Manager Application.

Figure 14:
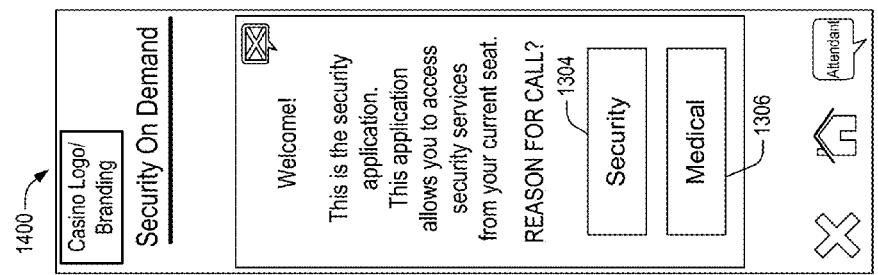

FIG. 14 shows an example screenshot of a SOD Menu GUI 1400, in accordance with one embodiment. The example SOD Menu GUI illustrated in FIG. 14 is configured as a frontend GUI which may be displayed and/or accessed by patrons via one or more EGM interfaces.

FIGS. 22-25 illustrate example screenshot embodiments of various Security On Demand (SOD) Manager GUIs which may be configured or designed to enable a user (e.g., casino admin or manager) to access, manage, configure and/or modify various aspects, features, and parameters relating to the SOD Service(s). In some embodiments, one or more SOD Manager GUIs also may be configured or designed to enable a user (e.g., casino admin or manager) to access, monitor, track, and/or manage real-time status information relating to various aspects of the SOD Service.

In at least one embodiment, the Security On Demand™ Manager is where the user may setup the information needed to send security and medical alerts. Here the user may enter what email to send alerts from, as well as whether to receive the alerts through email, SMS, or printer. In order to access the Manager, navigate to the server that it was installed on. From here, the user may need to open up Internet Explorer. By default the homepage may be set to the Synergy Blue Apps page. Once the user has loaded up the app site the user may need to click on the 'Security On Demand™' button. This may take the user to the Manager interface. The Menu Manager interface comprises of two sections: Tab Bar, and Info Panel. The Tab Bar is where the user may navigate between the different tabs of the Security On Demand™ Manager. The four tabs are: General Setup, Security Setup, Medical Setup, and Reports. The Info Panel provides some or all the information for the selected tab. The info panel may be used to view and edit the information needed for at least one tab.

The General Setup tab (e.g., FIG. 22) is where the user may input some or all the information for the sender's email. This is the email that the security/medical alerts may come from. The SOD service may be running in order to access the General Setup tab. After loading up the Security On Demand™ Manager site the General Setup tab may automatically be selected. The user may now begin filling out the General Setup fields. The first field to fill out is the port number. This is the port that is used to send emails. The default port is 587. This may not need to be changed. The second field to fill out is the actual email address of the sender. Example: myusername@email.com. The third field to fill out is the SMTP server address. This may be the address of the SMTP server the email address from the second field uses to send emails. Example: smtp.email.com. The fourth field to fill out is the username for the email account. This is the username needed to log into the email address provided in field two. The fifth and sixth field needed to fill out is the password for the email account. This is the password needed to log into the email address provided in field two. The fifth and sixth field may match in order to submit changes. The last thing needed to fill out is a dropdown box. This may be the default language Security On Demand™ may use when loaded onto the EGM. After the user has filled out some or all of the fields press the 'Save' button to save the changes.

The Security Setup tab (e.g., FIG. 23) is where the user may choose how the user wants to receive security alerts. The Security On Demand™ system is able to send alerts in three different ways: Email, SMS Message, and Printer. The SOD service may be running in order to access the Security Setup tab. After loading up the Security On Demand™ Manager site, click on the Security Setup tab. This may load some or all of the information needed in the Info Panel. From here the user may select how the user would like to receive security alerts. The user may choose at least one, however, the user may have some or all three selected if the user want. If the user chooses some or all three when someone uses Security On Demand™ the user may get an email, SMS Message, and printed ticket. Checking the Email checkbox may bring up the email field. In this field the user may put the address of the email that the user would like to use to receive security alerts. Checking the SMS checkbox may bring up three fields: the phone number field, the service provider dropdown box, and add a provider field. In the phone number field the user may put the phone number where the user would like to receive security alerts via SMS messages. In the service provider dropdown box, find the service provider for the number provided in the phone number field. To remove a service provider from the list select that provider in the dropdown list and click the 'Remove Provider' button. The final field may allow the user to add a provider to the dropdown list. Make sure the user include everything needed in the Mail to SMS gateway that follows the '@' symbol, including the '@' symbol itself at the beginning (example: @txt.att.net). Checking the Printer checkbox may bring up the printer dropdown box. Here the user may select a printer that the user would like security alerts to print to. If no printers appear, or the list is out of date, click the 'Update Printer List' button to get the list of printers. After setting up how the user would like to receive security alerts, the user may press the 'Save' button to save any changes.

The Medical Setup tab (e.g., FIG. 24) is where the user may choose how the user wants to receive medical alerts. The Security On Demand™ system is able to send alerts in three different ways: Email, SMS Message, and Printer. The SOD service may be running in order to access the Medical Setup tab. After loading up the Security On Demand™ Manager site, click on the Medical Setup tab. This may load some or all of the information needed in the Info Panel.

From here the user may select how the user would like to receive medical alerts. The user may choose at least one, however, the user may have some or all three selected if the user want. If the user chooses some or all three when someone uses Security On Demand™ the user may get an email, SMS Message, and printed ticket. Checking the Email checkbox may bring up the email field. In this field the user may put the address of the email that the user would like to use to receive medical alerts. Checking the SMS checkbox may bring up two fields: the phone number field, and the service provider dropdown box. In the phone number field the user may put the phone number where the user would like to receive medical alerts via SMS messages. In the service provider dropdown box, find the service provider for the number provided in the phone number field. To remove a service provider from the list select that provider in the dropdown list and click the 'Remove Provider' button. The final field may allow the user to add a provider to the dropdown list. Make sure the user include everything needed in the Mail to SMS gateway that follows the '@' symbol, including the '@' symbol itself at the beginning (example: @txt.att.net). Checking the Printer checkbox may bring up the printer dropdown box. Here the user may select a printer that the user would like medical alerts to print to. If no printers appear, click the 'Update Printer List' button to get the list of printers. After setting up how the user would like to receive medical alerts, the user may press the 'Save' button to save any changes.

After loading the Security On Demand™ Manager site, click on the Reports tab (e.g., FIG. 25). The user may choose the type of call the user want to display from the first dropdown menu. The second dropdown menu may allow the user to choose the type of report the user want. The user may filter the reports by selecting a start date and end date and clicking the 'Filter Report' button. This may list some or all of the calls that have occurred during that time. The user may clear out the filter by clicking the 'Reset Filter' button. The user may save a report by clicking the 'Save Report' button. This may create a report from the information that is currently displayed, taking into account the type of call, the type of report, and any filters applied. After the report is created a save dialog box may appear. This may allow the user to save the file locally.

Valet on Demand (VOD) Enhanced Services Features and Management

In at least one embodiment, "Valet On Demand®" (VOD) Service allows a patron to contact the valet services and notify of an estimated arrival time to have ones vehicle ready before they arrive in the vehicle pickup location. In at least some embodiments, the VOD service may also provide access to other casino services such as, for example: car service, transportation service, luggage service, air transportation service, tour service, etc.

FIG. 15 shows an example screenshot of a VOD Menu GUI 1500, in accordance with one embodiment. The example VOD Menu GUI illustrated in FIG. 15 is configured as a frontend GUI which may be displayed and/or accessed by patrons via one or more EGM interfaces.

FIGS. 26-28 illustrate example screenshot embodiments of various Valet On Demand (VOD) Manager GUIs which may be configured or designed to enable a user (e.g., casino admin or manager) to access, manage, configure and/or modify various aspects, features, and parameters relating to the VOD Service(s). In some embodiments, one or more VOD Manager GUIs also may be configured or designed to enable a user (e.g., casino admin or manager) to access, monitor, track, and/or manage real-time status information relating to various aspects of the VOD Service.

In at least one embodiment, the Valet On Demand™ Manager is where the user may setup the information needed to send alerts. Here the user may enter what email to send valet alerts from, as well as whether to receive the alerts through email, SMS, or printer. In order to access the Manager, navigate to the server that it was installed on. From here, the user may need to open up Internet Explorer. By default the homepage may be set to the Synergy Blue Apps page. If for some reason the home page has changed the apps page may be found at: localhost/appsite. Once the user has loaded up the app site the user may need to click on the 'Valet On Demand™' button. The Manager interface comprises of two sections: Tab Bar and Info Panel. The Tab Bar is where the user may navigate between the different tabs of the Valet On Demand™ Manager. The three tabs are: General Setup, Valet Setup, and Reports. The Info Panel provides some or all the information for the selected tab. The info panel may be used to view and edit information needed for at least one tab. The General Setup tab is where the user may input some or all the information for the sender's email. This is the email that the valet alerts may come from. The VOD service may be running in order to access the General Setup tab.

After loading up the VOD™ Manager site the General Setup tab (e.g., FIG. 26) may automatically be selected. The user may now begin filling out the General Setup fields. The first field to fill out is the port number. This is the port that is used to send emails. The default port is 587. This may not need to be changed. The second field to fill out is the actual email address of the sender. Example: myusername@email.com. The third field to fill out is the SMTP server address. This may be the address of the SMTP server the email address from the second field uses to send emails. Example: smtp.email.com. The fourth field to fill out is the username for the email account. This is the username needed to log into the email address provided in field two. The fifth and sixth field needed to fill out is the password for the email account. This is the password needed to log into the email address provided in field two. The fifth and sixth field may match in order to submit changes. The last thing needed to fill out is a dropdown box. This may be the default language Valet On Demand™ may use when loaded onto the EGM. After the user has filled out some or all of the fields press the 'Save' button to save the changes.

The Valet Setup tab (e.g., FIG. 27) is where the user may choose how the user wants to receive valet alerts. The Valet On Demand™ system is able to send alerts in three different ways: Email, SMS Message, and Printer. The VOD service may be running in order to access the Valet Setup tab. After loading up the Valet On Demand™ Manager site, click on the Valet Setup tab. This may load some or all of the information needed in the Info Panel. From here the user may select how the user would like to receive alerts. The user may choose one, however, the user may have some or all three selected if the user want. If the user chooses some or all three when someone uses Valet On Demand™ the user may get an email, SMS Message, and printed ticket. Checking the Email checkbox may bring up the email field. In this field the user may put the address of the email that the user would like to use to receive Valet alerts. Checking the SMS checkbox may bring up two fields: the phone number field, and the service provider dropdown box. In the phone number field the user may put the phone number where the user would like to receive valet alerts via SMS messages. In the service provider dropdown box, find the service provider for the number provided in the phone number field. To remove a service provider from the list select that provider in the dropdown list and click the 'Remove Provider' button. The final field may allow the user to add a provider to the dropdown list. Make sure the user include everything needed in the Mail to SMS gateway that follows the '@' symbol, including the '@' symbol itself at the beginning (example: @txt.att.net). Checking the Printer checkbox may bring up the printer dropdown box. Here the user may select a printer that the user would like valet alerts to print to. If no printers appear, or the list is out of date, click the 'Update Printer List' button to get the list of printers. After setting up how the user would like to receive valet alerts, the user may press the 'Submit' button to save any changes.

The Reports tab (e.g., FIG. 28) is where the user may be able to view some or all of the calls made by the Valet On Demand™ system. There are four different types of reports to view: Bank, Calls, Machine Number, and Player. The Bank Report may list how many calls at least one Bank ID has made. The Calls Report may list some or all of the individual calls made. The Machine Number Report may list how many calls at least one machine has made. The Player Report may list how many calls at least one player has made. After loading the Valet On Demand™ Manager site, click on the Reports tab. The user may choose the type of report the user want from the dropdown menu. The user may filter the reports by selecting a start date and end date and clicking the 'Filter Report' button. This may list some or all of the valet calls that have occurred during that time. The user may clear out the filter by clicking the 'Reset Filter' button. The user may save a report by clicking the 'Save Report' button. This may create a report from the information that is currently displayed, taking into account the type of report and any filters applied.

Weather on Demand (WOD) Enhanced Services Features and Management

In at least one embodiment, "Weather On Demand®" (WOD) Service allows a patron to view local weather (same day as well as multi day forecast) as well as world weather (which is searchable via a provided touch interface input panel).

FIG. 16 shows an example screenshot of a WOD Menu GUI 1600, in accordance with one embodiment. The example WOD Menu GUI illustrated in FIG. 16 is configured as a frontend GUI which may be displayed and/or accessed by patrons via one or more EGM interfaces.

FIG. 29 illustrates an example screenshot embodiment of a Weather On Demand (WOD) Manager GUI which may be configured or designed to enable a user (e.g., casino admin or manager) to access, manage, configure and/or modify various aspects, features, and parameters relating to the WOD Service.

In at least one embodiment, Weather On Demand has a Menu Manager similar to the rest of the On Demand applications and may be accessed through the AppSite interface. The Weather On Demand Manager interface layout comprises of two sections: Tab Bar and Info Panel.

In some embodiments, the only tab for the WOD™ Manager is: General Setup (e.g., FIG. 29). The Info Panel may provide some or all the information for the General Setup tab. The Info Panel may be used to view and edit the information of the General Setup tab. The General Setup tab is where the default information that is displayed on the EGM is configured. To configure the General Setup, there may be (5) sections to fill out: Default Language, Favored Country, Default Location, Measurement System, and API Key. The first field to fill out is Default Language. A dropdown menu is provided to select from the available list of supported languages. The second section is the Favored Country Setup. Select the desired favored country from the dropdown menu. The third section is Default Location. By typing the desired location into the input field, the website may automatically provide suggestions for default locations. Clicking the desired location suggestion may fill out the text field automatically. The fourth section is Default Measurement System. This may allow the user to configure the temperature and wind speed measurement display (F or C, mph or kph). To do so, click the radio button next to the desired measurement system. The fifth section is the API Key. This key is used to access World Weather Online™ weather API service. Type in the API key that the user received from registering World Weather Online™ into the API input field. Some or all changes may be saved before navigating away from the WOD™ Manager, to save any changes, click on the save button. The system may display a message indicating whether the save was successful or not.

OTHER FEATURES/BENEFITS/ADVANTAGES

In at least some embodiments, the On Demand Services System may be configured, designed, and/or operable to provide, enable and/or facilitate one or more of the following features, functionalities, benefits and/or advantages (or combinations thereof):

- In some embodiments the OD S will run automated processes in which information from one (and/or multiple) database(s) such as, for example Infogenesis, Micros, etc. gets transferred to another. During these processes data is intelligently sorted and structured to run within the ODS framework. Allows current pre-existing property databases to be easily imported which in turn reduces down-time and seamlessly creates a unique dynamic property system using ODS.
- In some embodiments the OD S will not run automated processes and data may be entered and/or configured manually (if there is no pre-existing database and/or new content is being added).
- In such highly regulated systems as casinos, security is a number one priority. ODS utilizes secure networking with data encryption, password protection, serial number activation, etc.
- ODS complies with regulations and is tested and approved.
- as well as numerous formats where it can be implemented, formats include but are not limited to, pc's, tablets, smartphones, Google Glass, Windows Hololens, pit tables (terminals), G2S/S2S floors, Class 2/Class 3 machines, web-based systems, etc.
- Uses multiple code languages such as java, C++, HTML5, flash, C#, JSON, etc. which allows for deployment on nearly any platform.
- In some embodiments the "intelligence" of the system may be configured to monitor patron play and display custom offerings to help make the player feel special, unique, thought-of and involved. For example, in some current bonusing applications, the patron may receive an award/prize based on player card session points earned through play. In doing so, the patron is "enticed" to stay and play longer in order to get another bonus. With the ODS the possibility exists where the player could be prompted with custom messages that may "unlock" different items during different times, Or a different example, If a player is only betting minimum and based on the player card and tracking analytics, the system "knows" they are ordering beverages (and usually do so between x & y times) the system could display messaging that may state: "Max Bet Bar Bash! If you Max Bet within happy hour x, bar x offers top shelf drinks to ODS users . . . " The player doesn't have to max bet, nor are they required to.

In some embodiments players, waitstaff, directors etc. can view order progress. From the player point of view, they may be allowed to track their order progress; see when it's being delivered etc. Waitstaff can continually monitor their zones checking new, pending, delivered, player location change, etc. Directors can track waitstaff efficiency, times/averages of orders, etc.

Closed loop functionality Regardless if a patron decides to leave the property after ordering a drink, ODS tracks, and delivers real-time updates of card in/out events, order complete, order canceled, pre-defined time-outs etc. All of which are accounted for within the system and can be tracked and viewed at later times. Also the closed loop functionality provides ways wherein the waitstaff does not need to interfere with the patrons gaming screen, they can confirm order delivery with their mobile devices.

The robust and dynamically flexible menu system allows a property to display items to the patrons exactly how they want. For example, Coffee could be offered multiple ways, one way would be to setup individual coffee setups, coffee/black, coffee/decaf, coffee/wCream, coffee/wCream&Sugar allowing the patron to select from a pre-defined list of options. Another way may be creating "condiment groups" based on food/drink/item/etc. categories which creates a different user experience, selecting coffee may then display all the available options that "belong" to coffee, such as, cream, sugar, amaretto, and by doing so, the patron gets to choose what they want. Pairing this with the systems "intelligent" features, ODS keeps track of the players custom drinks and allow easy/quick access to order the same in the future.

If the ODS system is configured to work in an uncarded environment, some of its features may not be readily available (i.e. player card data) however the order process may be configured to send out SMS, email, messages that can notify waitstaff assigned to that zone of machines to locate the exact machine the request was sent from.

The ODS system may be configured to work with tiered players, offering different items, pricing, etc. based on specific tier.

In some embodiments ODS may be configured to display/track certain menu items. For example, foods in short supply and/or subject to market availability may have quantity numbers associated with them letting the patron know of the supply and demand of said items. Furthermore the ODS system can be configured to "auto-remove" said items should their quantity reach 0 and the system may also "auto-add" said item if it gets checked in by food & beverage director etc.

As with any ordering system, orders can be canceled by both players and waitstaff etc. Configurable timers can be setup as well to automate the process, messaging may be displayed to inform the user(s) of order status.

Patron able to access status update of ODS order via ODS GUI.

In some embodiments an "order from your own device" option is available to patrons. Onsite players may login to a property website (onsite only) and order directly from there (i.e. if they are at a location that doesn't have a service window and/or kiosk). Geo-location and device tracking methods allow the waitstaff to pinpoint order locations.

The features and dynamic framework of ODS is unmatched in the current casino industry. There exists a need for a single complete system that houses all of the players, employees and administrator's needs. ODS provides multiple solutions which are dynamic, flexible, robust and allows for complete customization no matter what the property may choose.

Another feature of ODS is the customization freedom. A property can add their own branding, logos, colors, themes, sounds, ads, anything they desire in order to make ODS a seamless property system that matches their surroundings.

In some embodiments ODS system allows for multiple versions of payments for items, cash, card (credit/debit), comp, coupons, Apple Pay, Google Wallet, etc.

The On Demand Service techniques described herein enable casino patrons/customers to remain in their comfortable seat, wagering on their favorite game, and being able order food, drink, shirts, novelties. Whatever the casino decides to make available to the patron, also get security, weather, valet, medical assistance, and VIP host services without a hassle; on demand.

Different embodiments of the On Demand Service techniques described herein may be adapted and implemented in a variety of environments. For example, the On Demand Service techniques described herein are particularly well suited for deployment in any business establishments that house wager-based gaming devices (e.g., class 3 and/or class 2). Additionally, the On Demand Service techniques described herein may appeal to younger gamblers/gamers who enjoy playing arcade-style video games, middle aged gamblers/gamers who may have played some video games, and possibly even veteran gamblers who may be bored with existing wager-based video gaming technology.

The On Demand Service techniques described herein provide the ability for patrons of casinos and other gaming establishments to experience new and exciting ways of engaging in wager-based video game play with minimized learning curve and intimidation factors. Additionally, using the On Demand Service techniques described herein, casinos and other gaming establishments hosting such On Demand Service devices may increase their revenue by ensuring that the number of wager-based gaming event(s) occurring in an On Demand (e.g., during specified time period) meet minimum specified threshold criteria.

FIG. 1 illustrates a simplified block diagram of a specific example embodiment of Casino Network 100 which may be configured or designed to implement one or more On Demand Services features described herein. As described in greater detail herein, different embodiments of Casino Networks may be configured, designed, and/or operable to provide various different types of operations, functionalities, and/or features generally relating to On Demand Services technology. According to different embodiments, at least some Casino Network(s) may be configured, designed, and/or operable to provide a number of different advantages and/or benefits and/or may be operable to initiate, and/or enable various different types of operations, functionalities, and/or features, such as, for example, one or more of those described and/or referenced herein.

According to different embodiments, at least a portion of the various functions, actions, operations, and activities performed by one or more component(s) of the Casino Network may be initiated in response to detection of one or more conditions, events, and/or other criteria satisfying one or more different types of minimum threshold criteria, such as, for example, one or more of those described and/or referenced herein.

According to different embodiments, at least a portion of the various types of functions, operations, actions, and/or other features provided by the Casino Network may be implemented at one or more mobile device(s), electronic gaming device(s), client systems(s), system servers(s), and/or combinations thereof.

According to different embodiments, the Casino Network 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Casino Network may include one or more of the following types of systems, components, devices, processes, etc. (or combinations thereof):

- Display System Server(s) 104. In at least one embodiment, the Display System Server(s) may be configured or designed to implement and/or facilitate management of content (e.g., graphics, images, text, video fees, etc.) to be displayed and/or presented at one or more EGDs (or at one or more groups of EGDs), dealer displays, administrator displays, etc.
- EGD Multimedia System Server(s) 105. In at least one embodiment, the Table Multimedia System Server(s) may be configured or designed to generate, implement and/or facilitate management of content (e.g., graphics, images, text, video fees, audio feeds, etc.), which, for example, is to be streamed or provided to one or more EGDs (or to one or more groups of EGDs).
- Messaging System Server(s) 106. In at least one embodiment, the Messaging System Server(s) may be configured or designed to implement and/or facilitate management of messaging and/or other communications among and between the various systems, components, devices, EGDs, players, dealers, and administrators of the gaming network.
- Mobile System Server(s) 108. In at least one embodiment, the Mobile System Server(s) may be configured or designed to implement and/or facilitate management of communications and/or data exchanged with various types of mobile devices, including for example: player-managed mobile devices (e.g., smart phones, PDAs, tablets, mobile computers), casino-managed mobile devices (e.g., mobile gaming devices), etc.
- Financial System Server(s) 112. In at least one embodiment, the Financial System Server(s) may be configured or designed to implement and/or facilitate tracking, management, reporting, and storage of financial data and financial transactions relating to one or more On Demand sessions. For example, at least some Financial System Server(s) may be configured or designed to track financial transactions relating to On Demand Service(s) requested by or performed for different casino patrons (or other persons).
- Player Tracking System Server(s) 114. In at least one embodiment, the Player Tracking System Server(s) may be configured or designed to implement and/or facilitate management and exchange of player tracking information associated with one or more EGDs, On Demand sessions, etc. In at least one embodiment, a Player Tracking System Server may include at least one database that tracks at least one player's hands, wins/losses, bet amounts, player preferences, etc., in the network. In at least one embodiment, the presenting and/or awarding of promotions, bonuses, rewards, achievements, etc., may be based on a player's play patterns, time, games selected, bet amount for at least one game type, etc. A Player Tracking System Server may also help establish a player's preferences, which assists the casino in their promotional efforts to: award player comps (loyalty points); decide which promotion(s) are appropriate; generate bonuses; etc.
- Data Tracking & Analysis System(s) 118. In at least one embodiment, the Data Tracking & Analysis System(s) may be configured or designed to implement and/or facilitate management and analysis of game data. Additionally, the Data Tracking & Analysis System(s) may be configured or designed to track and analyze different transactions relating to different On Demand Service(s) requested by or performed for different casino patrons (or other persons).
- On Demand Services System 120. In at least one embodiment, the On Demand Services System may be configured or designed to implement and/or facilitate implementation, configuration, management, analysis, and reporting of On Demand Services including, for example, one or more of the following (or combinations thereof):
  - Beverage On Demand Service(s);
  - Host On Demand Service(s);
  - Security On Demand Service(s);
  - Valet On Demand Service(s);
  - Weather On Demand Service(s);
  - Reporting service(s);
  - and/or other aspects of On Demand Services described and/or referenced herein.
- Gaming System Server(s) (122). In at least one embodiment, different game servers may be configured or designed to be dedicated to one or more specifically designated type(s) of game(s). At least one game server has game logic to host one of more On Demand Services sessions.
- Jurisdictional/Regulatory Monitoring & Enforcement System(s) 150. In at least one embodiment, the Jurisdictional/Regulatory Monitoring & Enforcement System(s) may be configured or designed to handle tracking, monitoring, reporting, and enforcement of specific regulatory requirements relating to wager-based game-play activities in one or more jurisdictions.
- Authentication & Validation System(s) 152. According to different embodiments, the Authentication & Validation System(s) may be configured or designed to determine and/or authenticate the identity of the current player at a given EGD. For example, in one embodiment, the current player may be required to perform a log in process at the EGD in order to access one or more features. Alternatively, the EGD may be adapted to automatically determine the identity of the current player based upon one or more external signals such as, for example, scanning of a barcode of a player tracking card, an RFID tag or badge worn by the current player which provides a wireless signal to the EGD for determining the identity of the current player. In at least one implementation, various security features may be incorporated into the EGD to prevent unauthorized players from engaging in certain types of activities at the EGD. In some embodiments, the Authentication & Validation System(s) may be configured or designed to authenticate and/or validate various types of hardware and/or software components, such as, for example, hardware/software components residing at a remote EGDs, game play information, wager information, player information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for one or more purposes.

Casino Venues. In at least one embodiment, at least one casino venue may correspond to a real-world, physical casino which is located at a particular geographic location. In some embodiments, a portion of the multiple different casino venues may be affiliated with at least one other (e.g., Harrah's Las Vegas, Harrah's London). In other embodiments, at least a portion of the multiple different casino venues do not share any affiliation with at least one other. In at least some embodiments, the Casino Network may span across multiple different Casino Venues.

Remote Services. In at least some embodiments, remote services (e.g., provided by third parties) may be provided for implementing, facilitating, configuring, monitoring, updating, and/or reporting one or more On Demand Service(s)/feature(s). For example, in one embodiment, a third party may be provided access by a Casino establishment to remotely configure one or more On Demand Service(s)/feature(s) implemented at the Casino establishment's network.

Electronic gaming devices (EGDs) 132. As described in greater detail herein, the EGDs may be configured or designed to facilitate and enable players to participate in wager-based gaming sessions. Additionally, the EGDs may be configured or designed to enable players to access one or more On Demand Services features. In some embodiments, the EGDs may be configured or designed to display one or more On Demand GUIs for facilitating patrons in accessing desired On Demand Services features. In some embodiments, different EGDs may be physically located in one or more different casino venues, and may be connected via a communication network. In some embodiments, EGDs may be implemented as stationary machines (as illustrated, for example, in FIG. 10). In some embodiments, at least some EGDs may be implemented using mobile devices (e.g., tablets, smartphones, laptops, PC's, and the like).

Electronic Gaming Tables 134. In at least some embodiments, the Electronic Gaming Tables may be configured or designed to enable players to access one or more On Demand Services features.

Mobile Gaming Devices 136. In at least some embodiments, the Mobile Gaming Devices may be configured or designed to enable players to access one or more On Demand Services features.

Data Network 110, which, for example, may include one or more of the following (or combinations thereof):
Internet Network(s),
Cellular Network(s),
WAN Network(s),
LAN Network(s),
and/or other types of communication networks.

Game History Server(s) 164. In at least one embodiment, the Game History Server(s) may be configured or designed to track one or more (or selected) game types and game play history for one or more (or selected) On Demands. In some embodiments, a Game History Server may also assist the casino manager in case of disputes between players and the casino by, for example, providing the ability to "replay" (e.g., by virtually recreating the game events) the game in dispute, step by step, based on previously stored game states. Such dispute resolution capability is a desirable feature in On Demand environments.

Remote Database System(s) which, for example, may be operable to store and provide access to various types of information and data described herein.

Remote System Server(s)/Service(s), which, for example, may include, but are not limited to, one or more of the following (or combinations thereof):
Content provider servers/services
Media Streaming servers/services
Database storage/access/query servers/services
Financial transaction servers/services
Payment gateway servers/services
Electronic commerce servers/services
Event management/scheduling servers/services
Etc.

In at least one embodiment, the Casino Network may be operable to utilize and/or generate various different types of data and/or other types of information when performing specific tasks and/or operations. This may include, for example, input data/information and/or output data/information. For example, in at least one embodiment, the Casino Network may be operable to access, process, and/or otherwise utilize information from one or more different types of sources, such as, for example, one or more local and/or remote memories, devices and/or systems. Additionally, in at least one embodiment, the Casino Network may be operable to generate one or more different types of output data/information, which, for example, may be stored in memory of one or more local and/or remote devices and/or systems. Examples of different types of input data/information and/or output data/information which may be accessed and/or utilized by the Casino Network may include, but are not limited to, one or more of those described and/or referenced herein.

According to specific embodiments, multiple instances or threads of the On Demand Service(s) may be concurrently implemented and/or initiated via the use of one or more processors and/or other combinations of hardware and/or hardware and software. For example, in at least some embodiments, various aspects, features, and/or functionalities of the On Demand Service(s) may be performed, implemented and/or initiated by one or more of the various systems, components, systems, devices, procedures, processes, etc., described and/or referenced herein.

In at least one embodiment, a given instance of the Casino Network may access and/or utilize information from one or more associated databases. In at least one embodiment, at least a portion of the database information may be accessed via communication with one or more local and/or remote memory devices. Examples of different types of data which may be accessed by the Casino Network may include, but are not limited to, one or more of those described and/or referenced herein.

According to different embodiments, various different types of encryption/decryption techniques may be used to facilitate secure communications between various devices, components and/or systems of the Casino Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different instances or threads of the On Demand Service(s) may be initiated in response to detection of one or more conditions or events satisfying one or more different types of minimum threshold criteria for triggering initiation of at least one instance of the Casino Network. Various examples of conditions or events which may trigger initiation and/or implementation of one or more different threads or instances of the instances or threads of the On Demand Service(s) may include, but are not limited to, one or more of those described and/or referenced herein.

It may be appreciated that the Casino Network of FIG. 1 is but one example from a wide range of Casino Network embodiments which may be implemented. Other embodiments of the Casino Network (not shown) may include additional, fewer and/or different components/features that those illustrated in the example Casino Network embodiment of FIG. 1.

Generally, the instances or threads of the On Demand Service(s) described herein may be implemented in hardware and/or hardware+software. For example, they may be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the instances or threads of the On Demand Service(s) techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, system servers, cloud computing systems, network devices, etc.

FIG. 1 illustrates a network diagram of an example embodiment of a Casino Network 100 which may be configured or designed to implement various instances or threads of the On Demand Service(s) techniques described and/or referenced herein. As described in greater detail herein, different embodiments of instances or threads of the On Demand Service(s) may be configured, designed, and/or operable to provide various different types of operations, functionalities, and/or features generally relating to On Demand Services technology. Further, as described in greater detail herein, many of the various operations, functionalities, and/or features of the instances or threads of the On Demand Service(s) disclosed herein may provide may enable or provide different types of advantages and/or benefits to different entities interacting with the Casino Network(s).

According to specific embodiments, a variety of different game states may be used to characterize the state of current and/or past events which are occurring (or have occurred) at a given EGD. For example, in one embodiment, at any given time in a game, a valid current game state may be used to characterize the state of game play (and/or other related events, such as, for example, mode of operation of the EGD, etc.) at that particular time. In at least one embodiment, multiple different states may be used to characterize different states or events which occur at the EGD at any given time. In one embodiment, when faced with ambiguity of game state, a single state embodiment forces a decision such that one valid current game state is chosen. In a multiple state embodiment, multiple possible game states may exist simultaneously at any given time in a game, and at the end of the game or at any point in the middle of the game, the EGD may analyze the different game states and select one of them based on certain criteria. Thus, for example, when faced with ambiguity of game state, the multiple state embodiment(s) allow one or more potential game states to exist and move forward, thus deferring the decision of choosing one game state to a later point in the game. The multiple game state embodiment(s) may also be more effective in handling ambiguous data or game state scenarios.

According to specific embodiments, a variety of different entities may be used (e.g., either singly or in combination) to track the progress of game states which occur at a given gaming EGD. Examples of such entities may include, but are not limited to, one or more of the following (or combination thereof): master controller system, display system, gaming system, local game tracking component(s), remote game tracking component(s), etc. Examples of various game tracking components may include, but are not limited to: automated sensors, manually operated sensors, video cameras, intelligent playing card shoes, RFID readers/writers, RFID tagged chips, objects displaying machine readable code/patterns, etc.

According to a specific embodiment, local game tracking components at the EGD may be operable to automatically monitor game play activities at the EGD, and/or to automatically identify key events which may trigger a transition of game state from one state to another as a game progresses.

Figure 2:
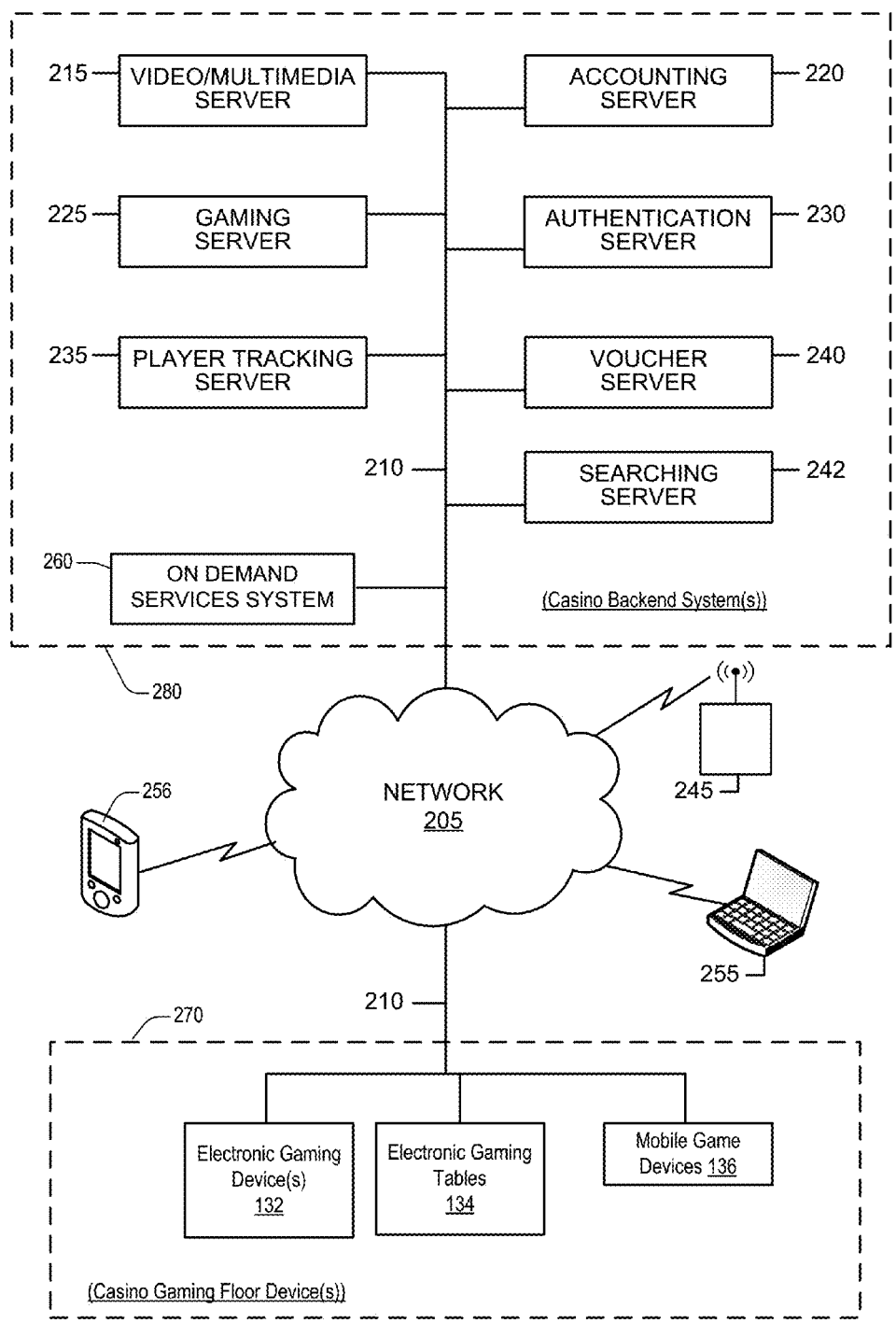
FIG. 2 shows an example block diagram of an electronic gaming system 200 in accordance with a specific embodiment.

FIG. 2 shows an example block diagram of an alternate embodiment of a Casino Network 200 in accordance with a specific embodiment. As illustrated in the example embodiment of FIG. 2, Casino Network 200 may include:

- A first plurality of device(s), component(s), system(s), which may function as part of the Casino Network's Backend System 280. In at least one embodiment, access to Casino Network's Backend System may be intended for (or restricted to) authorized personnel such as, for example, Casino staff, Casino Employees, security personnel, authorized users, authorized remote users, authorized remote systems, etc.
- A second plurality of device(s), component(s), system(s), which may function as part of the Casino Network's Frontend System. In at least one embodiment, access to Casino Network's Frontend System may be intended for casino patrons, players, hotel guests, end users, etc. In at least one embodiment, the Frontend System may include electronic gaming devices 132, electronic gaming tables 134 and/or mobile gaming devices 136 which are located in one or more of the Casino's gaming floors/regions. In at least some embodiments, the electronic gaming machines and other devices on the casino gaming floor may be used by authorized personnel to remotely access one or more device(s), component(s), system(s) of the Backend System.

In at least some embodiments, other device(s), component(s), system(s) of the casino network (e.g., such as mobile devices, laptops, smartphones, tablets, etc.) may function as either a Frontend System device or a Backend System device, depending upon the user, and functionality being accessed. For example, a casino patron may use his or her smartphone in various regions of the casino (including, for example, non-gaming regions such as the pool, hotel room, restaurant, etc.) to access the Frontend of the On Demand Services System. In other embodiments, a casino employee (such as a hostess or waitress) may use his or her smartphone to access the Backend of the On Demand Services System.

According to different embodiments, the Casino Network 200 may include a plurality of different types of components, devices, modules, processes, systems, etc., which, for example, may be implemented and/or instantiated via the use of hardware and/or combinations of hardware and software. For example, as illustrated in the example embodiment of FIG. 2, the Casino Network may include one or more of the following types of systems, components, devices, processes, etc. (or combinations thereof):

Electronic gaming devices 132;
Electronic gaming tables 134;
Mobile gaming devices 136;
Network links 210;
Network 205, which, for example, may include WANs and/or LANs;
Accounting/transaction server 220 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. Accounting/transaction server 220 may generate tax information relating to these wagers. Accounting/transaction server 220 may generate profit/loss reports for predetermined gaming options, contingent gaming options, predetermined betting structures, and/or outcome categories.
Gaming server 225 may generate gaming options based on predetermined betting structures and/or outcome categories. These gaming options may be predetermined gaming options, contingent gaming options, and/or any other gaming option disclosed in this disclosure.
Authentication server 230 may determine the validity of vouchers, players' identity, and/or an outcome for a gaming event.
Player tracking server 235 may track a player's betting activity, a player's preferences (e.g., language, drinks, font, sound level, etc.). Based on data obtained by player tracking server 235, a player may be eligible for gaming rewards (e.g. free play), promotions, and/or other awards (e.g., complimentary food, drinks, lodging, concerts, etc.).
Voucher server 240 may generate a voucher, which may include data relating to gaming options. For example, data relating to the structure may be generated. If there is a time deadline, that information may be generated by voucher server 240. Vouchers may be physical (e.g., paper) or digital.

Searching server 242 may implement a search on one or more gaming devices to obtain gaming data. Searching server 242 may implement a messaging function, which may transmit a message to a third party (e.g., a player) relating to a search, a search status update, a game status update, a wager status update, a confirmation of a wager, a confirmation of a money transfer, and/or any other data relating to the player's account. The message may take the form of a text display on the gaming device, a pop up window, a text message, an email, a voice message, a video message and the like. Searching server 242 may implement a wagering function, which may be an automatic wagering mechanism. These functions of searching server 242 may be integrated into one or more servers. Searching server 242 may include one or more searching structures, one or more searching algorithms, and/or any other searching mechanisms. In general, the search structures may cover which Gaming Devices paid out the most money during a time period, which Gaming Devices kept the most money from players during a time period, which Gaming Devices are most popular (top games), which Gaming Devices are least popular, which Gaming Devices have the most amount of money wager during a period, which Gaming Devices have the highest wager volume, which Gaming Devices are more volatile (volatility, or deviation from the statistical norms, of wager volume, wager amount, pay out, etc.) during a time period, and the like. Search may also be associated with location queries, time queries, and/or people queries.

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, one or more) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific game types and/or themes (e.g., first person shooter types, first person rail types, TV themes, Movie themes, multiplayer types, etc.). Searching structure may search one or more of these games.

In another example, the searching structure may be based on a player's preferences, past transactional history, player input, a particular game, a particular EGD, a particular casino, a particular location within a casino, game outcomes over a time period, payout over a time period, and/or any other criteria.

Figure 3:
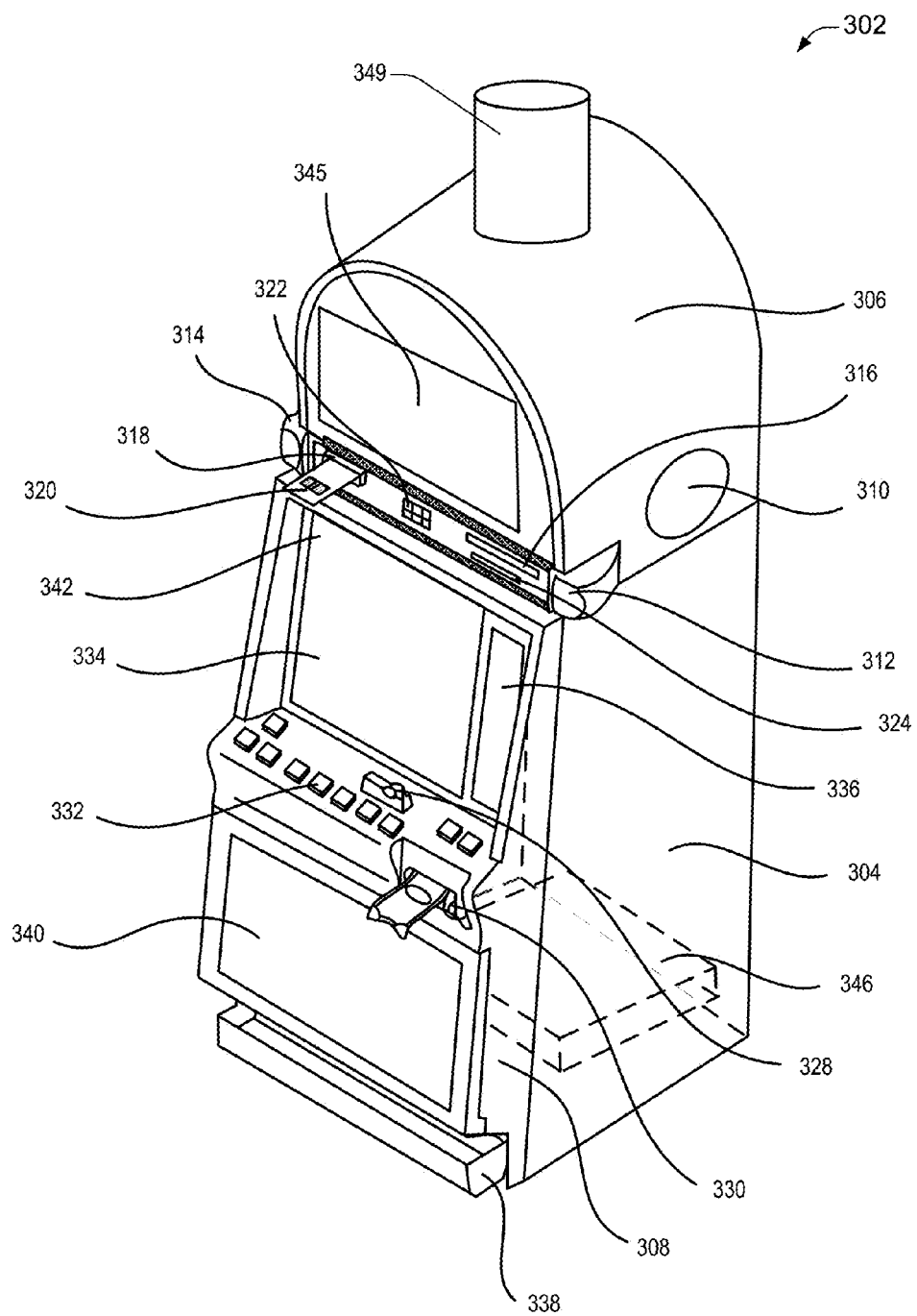
FIG. 3 shows a perspective view of an example gaming machine 302 in accordance with a specific embodiment.

Searching algorithms may be dynamic searching programs, which may be modified based on one or more past results. In one example, the search algorithm may determine that a specific triggering event occurs with a ninety percent success rate on a first EGD, a ten percent success rate on a second EGD, a fifty percent success rate on a third EGD, and a seventy percent success rate on a fourth EGD. The search algorithm may generate a search priority based on the probability of success, which may lead to the first EGD being searched first, the fourth EGD being searched second, the third EGD being searched third, and the second EGD being searched fourth. Search algorithm may utilize any dynamic feedback procedure to enhance current and/or future searching results FIG. 3 shows a perspective view of an example gaming machine 302 in accordance with a specific embodiment. As illustrated in the example of FIG. 3, device 302 includes a main cabinet or housing 304, which generally surrounds the device interior and is viewable by users. The main cabinet includes an access door 308, which opens to provide access to the interior of the device.

In particular embodiments, the gaming machine may be controlled by software executed by a master gaming controller 346 in conjunction with software executed by a remote logic device (e.g., a remote host, a central server or a central controller) in communication with the gaming machine. The master gaming controller may execute externally-controlled interface (ECI) processes which, for example, may enable content generated and managed on the remote host to be output on the gaming machine. The gaming machine may receive and send events to the remote host that may affect the content output by one or more ECI processes as well as enable an ECI process to be initiated on the gaming machine.

In one embodiment, attached to the main door is at least one payment acceptor 328 and a bill validator 330, and a coin tray 338. In one embodiment, the payment acceptor may include a coin slot and a payment, note or bill acceptor, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming machine. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming machine. In one embodiment, money may be transferred to a gaming machine through electronic funds transfer. When a player funds the gaming machine, the master gaming controller 346 or another logic device coupled to the gaming machine determines the amount of funds entered and displays the corresponding amount on the credit or other suitable display as described above.

In one embodiment attached to the main door are a plurality of player-input switches or buttons 332. The input switches can include any suitable devices which enables the player to produce an input signal which is received by the processor. In one embodiment, after appropriate funding of the gaming machine, the input switch is a game activation device, such as a pull arm or a play button which is used by the player to start any primary game or sequence of events in the gaming machine. The play button can be any suitable play activator such as a bet one button, a max bet button or a repeat the bet button. In one embodiment, upon appropriate funding, the gaming machine may begin the game play automatically. In another embodiment, upon the player engaging one of the play buttons, the gaming machine may automatically activate game play.

In one embodiment, one input switch is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input switch is a bet max button (not shown), which enables the player to bet the maximum wager permitted for a game of the gaming machine.

In one embodiment, one input switch is a cash-out button. The player may push the cash-out button and cash out to receive a cash payment or other suitable form of payment corresponding to the number of remaining credits. In one embodiment, when the player cashes out, the player may receive the coins or tokens in a coin payout tray. In one embodiment, when the player cashes out, the player may receive other payout mechanisms such as tickets or credit slips redeemable by a cashier (or other suitable redemption system) or funding to the player's electronically recordable identification card. Details of ticketing or voucher system that may be utilized with at least one embodiment described herein are described in co-pending U.S. patent application Ser. No. 10/406,911, filed Apr. 2, 2003, by Rowe, et al., and entitled, "Cashless Transaction Clearinghouse," which is incorporated herein by reference and for all purposes.

In one embodiment, one input switch is a touch-screen coupled with a touch-screen controller, or some other touch-sensitive display overlay to enable for player interaction with the images on the display. The touch-screen and the touch-screen controller may be connected to a video controller. A player may make decisions and input signals into the gaming machine by touching touch-screen at the appropriate places. One such input switch is a touch-screen button panel.

In one embodiment, the gaming machine may further include a plurality of communication ports for enabling communication of the gaming machine processor with external peripherals, such as external video sources, expansion buses, game or other displays, an SCSI port or a key pad.

According to different embodiments, the gaming machine may be configured or designed to present one or more On Demand GUIs (e.g., via the gaming machine display(s), see, e.g., FIGS. 10-21) to thereby enable players or patrons to access one or more On Demand Service(s)/feature(s) such as those described herein.

As seen in FIG. 3, viewable through the main door is a video display monitor 334 and an information panel 336. The display monitor 334 will typically be a cathode ray tube, high resolution flat-panel LCD, OLED based-display, plasma display, a television display, a display based on light emitting diodes (LED), a display based on polymer light-emitting diodes (PLEDs), a display including a projected and/or reflected image or any other suitable electronic device or display. The information panel 336 or belly-glass 340 may be a static back-lit, silk screened glass panel with lettering to indicate general game information including, for example, a game denomination (e.g. $0.25 or $1) or a dynamic display, such as an LCD, an OLED or E-INK display. In another embodiment, at least one display device may be a mobile display device, such as a PDA or tablet PC, that enables play of at least a portion of the primary or secondary game at a location remote from the gaming machine. The display devices may be of any suitable size and configuration, such as a square, rectangle elongated rectangle.

The display devices of the gaming machine are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like. In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia. In another embodiment, the display device may include an electromechanical device adjacent to a video display, such as a video display positioned in front of a mechanical reel. In another embodiment, the display device may include dual layered video displays which co-act to generate one or more images.

The bill validator 330, player-input switches 332, video display monitor 334, and information panel are gaming machines that may be used to play a game on the game device 302. Also, these devices may be utilized as part of an ECI provided on the gaming machine. According to a specific embodiment, the devices may be controlled by code executed by a master gaming controller 346 housed inside the main cabinet 304 of the device 302. The master gaming controller may include one or more processors including general purpose and specialized processors, such as graphics cards, and one or more memory devices including volatile and non-volatile memory. The master gaming controller 346 may periodically configure and/or authenticate the code executed on the gaming machine.

In one embodiment, the gaming machine may include a sound generating device coupled to one or more sounds cards. In one embodiment, the sound generating device includes at least one and preferably a plurality of speakers or other sound generating hardware and/or software for generating sounds, such as playing music for the primary and/or secondary game or for other modes of the gaming machine, such as an attract mode. In one embodiment, the gaming machine provides dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In one embodiment, the gaming machine may include a sensor, such as a camera that is selectively positioned to acquire an image of a player actively using the gaming machine and/or the surrounding area of the gaming machine. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In another embodiment, the gaming machines on the gaming machine may be controlled by code executed by the master gaming controller 346 (or another logic device coupled to or in communication with the gaming machine, such as a player tracking controller) in conjunction with code executed by a remote logic device in communication with the master gaming controller 346. In at least one embodiment, the master gaming controller 346 may execute ECI processes that enable content generated and managed on a remote host to be output on the gaming machine. The gaming machine may receive and send events to a remote host that may affect the content output on an instantiation of a particular ECI. The master gaming controller 346 may be configured to limit the resources that can be utilized by the ECI processes executing on the gaming machine at any given time and may constantly monitor resources utilized by the ECI processes to ensure that gaming experience on the gaming machine is optimal.

Games Played

Many different types of wager-based games, including mechanical slot games, video slot games, video poker, video black jack, video pachinko, lottery, etc., may be played via the use of one or more gaming devices and/or gaming systems described or referenced herein. In particular, the gaming machine 302 may be operable to provide a play of many different games of chance. The games may be differentiated according to themes, sounds, graphics, type of game (e.g., slot game vs. card game), denomination, number of paylines, maximum jackpot, progressive or non-progressive, bonus games, etc.

In one embodiment, the gaming machine 302 may be operable to enable a player to select a game of chance to play from a plurality of different games available on the gaming machine. For example, the gaming machine may provide a menu with a list of the different games that are available for play on the gaming machine and a player may be able to select from the list a first game of chance that they wish to play. In one such embodiment, a In particular embodiments, the master gaming controller 346 may provide information to a remote host providing content to an ECI on the gaming machine 302 that enables the remote host to select graphical and audio themes for the ECI content that matches the theme of the game graphics and game sounds currently played on the gaming machine 302.

In one embodiment, the various games available for play on the gaming machine 302 may be stored as game software on a mass storage device in the gaming machine. In one such embodiment, the memory device of the gaming machine stores program codes and instructions, executable by the gaming machine processor, to control the games available for play on the gaming machine. The memory device also stores other data such as image data, event data, player input data, random or pseudo-random number generators, pay-table data or information and applicable game rules that relate to the play of the gaming machine. In another embodiment, the games available for play on the gaming machine may be generated on a remote gaming machine but then displayed on the gaming machine.

In one embodiment, the gaming machine 302 may execute game software, such as but not limited to video streaming software that enables the game to be displayed on the gaming machine. When a game is stored on the gaming machine 302, it may be loaded from the mass storage device into a RAM for execution. In some cases, after a selection of a game, the game software that enables the selected game to be generated may be downloaded from a remote gaming machine, such as another gaming machine.

As illustrated in the example of FIG. 3, the gaming machine 302 includes a top box 306, which sits on top of the main cabinet 304. The top box 306 houses a number of devices, which may be used to add features to a game being played on the gaming machine 302, including speakers 310, 312, 314, a ticket printer 318 which prints bar-coded tickets 320, a key pad 322 for entering player tracking information, a display 316 (e.g., a video LCD display) for displaying player tracking information, a card reader 324 for entering a magnetic striped card containing player tracking information, and a video display screen 35. The ticket printer 318 may be used to print tickets for a cashless ticketing system. Further, the top box 306 may house different or additional devices not illustrated in FIG. 3. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller 346) housed within the main cabinet 304 of the device 302.

It will be appreciated that gaming machine 302 is but one example from a wide range of gaming machine designs on which at least one embodiment described herein may be implemented. For example, not all suitable gaming machines have top boxes or player tracking features. Further, some gaming machines have only a single game display—mechanical or video, while others may have multiple displays.

Networks

In various embodiments, the remote gaming machine may be connected to the host computer via a network of some type such as a local area network, a wide area network, an intranet or the Internet. In one such embodiment, a plurality of the gaming machines may be capable of being connected together through a data network. In one embodiment, the data network is a local area network (LAN), in which one or more of the gaming machines are substantially proximate to each other and an on-site remote host as in, for example, a gaming establishment or a portion of a gaming establishment. In another embodiment, the data network is a wide area network (WAN) in which one or more of the gaming machines are in communication with at least one off-site remote host. In this embodiment, the plurality of gaming machines may be located in a different part of the gaming establishment or within a different gaming establishment than the off-site remote host. Thus, the WAN may include an off-site remote host and an off-site gaming machine located within gaming establishments in the same geographic area, such as a city or state. The WAN gaming system may be substantially identical to the LAN gaming system described above, although the number of gaming machines in each system may vary relative to each other.

In another embodiment, the data network is an internet or intranet. In this embodiment, the operation of the gaming machine can be viewed at the gaming machine with at least one internet browser. In this embodiment, operation of the gaming machine and accumulation of credits may be accomplished with only a connection to the central server or controller (the internet/intranet server) through a conventional phone or other data transmission line, digital line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, the remote gaming machine may be a portable gaming machine such as but not limited to a cell phone, a personal digital assistant, and a wireless game player. Images rendered from 3-D gaming environments may be displayed on portable gaming machines that are used to play a game of chance. Further a gaming machine or server may include gaming logic for commanding a remote gaming machine to render an image from a virtual camera in a 3-D gaming environments stored on the remote gaming machine and to display the rendered image on a display located on the remote gaming machine. In addition, various combinations of gaming machines are possible on the gaming machine. For example, some gaming machine only accept cash, cashless vouchers or electronic fund transfers and do not include coin acceptors or coin hoppers. Thus, those of skill in the art will understand that at least one embodiment described herein, as described below, can be deployed on most any gaming machine now available or hereafter developed.

In another embodiment, the gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming machine as disclosed herein may be a device that has obtained approval from a regulatory gaming commission or a device that has not obtained approval from a regulatory gaming commission.

In at least one embodiment, some wager-based gaming systems may enable functionality relating to other game play concepts/features such as, for example: tournament play with multiple tables; head to head play on and/or between tables; etc. This is in addition to the simple social factor of allowing people to play together on a table, versus playing against each other or against a dealer. Also, it opens the door for traditional types of player input and/or real-time object recognition. For example, players can simply gesture to make something happen, versus pressing a button. For example, in one embodiment, a game of blackjack may be played on an intelligent multi-player electronic gaming system, and a player may be able to split their hand (e.g., of paired 8's) by simply placing their fingers over the virtual cards and spreading their cards out to cause the computer to recognize the split action.

According to different embodiments, a wager-based gaming system may be operable as a stand alone device, and/or it can be operable as a server-based device. It can also plug into multi-player platforms.

In at least one embodiment, some wager-based gaming systems support industry standard software development with WPF (Windows Presentation Foundation), Expressions Blend (for the artists), and Microsoft's XNA, which is used to make PC and XBox games.

It will be appreciated that the various wager-based gaming systems described herein are but some examples from a wide range of wager-based gaming systems designs on which various aspects and/or techniques described herein may be implemented.

For example, not all wager-based gaming systems have electronic displays or player tracking features. Further, some wager-based gaming systems may include a single display, while others may include multiple displays. Other wager-based gaming systems may not include any displays. As another example, a game may be generated on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from gaming environments may be displayed on portable gaming devices that are used to facilitate game play activities at the wager-based gaming system. Further a wager-based gaming system or server may include gaming logic for commanding a remote gaming device to render an image from a virtual camera in 2-D or 3-D gaming environments stored on the remote gaming device and to display the rendered image on a display located on the remote gaming device. Thus, those of skill in the art will understand that the various example embodiments described herein may be deployed on most any wager-based gaming system now available or hereafter developed.

Gaming Device Vs. General-Purpose Computer

Some preferred wager-based gaming devices of the present assignee are implemented with special features and/or additional circuitry that differentiates them from general-purpose computers (e.g., desktop PC's and laptops). In at least one embodiment, a wager-based gaming device may be defined to include any type of device, machine, apparatus, and/or system which has been configured or designed for use in conducting wager-based game play activities at the wager-based gaming device. Example of such wager-based gaming device may include, but are not limited to, one or more of the following (or combinations thereof): mechanical gaming machines, electronic gaming machines, slot-type gaming machines, gaming tables, mobile or portable wager-based gaming devices, etc.

Wager-based gaming devices are highly regulated to ensure fairness and, in some cases, wager-based gaming devices are operable to dispense monetary awards of multiple millions of dollars. Therefore, to satisfy security and regulatory requirements in a gaming environment, hardware and software architectures may be implemented in wager-based gaming devices that differ significantly from those of a general-purpose computers. A description of wager-based gaming devices relative to general-purpose computing devices and some examples of the additional (or different) components and features found in wager-based gaming devices are described below.

At first glance, one might think that adapting PC technologies to the gaming industry would be a simple proposition because both PCs and wager-based gaming devices employ microprocessors that control a variety of devices. However, because of such reasons as 1) the regulatory requirements that are placed upon wager-based gaming devices, 2) the harsh environment in which wager-based gaming devices operate, 3) security requirements and 4) fault tolerance requirements, adapting PC technologies to a wager-based gaming device can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a wager-based gaming device because in a wager-based gaming device these faults can lead to a direct loss of funds from the wager-based gaming device, such as stolen cash or loss of revenue when the wager-based gaming device is not operating properly.

For the purposes of illustration, a few differences between PC systems and wager-based gaming devices/systems will be described. A first difference between wager-based gaming devices and common PC based computers systems is that wager-based gaming devices are designed to be state-based systems. In a state-based system, the system stores and maintains its current state in a non-volatile memory, such that, in the event of a power failure or other malfunction the wager-based gaming device will return to its current state when the power is restored. For instance, if a player was shown an award for a wager-based game (e.g., of chance, skill and/or some combination thereof) and, before the award could be provided to the player the power failed, the wager-based gaming device, upon the restoration of power, would return to the state where the award is indicated. As anyone who has used a PC, knows, PCs are not state devices and a majority of data is usually lost when a malfunction occurs. This requirement affects the software and hardware design on a wager-based gaming device.

A second important difference between wager-based gaming devices and common PC based computer systems is that for regulation purposes, the software on the wager-based gaming device used to generate the wager-based game and operate the wager-based gaming device has been designed to be static and monolithic to prevent cheating by the operator of wager-based gaming device. For instance, one solution that has been employed in the gaming industry to prevent cheating and satisfy regulatory requirements has been to manufacture a wager-based gaming device that can use a proprietary processor running instructions to generate the wager-based game play activities from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the wager-based game play activities, such as adding a new device driver used by the master gaming controller to operate a device during generation of the wager-based game can require a new EPROM to be burnt, approved by the gaming jurisdiction and reinstalled on the wager-based gaming device in the presence of a gaming regulator. Regardless of whether the EPROM solution is used, to gain approval in most gaming jurisdictions, a wager-based gaming device must demonstrate sufficient safeguards that prevent an operator or player of a wager-based gaming device from manipulating hardware and software in a manner that gives them an unfair and some cases an illegal advantage. The wager-based gaming device should have a means to determine if the code it will execute is valid. If the code is not valid, the wager-based gaming device must have a means to prevent the code from being executed. The code validation requirements in the gaming industry affect both hardware and software designs on wager-based gaming devices.

A third important difference between wager-based gaming devices and common PC based computer systems is the number and kinds of peripheral devices used on a wager-based gaming device are not as great as on PC based computer systems. Traditionally, in the gaming industry, wager-based gaming devices have been relatively simple in the sense that the number of peripheral devices and the number of functions the wager-based gaming device has been limited. Further, in operation, the functionality of wager-based gaming devices were relatively constant once the wager-based gaming device was deployed, i.e., new peripherals devices and new gaming software were infrequently added to the wager-based gaming device. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a wager-based gaming device, wager-based gaming devices still have unique device requirements that differ from a PC, such as device security requirements not usually addressed by PCs. For instance, monetary devices, such as coin dispensers, bill validators and ticket printers and computing devices that are used to govern the input and output of cash to a wager-based gaming device have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in wager-based gaming devices that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer may be used in International Game Technology (IGT) wager-based gaming devices to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Wager-based gaming devices of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

One standard method of operation for IGT slot device game software is to use a state device. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the wager-based gaming device.

In general, the wager-based gaming device does not advance from a first state to a second state until critical information that allows the first state to be reconstructed has been stored. This feature allows the game to recover operation to the current state of play in the event of a malfunction, loss of power, etc. that occurred just prior to the malfunction. In at least one embodiment, the wager-based gaming device is configured or designed to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

In order to ensure the success of atomic transactions relating to critical information to be stored in the wager-based gaming device memory before a failure event (e.g., malfunction, loss of power, etc.), it is preferable that memory be used which includes one or more of the following criteria: direct memory access capability; data read/write capability which meets or exceeds minimum read/write access characteristics (such as, for example, at least 5.08 Mbytes/sec (Read) and/or at least 38.0 Mbytes/sec (Write)). Devices which meet or exceed the above criteria may be referred to as "fault-tolerant" memory devices, whereas it is which the above criteria may be referred to as "fault non-tolerant" memory devices.

Typically, battery backed RAM devices may be configured or designed to function as fault-tolerant devices according to the above criteria, whereas flash RAM and/or disk drive memory are typically not configurable to function as fault-tolerant devices according to the above criteria. Accordingly, battery backed RAM devices are typically used to preserve wager-based gaming device critical data, although other types of non-volatile memory devices may be employed. These memory devices are typically not used in typical general-purpose computers.

Thus, in at least one embodiment, the wager-based gaming device is configured or designed to store critical information in fault-tolerant memory (e.g., battery backed RAM devices) using atomic transactions. Further, in at least one embodiment, the fault-tolerant memory is able to successfully complete all desired atomic transactions (e.g., relating to the storage of wager-based gaming device critical information) within a time period of 200 milliseconds (ms) or less. In at least one embodiment, the time period of 200 mSec represents a maximum amount of time for which sufficient power may be available to the various wager-based gaming device components after a power outage event has occurred at the wager-based gaming device.

As described previously, the wager-based gaming device may not advance from a first state to a second state until critical information that allows the first state to be reconstructed has been atomically stored. This feature allows the game to recover operation to the current state of play in the event of a malfunction, loss of power, etc. that occurred just prior to the malfunction. After the state of the wager-based gaming device is restored during the play of a wager-based game, game play may resume and the game may be completed in a manner that is no different than if the malfunction had not occurred. Thus, for example, when a malfunction occurs during a wager-based game, the wager-based gaming device may be restored to a state in the wager-based game just prior to when the malfunction occurred. The restored state may include metering information and graphical information that was displayed on the wager-based gaming device in the state prior to the malfunction. For example, when the malfunction occurs during the play of a card game after the cards have been dealt, the wager-based gaming device may be restored with the cards that were previously displayed as part of the card game. As another example, a bonus game may be triggered during the play of a wager-based game where a player is required to make a number of selections on a video display screen. When a malfunction has occurred after the player has made one or more selections, the wager-based gaming device may be restored to a state that shows the graphical presentation at the just prior to the malfunction including an indication of selections that have already been made by the player. In general, the wager-based gaming device may be restored to any state in a plurality of states that occur in the wager-based game that occurs while the wager-based game is played or to states that occur between the play of a wager-based game.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the wager-based gaming device and the state of the wager-based gaming device (e.g., credits) at the time the wager-based game was played. The game history information may be utilized in the event of a dispute. For example, a player may decide that in a previous wager-based game that they did not receive credit for an award that they believed they won. The game history information may be used to reconstruct the state of the wager-based gaming device prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of wager-based gaming devices, such as IGT gaming computers, is that they often include unique interfaces, including serial interfaces, to connect to specific subsystems internal and external to the wager-based gaming device. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the wager-based gaming device, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between wager-based gaming devices. As another example, SAS is a communication protocol used to transmit information, such as metering information, from a wager-based gaming device to a remote device. Often SAS is used in conjunction with a player tracking system.

IGT wager-based gaming devices may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT wager-based gaming device by monitoring security switches attached to access doors in the wager-based gaming device cabinet. Preferably, access violations result in suspension of game play and can trigger additional security operations to preserve the current state of game play. These circuits also function when power is off by use of a battery backup. In power-off operation, these circuits continue to monitor the access doors of the wager-based gaming device. When power is restored, the wager-based gaming device can determine whether any security violations occurred while power was off, e.g., via software for reading status registers. This can trigger event log entries and further data authentication operations by the wager-based gaming device software.

Trusted memory devices and/or trusted memory sources are preferably included in an IGT wager-based gaming device computer to ensure the authenticity of the software that may be stored on less secure memory subsystems, such as mass storage devices. Trusted memory devices and controlling circuitry are typically designed to not enable modification of the code and data stored in the memory device while the memory device is installed in the wager-based gaming device. The code and data stored in these devices may include authentication algorithms, random number generators, authentication keys, operating system kernels, etc. The purpose of these trusted memory devices is to provide gaming regulatory authorities a root trusted authority within the computing environment of the wager-based gaming device that can be tracked and verified as original. This may be accomplished via removal of the trusted memory device from the wager-based gaming device computer and verification of the secure memory device contents is a separate third party verification device. Once the trusted memory device is verified as authentic, and based on the approval of the verification algorithms included in the trusted device, the wager-based gaming device is enabled to verify the authenticity of additional code and data that may be located in the gaming computer assembly, such as code and data stored on hard disk drives. A few details related to trusted memory devices that may be used in at least one embodiment described herein are described in U.S. Pat. No. 6,685,567 (U.S. patent application Ser. No. 09/925,098), filed Aug. 8, 2001 and titled "Process Verification," and U.S. Pat. No.

3,221,314, filed Sep. 6, 2005, each of which is incorporated herein by reference in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of at least one embodiment described herein, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System", which is incorporated herein in its entirety and for all purposes.

Wager-based gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. Pat. No. 3,078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically enable code and data to be read from and written to the mass storage device. In a wager-based gaming system environment, modification of the gaming code stored on a mass storage device is strictly controlled and would only be enabled under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with at least one embodiment described herein are described, for example, in U.S. Pat. No. 6,149,522, herein incorporated by reference in its entirety for all purposes.

Figure 4:
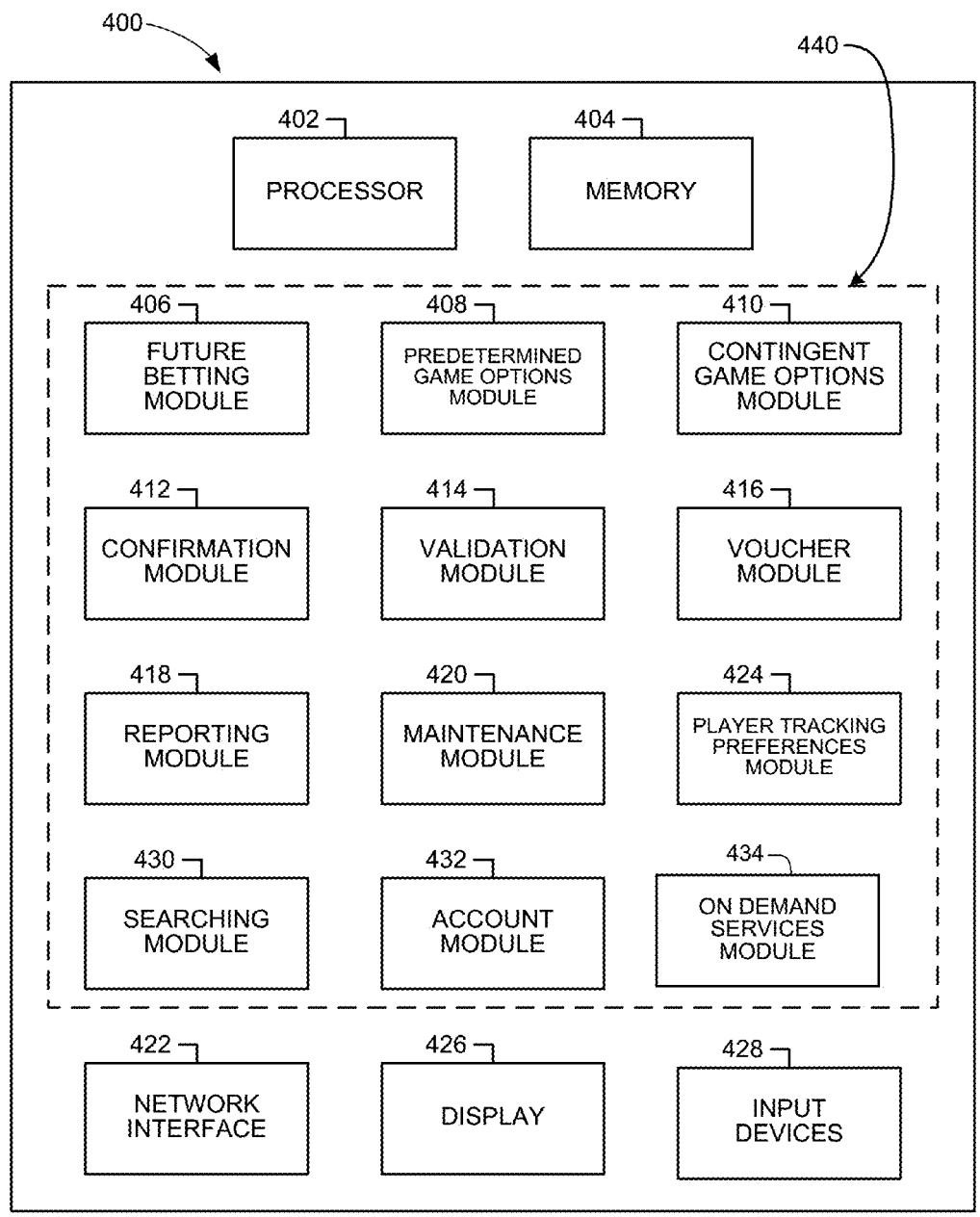
FIG. 4 shows a block diagram of electronic gaming device 400, in accordance with a specific embodiment.

FIG. 4 shows a block diagram 400 of electronic gaming device 400, in accordance with a specific embodiment. Electronic gaming device 400 may include a processor 402, a memory 404, a network interface 422, input devices 428, and a display 426.

Processor 402 may generate gaming options based on predetermined betting structures and/or outcome categories. Predetermined betting structures may utilize more than one outcome category to generate via processor 402 gaming options. Predetermined betting structures may combine any outcome category with any other outcome category to gaming options.

Processor 402 may offer a gaming option which is structured so that the gaming option relates to more than one EGD. Processor 402 may generate contingent gaming options 108 and/or predetermined gaming options 106. Contingent gaming options 108 may be structures such that when a triggering event occurs over one or more than one gaming event, racing event, and/or sporting event, the wager is activated.

Network interface 422 may allow electronic gaming device 400 to communicate with video/multimedia server 215, accounting/transaction server 220, gaming server 225, authentication server 230, player tracking server 235, voucher server 240, and gaming table 260.

Input devices 428 may be mechanical buttons, electronic buttons, a touchscreen, a microphone, cameras, an optical scanner, or any combination thereof. Input devices 428 may be utilized to make a wager, to make an offer to buy or sell a voucher, to determine a voucher's worth, to cash in a voucher, to modify (e.g., change sound level, configuration, font, language, etc.) electronic gaming device 400, to select a movie or music, to select type of content to be displayed on main and/or auxiliary screen(s) of EGD, or any combination thereof.

Display 426 may show video streams from one or more gaming tables 260, gaming objects from one or more gaming tables 260, computer generated graphics, predetermined gaming options 106, and/or contingent gaming options 108.

Memory 404 may include various memory modules 440. Memory 404 via various memory modules 440 may include a future betting module 406, a predetermined game options module 408, a contingent game options module 410, a confirmation module 412, a validation module 414, a voucher module 416, a reporting module 418, a maintenance module 420, a player tracking preferences module 424, a searching module 430, and an account module 432.

Future betting module 406 may store data relating to the predetermined betting structure. Processor 402 may utilize data in future betting module 406 to generate predetermined gaming options 106 and contingent gaming options 108. Any other processor (e.g., gaming server 225, any virtualized gaming server, etc.) may implement these functions of processor 402.

Predetermined game options module 408 may store data relating to predetermined gaming options 106, which may be offered to a player.

Contingent game options module 410 may store data relating to continent gaming options 108, which may be offered to a player.

Confirmation module 412 may utilize data received from a voucher, the transaction history of the voucher (e.g., the voucher changed hands in a secondary market), and/or the identity of the player to confirm the value of the voucher. In another example, confirmation module 412 may utilize game event data, along with voucher data to confirm the value of the voucher.

Validation module 414 may utilize data received from a voucher to confirm the validity of the voucher.

Voucher module 416 may store data relating to generated vouchers, redeemed vouchers, bought vouchers, and/or sold vouchers.

Reporting module 418 may generate reports related to a performance of electronic gaming device 400, electronic gaming system 200, On Demand 260, video streams, gaming objects, credit device 112, and/or identification device 114.

In one implementation, reporting module 418 may reside on a central server and may aggregate and generate real time statistics on betting activities at one or more gaming device(s) at one or more participating casino's. The aggregate betting statistics may include trends (e.g., aggregate daily wager volume and wager amount by game types, by casinos, and the like), top games with the most payouts, top tables with the most payouts, top search structures used by players, most popular gaming device(s) by wager volume, most searched for game, gaming device(s) with least payouts, weekly trends, monthly trends, and other statistics related to game plays, wagers, people, location, and searches.

The information and statistics generated by the server-based reporting module 418 may be displayed publicly or privately. For example, popular trending and statistical information on wager volume and wager amount for the top ten gaming device(s) may be publicly displayed in a casino display system so that players may study and decide what game to play, where, when, etc. Such a public display of general statistics may also be posted on the Internet, sent out as a text, an email, or multimedia message to the player's smart phones, tablets, desktop computer, etc. In another example, the trending and statistical information may also be distributed privately to privileged players such as casino club members.

Maintenance module 420 may track any maintenance that is implemented on electronic gaming device 400 and/or electronic gaming system 200. Maintenance module 420 may schedule preventative maintenance and/or request a service call based on a device error.

Player tracking preferences module 424 may compile and track data associated with a players preferences.

Searching module 430 may include one or more searching structures, one or more searching algorithms, and/or any other searching mechanisms. The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, one or more) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., baccarat tables, roulette tables, blackjack tables, poker tables, craps tables, Sic Bo tables, etc.). Searching structure may search one or more of these games.

In another example, the searching structure may be based on a player's preferences, past transactional history, player input, a particular gaming device or game type, a particular EGD, a particular casino, a particular location within a casino, game outcomes over a time period, payout over a time period, and/or any other criteria. Searching algorithms may be dynamic searching programs, which may be modified based on one or more past results, as described previously.

In another example, the search algorithm may generate a search priority based on the probability of success various events and/or conditions, as described previously. In some embodiments, the search algorithm may utilize any dynamic feedback procedure to enhance current and/or future searching results.

Account module 432 may include data relating to an account balance, a wager limit, a number of wagers placed, credit limits, any other player information, and/or any other account information.

Data from account module 432 may be utilized to determine whether a wager may be accepted. For example, when a search has determined a triggering event, the device and/or system may determine whether to allow this wager based on one or more of a wager amount, a number of wagers, a wager limit, an account balance, and/or any other criteria.

In at least one embodiment, the On Demand Module 434 may be configured or designed to implement and/or facilitate access to one or more On Demand Service(s)/feature(s) including, for example, one or more of the following (or combinations thereof):

Beverage On Demand Service(s);
Host On Demand Service(s);
Security On Demand Service(s);
Valet On Demand Service(s);
Weather On Demand Service(s);
Reporting service(s);
and/or other aspects of On Demand Services described and/or referenced herein.

In at least one embodiment, at least a portion of the modules discussed in block diagram 400 may reside locally in gaming terminal 400. However, in at least some embodiments, the functions performed by these modules may be implemented in one or more remote servers. For instance, modules 406-420, 424, 434, etc. may be implemented on a remote server, communicating with gaming terminal 400 via a network interface such as Ethernet in a local or a wide area network topology. In some implementations, these servers may be physical servers in a data center. In some other implementations, these servers may be virtualized. In yet some other implementations, the functions performed by these modules may be implemented as web services. For example, the predetermined game options module 408 may be implemented in software as a web service provider. Gaming terminal 400 would make service requests over the web for the available predetermined wager options to be displayed. Regardless of how the modules and their respective functions are implemented, the interoperability with the gaming terminal 400 is seamless.

Figure 5:
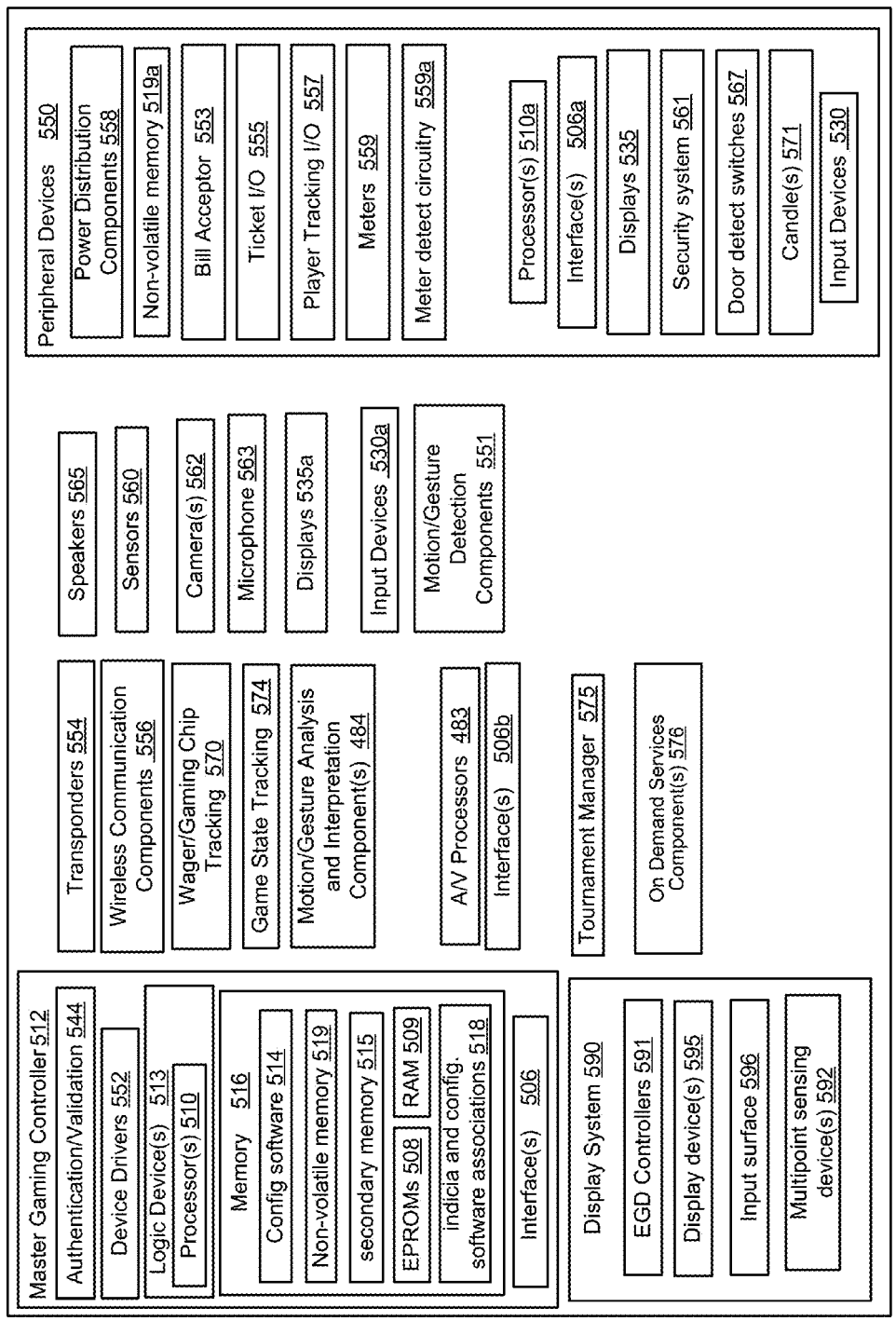
FIG. 5 is a simplified block diagram of an exemplary intelligent electronic gaming system 500 in accordance with a specific embodiment.

FIG. 5 is a simplified block diagram of an exemplary intelligent multi-player electronic gaming system 500 in accordance with a specific embodiment. In some embodiments, gaming system by hundred may be implemented as a gaming server. In other embodiments, gaming system 500 may be implemented as an electronic gaming machine (EGM) or electronic gaming device (EGD).

As illustrated in the embodiment of FIG. 5, gaming system 500 includes at least one processor 510, at least one interface 506, and memory 516. Additionally, as illustrated in the example embodiment of FIG. 5, gaming system 500 includes at least one master gaming controller 512, a multi-touch sensor and display system 590, a plurality of peripheral device components 550, and various other components, devices, systems such as, for example, one or more of the following (or combinations thereof):

Candle control system 569 which, for example, may include functionality for determining and/or controlling the appearances of one or more candles, etc.;
Transponders 554;
Wireless communication components 556;
Gaming chip/wager token tracking components 570;
Games state tracking components 574;
Motion/gesture analysis and interpretation components 584;
Audio/video processors 583 which, for example, may include functionality for detecting, analyzing and/or managing various types of audio and/or video information relating to various activities at the gaming system;
Various interfaces 506b (e.g., for communicating with other devices, components, systems, etc.);
Tournament manager 575;
On Demand Component(s) 576;
Sensors 560;
One or more cameras 562;
One or more microphones 563;
Secondary display(s) 535a;
Input devices 530a;
Motion/gesture detection components 551;
Peripheral Devices 550;

One or more cameras (e.g., 562) may be used to monitor, stream and/or record image content and/or video content relating to persons or objects within at least one camera's view. For example, in at least one embodiment where the gaming system is implemented as an EGD, camera 562 may be used to generate a live, real-time video feed of a player (or other person) who is currently interacting with the EGD. In some embodiments, camera 562 may be used to verify a user's identity (e.g., by authenticating detected facial features), and/or may be used to monitor or tract facial expressions and/or eye movements of a user or player who is interacting with the gaming system.

In at least one embodiment, display system 590 may include one or more of the following (or combinations thereof):

EGD controllers 591;
Multipoint sensing device(s) (e.g., multi-touch surface sensors/components);
Display device(s) 595;
Input/touch surface 596;
Etc.

According to various embodiments, display surface(s) 595 may include one or more display screens utilizing various types of display technologies such as, for example, one or more of the following (or combinations thereof): LCDs (Liquid Crystal Display), Plasma, OLEDs (Organic Light Emitting Display), TOLED (Transparent Organic Light Emitting Display), Flexible (F)OLEDs, Active matrix (AM) OLED, Passive matrix (PM) OLED, Phosphor-escent (PH) OLEDs, SEDs (surface-conduction electron-emitter display), EPD (ElectroPhoretic display), FEDs (Field Emission Displays) and/or other suitable display technology. EPD displays may be provided by E-ink of Cambridge, Mass. OLED displays of the type list above may be provided by Universal Display Corporation, Ewing, N.J.

In at least one embodiment, master gaming controller 512 may include one or more of the following (or combinations thereof):

Authentication/validation components 544;
Device drivers 542;
Logic devices 513, which may include one or more processors 510;
Memory 516, which may include one or more of the following (or combinations thereof): configuration software 514, non-volatile memory 515, EPROMS 508, RAM 509, associations 518 between indicia and configuration software, etc.;
Interfaces 506;
Etc.

In at least one embodiment, Peripheral Devices 550 may include one or more of the following (or combinations thereof):

Power distribution components 558;
Non-volatile memory 519a (and/or other types of memory);
Bill acceptor 553;
Ticket I/O 555;
Player tracking I/O 557;
Meters 559 (e.g., hard and/or soft meters);
Meter detect circuitry 559a;
Processor(s) 510a;
Interface(s) 506a;
Display(s) 535;
Independent security system 561;
Door detect switches 567;
Candles, etc. 571;
Input devices 530;
Etc.

In at least one embodiment, the On Demand Component(s) 576 may be configured or designed to implement and/or facilitate access to one or more On Demand Service(s)/feature(s) including, for example, one or more of the following (or combinations thereof):

Beverage On Demand Service(s);
Host On Demand Service(s);
Security On Demand Service(s);
Valet On Demand Service(s);
Weather On Demand Service(s);
Reporting service(s);
and/or other aspects of On Demand Services described and/or referenced herein.

In one implementation, processor 510 and master gaming controller 512 are included in a logic device 513 enclosed in a logic device housing. The processor 510 may include any conventional processor or logic device configured to execute software allowing various configuration and reconfiguration tasks such as, for example: a) communicating with a remote source via communication interface 506, such as a server that stores authentication information or games; b) converting signals read by an interface to a format corresponding to that used by software or memory in the gaming system; c) accessing memory to configure or reconfigure game parameters in the memory according to indicia read from the device; d) communicating with interfaces, various peripheral devices and/or I/O devices; e) operating peripheral devices such as, for example, card readers, paper ticket readers, etc.; f) operating various I/O devices such as, for example, displays 535, input devices 530; etc. For instance, the processor 510 may send messages including game play information to the displays 535 to inform players of game play/event information, wagering information, and/or other desired information.

In at least one implementation, the gaming system may include card readers such as used with credit cards, or other identification code reading devices to allow or may require player identification in connection with play of the card game and associated recording of game action. Such a player identification interface may be implemented in the form of a variety of magnetic card readers commercially available for reading a player-specific identification information. The player-specific information may be provided on specially constructed magnetic cards issued by a casino, or magnetically coded credit cards or debit cards frequently used with national credit organizations such as VISA, MASTERCARD, AMERICAN EXPRESS, or banks and other institutions.

The gaming system may include other types of participant identification mechanisms which may use a fingerprint image, eye blood vessel image reader, or other suitable biological information to confirm identity of the player. Such personalized identification information could also be used to confirm credit use of a smart card, transponder, and/or player's personal player input device (UID).

The gaming system 500 also includes memory 516 which may include, for example, volatile memory (e.g., RAM 509), non-volatile memory 519 (e.g., disk memory, FLASH memory, EPROMs, etc.), unalterable memory (e.g., EPROMs 508), etc. The memory may be configured or designed to store, for example: 1) configuration software 514 such as one or more the parameters and settings for a game playable on the gaming system; 2) associations 518 between configuration indicia read from a device with one or more parameters and settings; 3) communication protocols allowing the processor 510 to communicate with peripheral devices and I/O devices 511; 5) a secondary memory storage device 515 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming system to communicate with local and non-local devices using such protocols; etc. In one implementation, the master gaming controller 512 communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers 542 may be stored in memory 516. Example of different types of device drivers may include device drivers for gaming system components, device drivers for gaming system components, etc. Typically, the device drivers 542 utilize a communication protocol of some type that enables communication with a particular physical device. The device driver abstracts the hardware implementation of a device. For example, a device drive may be written for at least one type of card reader that may be potentially connected to the gaming system. Examples of communication protocols used to implement the device drivers include Netplex, USB, Serial, Ethernet 575, Firewire, I/O debouncer, direct memory map, serial, PCI, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 516 by the processor 510 to allow communication with the device. For instance, one type of card reader in gaming system 500 may be replaced with a second type of card reader where device drivers for both card readers are stored in the memory 516.

In some embodiments, the software units stored in the memory 516 may be upgraded as needed. For instance, when the memory 516 is a hard drive, new games, game options, various new parameters, new settings for existing parameters, new settings for new parameters, device drivers, and new communication protocols may be uploaded to the memory from the master gaming controller 512 or from some other external device. As another example, when the memory 516 includes a CD/DVD drive including a CD/DVD designed or configured to store game options, parameters, and settings, the software stored in the memory may be upgraded by replacing a first CD/DVD with a second CD/DVD. In yet another example, when the memory 516 uses one or more flash memory 519 or EPROM 508 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 500 may also include various authentication and/or validation components 544 which may be used for authenticating/validating specified gaming system components such as, for example, hardware components, software components, firmware components, information stored in the gaming system memory 516, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for one or more purposes.

Sensors 560 may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; etc.

In one implementation, at least a portion of the sensors 560 and/or input devices 530 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player may include input functionality for enabling players to provide their game play decisions/instructions (and/or other input) to the EGD using the touch keys and/or other player control sensors/buttons. Additionally, such input functionality may also be used for allowing players to provide input to other devices in the casino gaming network (such as, for example, player tracking systems, side wagering systems, etc.)

Wireless communication components 556 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

An example of a near-field communication protocol is the ECMA-340 "Near Field Communication-Interface and Protocol (NFCIP-1)", published by ECMA International (www.ecma-international.org), herein incorporated by reference in its entirety for one or more purposes. It may be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 5 devices using such wireless communication protocols.

Power distribution components 558 may include, for example, components or devices which are operable for providing wireless power to other devices. For example, in one implementation, the power distribution components 558 may include a magnetic induction system which is adapted to provide wireless power to one or more portable UIDs at the gaming system. In one implementation, a UID docking region may include a power distribution component which is able to recharge a UID placed within the UID docking region without requiring metal-to-metal contact.

In at least one embodiment, motion/gesture detection component(s) 551 may be configured or designed to detect player movements and/or gestures and/or other input data from the player. In some embodiments, at least one gaming system may have its own respective motion/gesture detection component(s). In other embodiments, motion/gesture detection component(s) 551 may be implemented as a separate sub-system of the gaming system which is not associated with any one specific gaming system or device.

Figure 6:
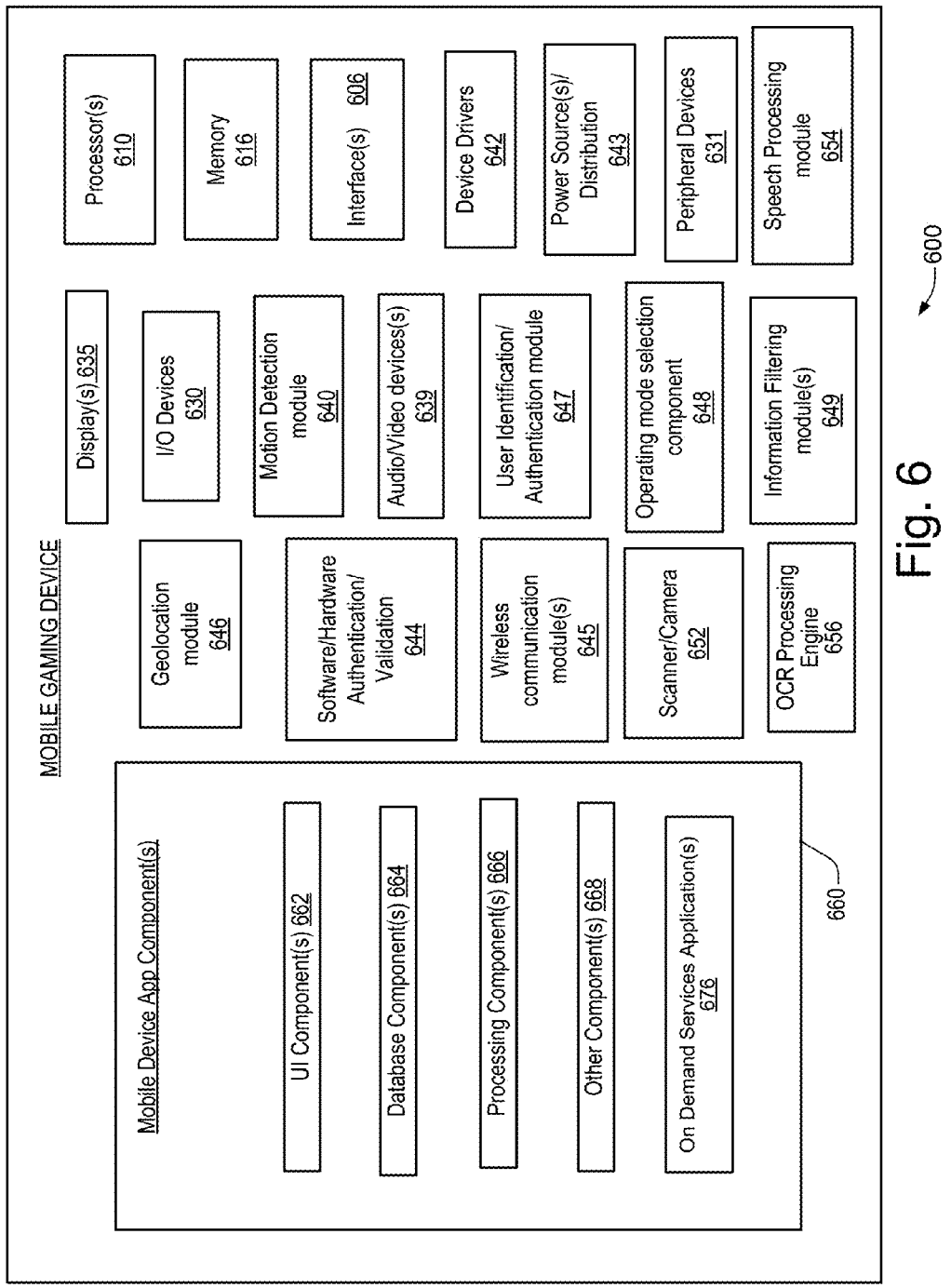
FIG. 6 is a simplified block diagram of an exemplary mobile gaming device 600 in accordance with a specific embodiment.

FIG. 6 is a simplified block diagram of an exemplary mobile gaming device 600 in accordance with a specific embodiment. In at least one embodiment, one or more players may participate in a wager-based, arcade-style video game session using mobile gaming devices. In at least some embodiments, the mobile gaming device may be configured or designed to include or provide functionality which is similar to that of an electronic gaming device (EGD) such as that described, for example, in FIG. 4.

As illustrated in the example of FIG. 6, mobile gaming device 600 may include a variety of components, modules and/or systems for providing various functionality. For example, as illustrated in FIG. 6, mobile gaming device 600 may include Mobile Device Application components (e.g., 660), which, for example, may include, but are not limited to, one or more of the following (or combinations thereof):

UI Components 662 such as those illustrated, described, and/or referenced herein.

Database Components 664 such as those illustrated, described, and/or referenced herein.

Processing Components 666 such as those illustrated, described, and/or referenced herein.

On Demand Application(s) 676 such as those illustrated, described, and/or referenced herein.

Other Components 668 which, for example, may include components for facilitating and/or enabling the mobile gaming device to perform and/or initiate various types of operations, activities, functions such as those described herein.

In at least one embodiment, the mobile gaming device may include Mobile Device App Component(s) which have been configured or designed to provide functionality for enabling or implementing at least a portion of the various On Demand Service(s) at the mobile gaming device.

According to specific embodiments, various aspects, features, and/or functionalities of the mobile gaming device may be performed, implemented and/or initiated by one or more of the following types of systems, components, systems, devices, procedures, processes, etc. (or combinations thereof):

Processor(s) 610
Device Drivers 642
Memory 616
Interface(s) 606
Power Source(s)/Distribution 643
Geolocation module 646
Display(s) 635
I/O Devices 630
Audio/Video devices(s) 639
Peripheral Devices 631
Motion Detection module 640
User Identification/Authentication module 647
Client App Component(s) 660
Other Component(s) 668
UI Component(s) 662
Database Component(s) 664
Processing Component(s) 666
Software/Hardware Authentication/Validation 644
Wireless communication module(s) 645
Information Filtering module(s) 649
Operating mode selection component 648
Speech Processing module 654
Scanner/Camera 652
OCR Processing Engine 656
etc.

Figure 7:
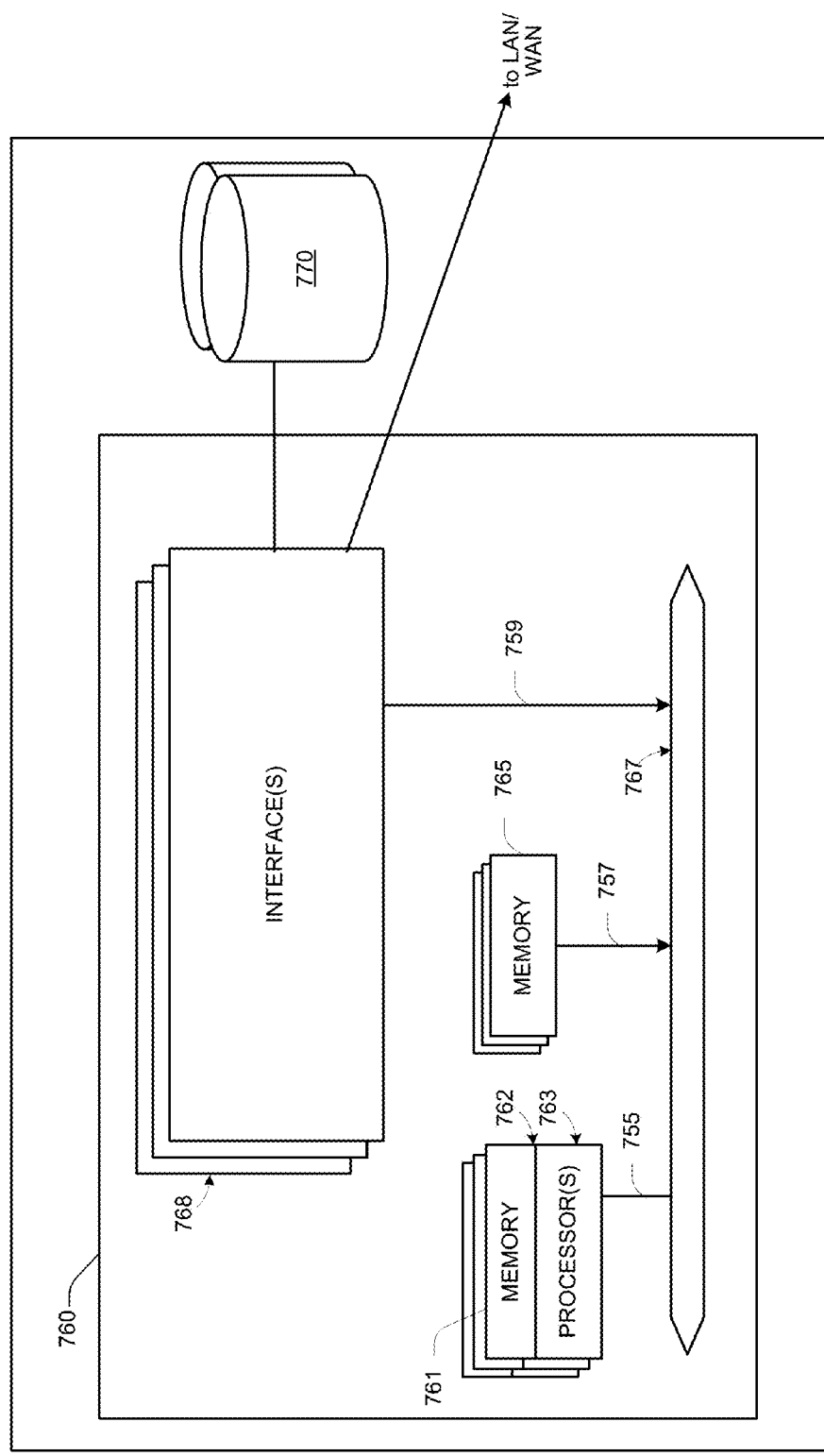
FIG. 7 illustrates an example embodiment of a System Server 780 which may be used for implementing various aspects/features described herein.

FIG. 7 illustrates an example embodiment of a system server 780 which may be used for implementing various aspects/features described herein. In at least one embodiment, the system server 780 includes at least one network device 760, and at least one storage device 770 (such as, for example, a direct attached storage device). In one embodiment, system server 780 may be suitable for implementing at least some of the On Demand Service(s)/feature(s) described herein.

In according to one embodiment, network device 760 may include a master central processing unit (CPU) 762, interfaces 768, and a bus 767 (e.g., a PCI bus). When acting under the control of appropriate software or firmware, the CPU 762 may be responsible for implementing specific functions associated with the functions of a desired network device. For example, when configured as a server, the CPU 762 may be responsible for analyzing packets; encapsulating packets; forwarding packets to appropriate network devices; instantiating various types of virtual machines, virtual interfaces, virtual storage volumes, virtual appliances; etc. The CPU 762 preferably accomplishes at least a portion of these functions under the control of software including an operating system (e.g. Linux), and any appropriate system software (such as, for example, AppLogic™ software).

CPU 762 may include one or more processors 763 such as, for example, one or more processors from the AMD, Motorola, Intel and/or MIPS families of microprocessors. In an alternative embodiment, processor 763 may be specially designed hardware for controlling the operations of system server 780. In a specific embodiment, a memory 761 (such as non-volatile RAM and/or ROM) also forms part of CPU 762. However, there may be many different ways in which memory could be coupled to the system. Memory block 761 may be used for a variety of purposes such as, for example, caching and/or storing data, programming instructions, etc.

The interfaces 768 may be typically provided as interface cards (sometimes referred to as "line cards"). Alternatively, one or more of the interfaces 768 may be provided as on-board interface controllers built into the system motherboard. Generally, they control the sending and receiving of data packets over the network and sometimes support other peripherals used with the system server 780. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

In at least one embodiment, some interfaces may be configured or designed to allow the system server 780 to communicate with other network devices associated with various local area network (LANs) and/or wide area networks (WANs). Other interfaces may be configured or designed to allow network device 760 to communicate with one or more direct attached storage device(s) 770.

Although the system shown in FIG. 7 illustrates one specific network device described herein, it is by no means the only network device architecture on which one or more embodiments may be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 765, which, for example, may include random access memory (RAM)) configured to store data, program instructions for the general-purpose network operations and/or other information relating to the functionality of the various On Demand Service(s)/feature(s) described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
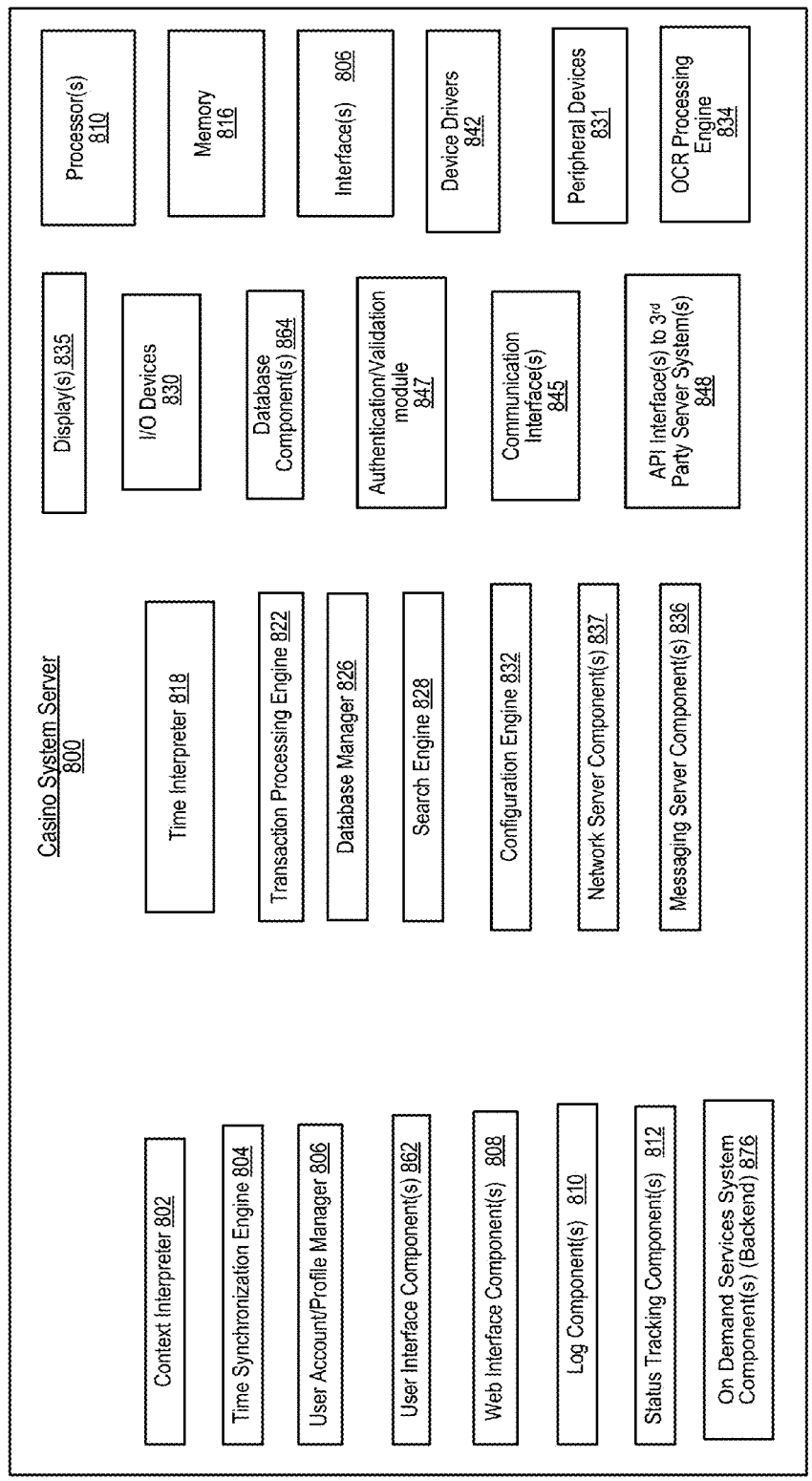
FIG. 8 illustrates an example of a functional block diagram of a Gaming System Server in accordance with a specific embodiment.

FIG. 8 illustrates an example of a functional block diagram of a Gaming System Server in accordance with a specific embodiment. In at least one embodiment, the Virtual Live electronic gaming device System Server may be operable to perform and/or implement various types of functions, operations, actions, and/or other features, such as, for example, one or more of those described and/or referenced herein.

In at least one embodiment, the Gaming System Server may include a plurality of components operable to perform and/or implement various types of functions, operations, actions, and/or other features such as, for example, one or more of the following (or combinations thereof):

Context Interpreter (e.g., 802) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (or combinations thereof):

location-based criteria (e.g., geolocation of mobile gaming device, geolocation of EGD, etc.)
time-based criteria
identity of user(s)
user profile information
transaction history information
recent user activities
etc.

Time Synchronization Engine (e.g., 804) which, for example, may be operable to manages universal time synchronization (e.g., via NTP and/or GPS)

Search Engine (e.g., 828) which, for example, may be operable to search for transactions, logs, game history information, player information, On Demand information, etc., which may be accessed from one or more local and/or remote databases.

Configuration Engine (e.g., 832) which, for example, may be operable to determine and handle configuration of various customized configuration parameters for one or more devices, component(s), system(s), process(es), etc.

Time Interpreter (e.g., 818) which, for example, may be operable to automatically and/or dynamically modify or change identifier activation and expiration time(s) based on various criteria such as, for example, time, location, transaction status, etc.

Authentication/Validation Component(s) (e.g., 847) (password, software/hardware info, SSL certificates) which, for example, may be operable to perform various types of authentication/validation tasks such as one or more of those described and/or referenced herein.

Transaction Processing Engine (e.g., 822) which, for example, may be operable to handle various types of transaction processing tasks such as, for example, one or more of those described and/or referenced herein.

OCR Processing Engine (e.g., 834) which, for example, may be operable to perform image processing and optical character recognition of images such as those captured by a gaming device camera, for example.

Database Manager (e.g., 826) which, for example, may be operable to handle various types of tasks relating to database updating, database management, database access, etc. In at least one embodiment, the Database Manager may be operable to manage game history databases, player tracking databases, etc.

Log Component(s) (e.g., 810) which, for example, may be operable to generate and manage transactions history logs, system errors, connections from APIs, etc.

Status Tracking Component(s) (e.g., 812) which, for example, may be operable to automatically and/or dynamically determine, assign, and/or report updated transaction status information based, for example, on the state of the transaction.

Gateway Component(s) (e.g., 814) which, for example, may be operable to facilitate and manage communications and transactions with external Payment Gateways.

Web Interface Component(s) (e.g., 808) which, for example, may be operable to facilitate and manage communications and transactions with virtual live electronic gaming device web portal(s).

API Interface(s) to Gaming System Server(s) (e.g., 846) which, for example, may be operable to facilitate and manage communications and transactions with API Interface(s) to Gaming System Server(s)

API Interface(s) to 3rd Party System Server(s) (e.g., 848) which, for example, may be operable to facilitate and manage communications and transactions with API Interface(s) to 3rd Party System Server(s)

At least one processor 810. In at least one embodiment, the processor(s) 810 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of a gaming system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 816, which, for example, may include volatile memory (e.g., RAM), non-volatile memory (e.g., disk memory, FLASH memory, EPROMs, etc.), unalterable memory, and/or other types of memory. In at least one implementation, the memory 816 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile gaming system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein.

Interface(s) 806 which, for example, may include wired interfaces and/or wireless interfaces. In at least one implementation, the interface(s) 806 may include functionality similar to at least a portion of functionality implemented by one or more computer system interfaces such as those described herein and/or generally known to one having ordinary skill in the art.

Device driver(s) 842. In at least one implementation, the device driver(s) 842 may include functionality similar to at least a portion of functionality implemented by one or more computer system driver devices such as those described herein and/or generally known to one having ordinary skill in the art.

One or more display(s) 835.

Messaging Server Component(s) 836, which, for example, may be configured or designed to provide various functions and operations relating to messaging activities and communications.

Network Server Component(s) 837, which, for example, may be configured or designed to provide various functions and operations relating to network server activities and communications.

On Demand Services System Components (Backend) 876. In at least one embodiment, the Backend On Demand Services System Components may include the ODS Menu Management System, and may be configured or designed to implement and/or facilitate implementation, configuration, management, analysis, and reporting of On Demand Services including, for example, one or more of the following (or combinations thereof):

Beverage On Demand Service(s);
Host On Demand Service(s);
Security On Demand Service(s);
Valet On Demand Service(s);
Weather On Demand Service(s);
Reporting service(s);
and/or other aspects of On Demand Services described and/or referenced herein.

Etc.

Figure 9:
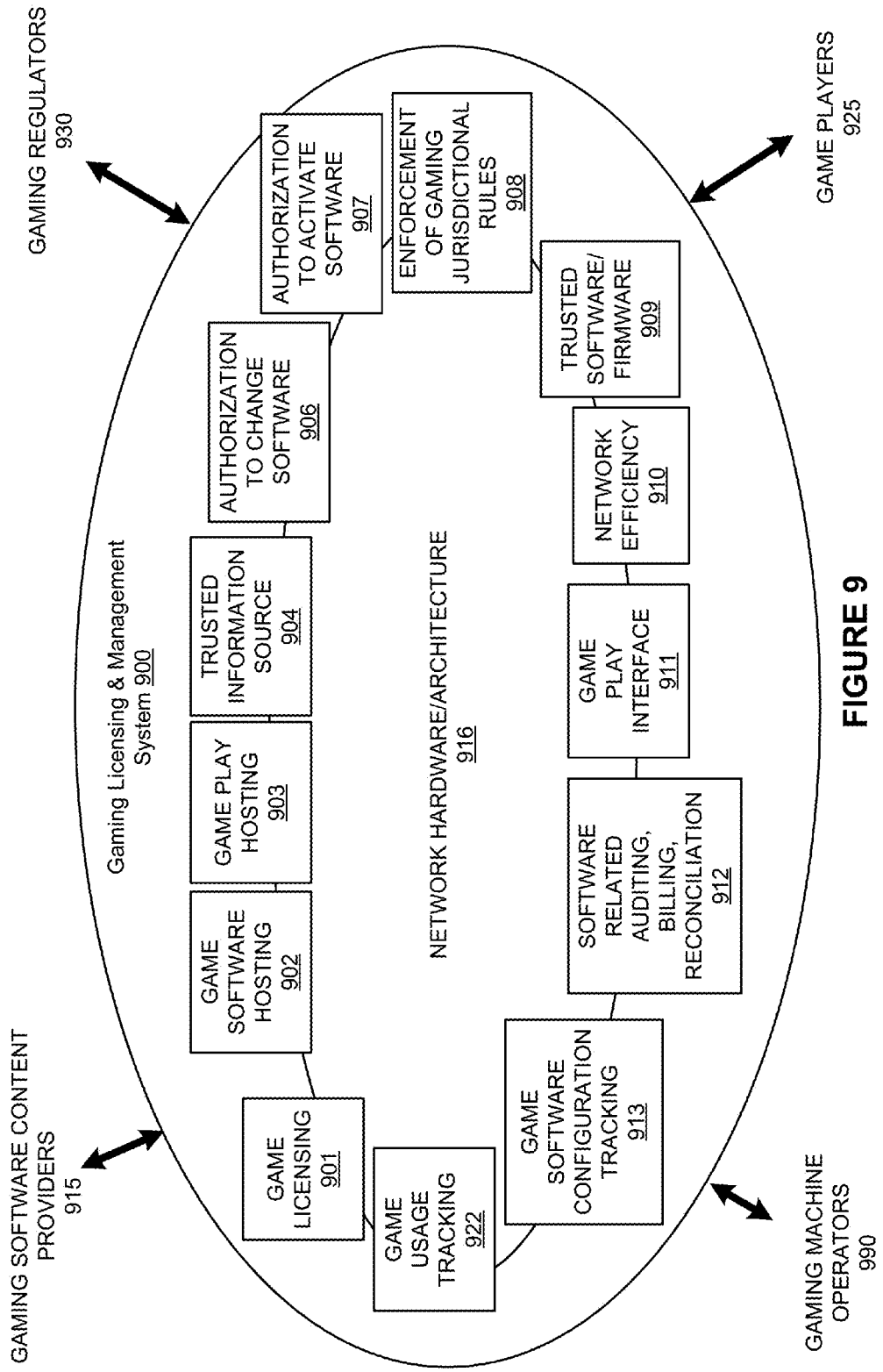
FIG. 9 shows a block diagram illustrating components of a gaming system 900 which may be used for implementing various aspects of example embodiments.

FIG. 9 shows a block diagram illustrating components of a gaming system 900 which may be used for implementing various aspects of example embodiments. In FIG. 9, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 9, only one instance of at least one function is shown. The functions of the components may be combined. For example, a single device may comprise the game play interface 911 and include trusted memory devices or sources 909.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that may be applied to the gaming system and may receive reports and other information confirming that rules are being obeyed.

In the following paragraphs, details of at least one component and some of the interactions between the components are described with respect to FIG. 9. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 9) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 915 may track the usage of game software on a plurality of devices in communication with the host. The game usage-tracking host 915 may be in communication with a plurality of game play hosts and gaming machines. From the game play hosts and gaming machines, the game usage tracking host 915 may receive updates of an amount that at least one game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min wagers). Details of a game software host and a game software configuration host that may be used with example embodiments are described in co-pending U.S. Pat. No. 6,645,077, by Rowe, titled, "Gaming Terminal Data Repository and Information System," filed Dec. 91, 9000, which is incorporated herein in its entirety and for one or more purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device may employ a verification scheme to verify the identity of the trusted information source. For example, the trusted information source and the remote device may exchange information using public and private encryption keys to verify at least one other's identities. In another example of an embodiment, the remote device and the trusted information source may engage in methods using zero knowledge proofs to authenticate at least one of their respective identities. Details of zero knowledge proofs that may be used with example embodiments are described in US publication no. 9003/0203756, by Jackson, filed on Apr. 95, 9002 and titled, "Authentication in a Secure Computerized Gaming System, which is incorporated herein in its entirety and for one or more purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of example embodiments may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with example embodiments is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum wager limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, e.g., game software approved for use on gaming devices by a local gaming jurisdiction may be required on gaming devices on the gaming machine.

In example embodiments, the devices may be connected by a network 916 with different types of hardware using different hardware architectures. Game software may be quite large and frequent downloads may place a significant burden on a network, which may slow information transfer speeds on the network. For game-on-demand services that may require frequent downloads of game software in a network, efficient downloading is desirable for the service to viable. Thus, in example embodiments, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on at least one gaming device. In one embodiment, the software auditing server 912 may store a record of software configurations on at least one gaming device at particular times and a record of software download transactions that have occurred on the device. By applying at least one of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are compriseent with the current software configuration on the device. The report may also identify any incompriseencies. In another embodiment, both the gaming device and the software auditing server may store a record of the download transactions that have occurred on the gaming device and the software auditing server may reconcile these records.

There are many possible interactions between the components described with respect to FIG. 9. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of example embodiments described herein.

Example Procedures and Flow Diagrams

According to different embodiments, at least a portion of the various types of functions, operations, actions, and/or other features provided by the On Demand Procedures described herein may be implemented at one or more client systems(s), at one or more System Servers(s), and/or combinations thereof.

In at least one embodiment, one or more of the On Demand procedures may be operable to utilize and/or generate various different types of data and/or other types of information when performing specific tasks and/or operations. This may include, for example, input data/information and/or output data/information. For example, in at least one embodiment, the On Demand procedures may be operable to access, process, and/or otherwise utilize information from one or more different types of sources, such as, for example, one or more local and/or remote memories, devices and/or systems. Additionally, in at least one embodiment, the On Demand procedures may be operable to generate one or more different types of output data/information, which, for example, may be stored in memory of one or more local and/or remote devices and/or systems. Examples of different types of input data/information and/or output data/information which may be accessed and/or utilized by the On Demand procedures may include, but are not limited to, one or more of those described and/or referenced herein.

In at least one embodiment, a given instance of the On Demand procedures may access and/or utilize information from one or more associated databases. In at least one embodiment, at least a portion of the database information may be accessed via communication with one or more local and/or remote memory devices. Examples of different types of data which may be accessed by the On Demand procedures may include, but are not limited to, one or more of those described and/or referenced herein.

According to specific embodiments, multiple instances or threads of the On Demand procedures may be concurrently implemented and/or initiated via the use of one or more processors and/or other combinations of hardware and/or hardware and software. For example, in at least some embodiments, various aspects, features, and/or functionalities of the On Demand procedures may be performed, implemented and/or initiated by one or more of the various systems, components, systems, devices, procedures, processes, etc., described and/or referenced herein.

According to different embodiments, one or more different threads or instances of the On Demand procedures may be initiated in response to detection of one or more conditions or events satisfying one or more different types of minimum threshold criteria for triggering initiation of at least one instance of the On Demand procedures. Various examples of conditions or events which may trigger initiation and/or implementation of one or more different threads or instances of the On Demand procedures may include, but are not limited to, one or more of those described and/or referenced herein.

According to different embodiments, one or more different threads or instances of the On Demand procedures may be initiated and/or implemented manually, automatically, statically, dynamically, concurrently, and/or combinations thereof. Additionally, different instances and/or embodiments of the On Demand procedures may be initiated at one or more different time intervals (e.g., during a specific time interval, at regular periodic intervals, at irregular periodic intervals, upon demand, etc.).

In at least one embodiment, initial configuration of a given instance of the On Demand procedures may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the On Demand procedures may correspond to and/or may be derived from the input data/information.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the On Demand Services System(s) as defined, for example, in the appended claims.

It is claimed:

1. A computer implemented system, deployed at a casino establishment, for providing On Demand Services via a casino gaming network, the casino establishment including a first electronic gaming device ("first EGD") and a second electronic gaming device ("second EGD"), the first and second electronic gaming devices being communicatively coupled to the casino gaming network, the first electronic gaming device being configured to enable a first patron to engage in first wager-based game at the first electronic gaming device, the first electronic gaming device including a first display and a first input interface, the second electronic gaming device being configured to enable a second patron to engage in second wager-based game at the second electronic gaming device, the second electronic gaming device including a second display and a second input interface, the system comprising:

at least one processor;

memory;

an ODS database configured to store menu item data relating to a plurality of ODS menu items, including a first menu item and a second menu item;

the at least one processor being operable to execute a plurality of instructions stored in the memory to:

detect that the first patron is engaged in a wager-based gaming activities at the first EGD;

track wagering activities performed by the first patron during a first time interval;

display a first ODS Menu GUI at the first display of the first EGD, the first ODS Menu GUI being configurable to display selected menu item content representing products and/or services which are available to be ordered via interaction with the first ODS Menu GUI;

analyze the first patron's tracked wagering activities to determine if the first patron's tracked wagering activities satisfy a first set of criteria;

if it is determined that the first patron's tracked wagering activities satisfy the first set of criteria, automatically and dynamically configure the first ODS Menu GUI to: (i) display, at the first EGD display, a first portion of content representing the first menu item, (ii) enable the first patron to submit to the system, via interaction with the first ODS Menu GUI, a first ODS order which includes the first menu item, and (iii) cause at least one component of the system to generate and send a first set of information relating to the first ODS order to a first casino entity for handling fulfillment of the first ODS order, the first casino entity being located at the casino establishment;

if it is determined that the first patron's tracked wagering activities does not satisfy the first set of criteria, automatically and dynamically configure the first ODS Menu GUI to inhibit display of the first menu item at the first EGD display to thereby prevent the first patron from being able to order the first menu item via interaction with the first ODS Menu GUI;

track, after the first ODS order has been submitted to the system, additional wagering activities performed by the first patron during a subsequent time interval;

analyze the first patron's tracked additional wagering activities to determine if the first patron's tracked additional wagering activities satisfy the first set of criteria; and if it is determined that the first patron's tracked additional wagering activities does not satisfy the first set of criteria, automatically cause at least one component of the system to cancel the first ODS order.

2. The computer implemented system of claim 1 wherein the system is further operable to cause the at least one processor to execute a plurality of instructions stored in the memory to:

analyze the first patron's tracked wagering activities to determine if the first patron's tracked wagering activities satisfy a second set of criteria;

if it is determined that the first patron's tracked wagering activities satisfy the second set of criteria, automatically and dynamically configure the first ODS Menu GUI to: (i) display, at the first EGD display, a second portion of content representing the second menu item, (ii) enable the first patron to submit to the system, via interaction with the first ODS Menu GUI, a second ODS order which includes the second menu item, and (iii) cause at least one component of the system to generate and send a second set of information relating to the second ODS order to a second casino entity for handling fulfillment of the second ODS order, the second casino entity being located at the casino establishment; and if it is determined that the first patron's tracked wagering activities does not satisfy the second set of criteria, automatically and dynamically configure the first ODS Menu GUI to inhibit display of the second menu item at the first EGD display to thereby prevent the first patron from being able to order the second menu item via interaction with the first ODS Menu GUI.

3. The computer implemented system of claim 1 wherein the system is further operable to cause the at least one processor to execute a plurality of instructions stored in the memory to:

analyze the first patron's tracked wagering activities to determine if the first patron's tracked wagering activities satisfy a second set of criteria;

if it is determined that the first patron's tracked wagering activities satisfy the second set of criteria, automatically and dynamically: (i) determine a first purchase price of the first menu item; (ii) display, at the first ODS Menu GUI, the first purchase price of the first menu item, and (iii) enable the first patron to place an ODS order to purchase the first menu item at the first purchase price, via interaction with the first ODS Menu GUI; and analyze the first patron's tracked wagering activities to determine if the first patron's tracked wagering activities satisfy a third set of criteria; and if it is determined that the first patron's tracked wagering activities satisfy the third set of criteria, automatically and dynamically: (i) determine a second purchase price of the first menu item; (ii) display, at the first ODS Menu GUI, the second purchase price of the first menu item, and (iii) enable the first patron to place an ODS order to purchase the first menu item at the second purchase price, via interaction with the first ODS Menu GUI.

4. The computer implemented system of claim 1:
wherein the first menu item corresponds to a first beverage item; and
wherein the first casino entity corresponds to a first bar at the casino establishment.

5. The computer implemented system of claim 1:
wherein the first menu item corresponds to a first food item; and
wherein the first casino entity corresponds to a first restaurant at the casino establishment.

6. The computer implemented system of claim 1:
wherein the first menu item corresponds to a first service item; and
wherein the first casino entity corresponds to a first service provider at the casino establishment.

7. The computer implemented system of claim 1, wherein the first EGD includes a first EGD processor and first EGD memory for storing a first plurality of instructions, the first EGD further including a validator component operable to accept indicia of credit, the system being further operable to cause the first EGD processor to execute the first plurality of instructions for:

receive, via the validator component, a first indicia of credit provided by the first patron, the first indicia of credit having a monetary value associated therewith;

use monetary value of the first indicia to update a credit balance at the first EGM; and use a first portion of the credit balance to fund payment of the first ODS order.

8. The computer implemented system of claim 1 wherein the system is further operable to cause the at least one processor to execute a plurality of instructions stored in the memory to:

determine if the first patron is a VIP patron or a non-VIP patron;

if it is determined that the first patron is a VIP patron, automatically and dynamically configure a second ODS Menu GUI to: (i) display, at the first EGD display, a second portion of content representing the second menu item, (ii) enable the first patron to submit to the system, via interaction with the second ODS Menu GUI, a second ODS order which includes the second menu item, and (iii) cause at least one component of the system to generate and send a second set of information relating to the second ODS order to a second casino entity for handling fulfillment of the second ODS order, the second casino entity being located at the casino establishment; and if it is determined that the second patron is a non-VIP patron, automatically and dynamically configure the second ODS Menu GUI to inhibit display of the second menu item at the first EGD display to thereby prevent the first patron from being able to order the second menu item via interaction with the second ODS Menu GUI.

9. The computer implemented system of claim 8 wherein the system is further operable to cause the at least one processor to execute a plurality of instructions stored in the memory to:

if it is determined that the first patron is a VIP patron, automatically and dynamically: (i) determine a first purchase price of the second menu item; (ii) display, at the second ODS Menu GUI, the first purchase price of the second menu item, and (iii) enable the first patron to place an ODS order to purchase the second menu item at the first purchase price, via interaction with the second ODS Menu GUI; and if it is determined that the first patron is a non-VIP patron, automatically and dynamically: (i) determine a second purchase price of the second menu item; (ii) display, at the second ODS Menu GUI, the second purchase price of the second menu item, and (iii) enable the first patron to place an ODS order to purchase the second menu item at the second purchase price, via interaction with the second ODS Menu GUI.

10. A computer implemented method, deployed at a casino establishment, for providing On Demand Services via a casino gaming network, the casino establishment including a first electronic gaming device ("first EGD") and a second electronic gaming device ("second EGD"), the first and second electronic gaming devices being communicatively coupled to the casino gaming network, the first electronic gaming device being configured to enable a first patron to engage in first wager-based game at the first electronic gaming device, the first electronic gaming device including a first display and a first input interface, the second electronic gaming device being configured to enable a second patron to engage in second wager-based game at the second electronic gaming device, the second electronic gaming device including a second display and a second input interface; the system including an ODS database configured to store menu item data relating to a plurality of ODS menu items, including a first menu item and a second menu item; the system further including at least one processor, and a memory storing a plurality of instructions, the method comprising causing the at least one processor to execute the plurality of instructions stored in the memory to:

detect that the first patron is engaged in a wager-based gaming activities at the first EGD;

track wagering activities performed by the first patron during a first time interval;

display a first ODS Menu GUI at the first display of the first EGD, the first ODS Menu GUI being configurable to display selected menu item content representing products and/or services which are available to be ordered via interaction with the first ODS Menu GUI;

analyze the first patron's tracked wagering activities to determine if the first patron's tracked wagering activities satisfy a first set of criteria;

in response to determining that the first patron's tracked wagering activities satisfy the first set of criteria, automatically and dynamically configure the first ODS Menu GUI to: (i) display, at the first EGD display, a first portion of content representing the first menu item, (ii) enable the first patron to submit to the system, via interaction with the first ODS Menu GUI, a first ODS order which includes the first menu item, and (iii) cause at least one component of the system to generate and send a first set of information relating to the first ODS order to a first casino entity for handling fulfillment of the first ODS order, the first casino entity being located at the casino establishment;

in response to determining that the first patron's tracked wagering activities does not satisfy the first set of criteria, automatically and dynamically configure the first ODS Menu GUI to inhibit display of the first menu item at the first EGD display to thereby prevent the first patron from being able to order the first menu item via interaction with the first ODS Menu GUI;

track, after the first ODS order has been submitted to the system, additional wagering activities performed by the first patron during a subsequent time interval;

analyze the first patron's tracked additional wagering activities to determine if the first patron's tracked additional wagering activities satisfy the first set of criteria; and in response to determining that the first patron's tracked additional wagering activities does not satisfy the first set of criteria, automatically cause at least one component of the system to cancel the first ODS order.

11. The computer implemented method of claim 10 further comprising causing the at least one processor to execute a plurality of instructions stored in the memory to:

analyze the first patron's tracked wagering activities to determine if the first patron's tracked wagering activities satisfy a second set of criteria;

in response to determining that the first patron's tracked wagering activities satisfy the second set of criteria, automatically and dynamically: (i) determine a first purchase price of the first menu item; (ii) display, at the first ODS Menu GUI, the first purchase price of the first menu item, and (iii) enable the first patron to place an ODS order to purchase the first menu item at the first purchase price, via interaction with the first ODS Menu GUI; and analyze the first patron's tracked wagering activities to determine if the first patron's tracked wagering activities satisfy a third set of criteria; and in response to determining that the first patron's tracked wagering activities satisfy the third set of criteria, automatically and dynamically: (i) determine a second purchase price of the first menu item; (ii) display, at the first ODS Menu GUI, the second purchase price of the first menu item, and (iii) enable the first patron to place an ODS order to purchase the first menu item at the second purchase price, via interaction with the first ODS Menu GUI.

12. The computer implemented method of claim 10 further comprising causing the at least one processor to execute a plurality of instructions stored in the memory to:

determine if the first patron is a VIP patron or a non-VIP patron;

in response to determining that the first patron is a VIP patron, automatically and dynamically configure a second ODS Menu GUI to: (i) display, at the first EGD display, a second portion of content representing the second menu item, (ii) enable the first patron to submit to the system, via interaction with the second ODS Menu GUI, a second ODS order which includes the second menu item, and (iii) cause at least one component of the system to generate and send a second set of information relating to the second ODS order to a second casino entity for handling fulfillment of the second ODS order, the second casino entity being located at the casino establishment; and in response to determining that the second patron is a non-VIP patron, automatically and dynamically configure the second ODS Menu GUI to inhibit display of the second menu item at the first EGD display to thereby prevent the first patron from being able to order the second menu item via interaction with the second ODS Menu GUI.

13. The computer implemented method of claim 10 further comprising causing the at least one processor to execute a plurality of instructions stored in the memory to:
- in response to determining that the first patron is a VIP patron, automatically and dynamically: (i) determine a first purchase price of the second menu item; (ii) display, at the second ODS Menu GUI, the first purchase price of the second menu item, and (iii) enable the first patron to place an ODS order to purchase the second menu item at the first purchase price, via interaction with the second ODS Menu GUI; and
- in response to determining that the first patron is a non-VIP patron, automatically and dynamically: (i) determine a second purchase price of the second menu item; (ii) display, at the second ODS Menu GUI, the second purchase price of the second menu item, and (iii) enable the first patron to place an ODS order to purchase the second menu item at the second purchase price, via interaction with the second ODS Menu GUI.

* * * * *